United States Patent [19]
Fischer et al.

[11] 4,025,169
[45] May 24, 1977

[54] HIGH SPEED WIDE ANGLE OBJECTIVE LENS SYSTEM

[75] Inventors: Helmut Fischer, Oberkochen; Erhard Glatzel; Walter Jahn, both of Heidenheim (Brenz); Heinz Zajadatz, Essingen, all of Germany

[73] Assignee: Carl Zeiss-Stiftung, Oberkochen, Germany

[22] Filed: Mar. 29, 1976

[21] Appl. No.: 671,129

[30] Foreign Application Priority Data

Mar. 29, 1975 Germany .................. 2514081

[52] U.S. Cl. ................... 350/212; 350/214
[51] Int. Cl.² ...................... G02B 13/04
[58] Field of Search .......... 350/212, 214, 215

[56] References Cited
UNITED STATES PATENTS 3,736,049  5/1973  Shimizu .................. 350/212

*Primary Examiner*—John K. Corbin
*Assistant Examiner*—Conrad Clark
*Attorney, Agent, or Firm*—Stonebraker, Shepard & Stephens

[57] ABSTRACT

An extremely high speed wide angle objective lens system, wherein a reducing Newtonian finder telescope is arranged in front of an objective lens group which produces a real image on an image plane. Rules or conditions are stated, and several specific examples are given. In many of the examples, the back focus distance is relatively large, thus making the lens system suitable for use with a mirror reflex camera where room is needed for swinging the reflex mirror.

25 Claims, 15 Drawing Figures

HIGH SPEED WIDE ANGLE OBJECTIVE LENS SYSTEM

BACKGROUND OF THE INVENTION

This invention relates to objectives such as used on cameras or other optical equipment, for forming a real image on photographic film or other suitable receiving surface. The object of the invention is to produce what may be regarded as a new species of extremely high speed wide angle objective, with relatively long back focus so that there is ample space for swinging a reflex mirror if it is desired to use the objective with a single lens reflex camera. A high quality image is produced, with a usable diameter of the entrance pupil which is greater than 0.73 times the equivalent focal length of the entire lens system.

Reference is made to German Pat. Nos. 1,187,393, published on 18, Feb. 1965, and 1,250,153, published on 14 Sept. 1967, both granted for inventions of Erhard Glatzel, one of the joint inventors of the present U.S. application. The present invention may be regarded as an improvement on the lenses disclosed in these German patents.

DESCRIPTION OF THE PREFERRED EMBODIMENTS

Figure 1:
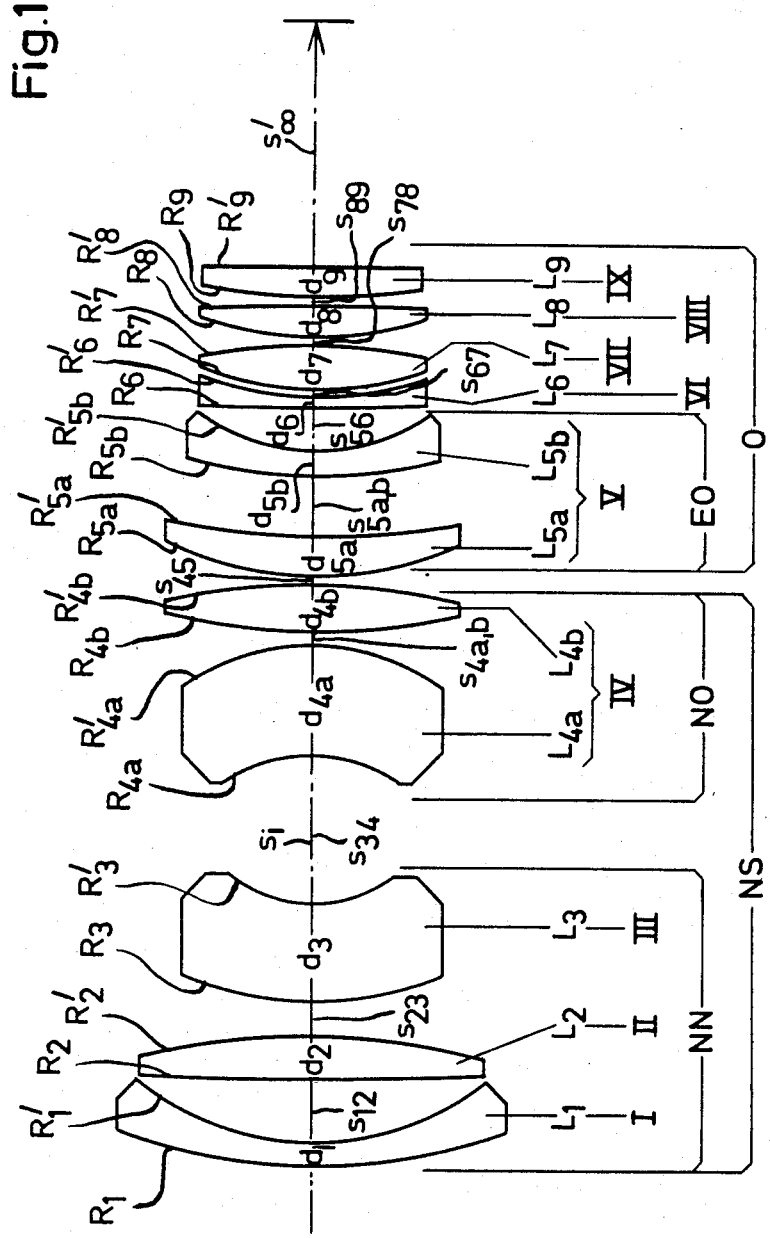
FIG. 1 is a lens diagram illustrating the general features of one embodiment of the present invention.

The objective lens system of the present invention (sometimes referred to herein, for brevity, merely as a "lens" or an "objective") may be described in general as a composite structure having a rear section or group or member similar in general to an ordinary conventional objective, these parts being collectively identified in the accompanying lens diagrams by the letter O. In front of this rear group or objective portion of the complete system, there is placed a plurality of components constituting, in effect, a Newtonian finder objective, designated as a whole in the lens diagrams by the letters NS. This Newtonian section NS, in turn, may be regarded as having two groups or members, a front group NN of diverging or negative optical power, and behind it a converging or positive ocular group NO.

The light from a distant object is front of the lens enters first the diverging group NN and passes through it, then entering and passing through the converging ocular group NO, and then enters the main objective group O in a bundle of rays approximately parallel to the optical axis, although possibly slightly diverging or slightly converging when the rays reach the first surface of the objective group O. In designing a lens of this special type with which the present invention deals, it is found that, especially when a lens of very high speed and wide angular field of view is desired, certain rules or conditions or limits of relationship of the parts to each other should be observed in order to obtain a high quality image free of troublesome aberrations. These conditions or limits, compliance with which is found to be highly desirable, may be briefly stated as follows:

1. The focal length of the diverging group NN at the front of the Newtonian finder telescope section is not less than 0.106 times and not more than 0.690 times the focal length of the converging ocular group NO of the Newtonian telescope section NS. This feature or condition gives assurance that, on account of the reducing effect of this relationship, the beam or rays entering the system from the distant object can, on account of the diverging action of this Newtonian or reverse Galilean telescope system, enter the main objective O with from 1.53 to 2.73 times the bundle heights and thus with from 2.3 to 7.45 times the bundle cross sectional areas entering from the object side. On the other hand, due to the limitation in downward direction of the reduction scale, there is no need to have excessively strong collecting refractive powers in the main objective group or member O which produces the real image, and which would lead to an increase in the aberrations of higher order both in the central field and in the lateral image field. This possible disadvantage can be successively eliminated when the relationship of the group NN to the group NO is within the limits just mentioned.

2. This diverging group NN has at least three components, one of which, at or near the front of this group, is a negative component having a rear surface bounded by air and concave toward the rear of the system, another of which is a positive component located behind the negative component just mentioned, and a third one of which is another negative component located behind the positive component and having a rear surface concave toward the rear and constituting the rearmost surface of this diverging group NN.

3. The converging ocular group NO should be spaced rearwardly from the diverging group NN sufficiently to provide between them an air lens of diverging action having a paraxial surface refractive power sum ($\phi_i$) which has a negative numerical value not less than 0.948 times and not more than 1.808 times the equivalent refractive power ($\Phi$) of the entire lens system.

4. In contrast to the conventional Newtonian telescopic finder system, which usually has only a single element ocular portion, the ocular group NO according to the present invention has a plurality of components spaced axially from each other to provide an air lens of collecting action followed by a positive components, such air lens acting to provide, for a middle bundle of rays, a strongly divergent ray path bent by the positive component to a ray path differing only slightly from a paraxial course, that is bent to a course which may be slightly divergent or slightly convergent, if not exactly parallel to the optical axis. Thus the lens designer operating in accordance with the teaching of the present invention is not forced to design the Newtonian system NS to produce a strictly telecentric course of the rays from the rear surface of the Newtonian system to the entrance of the objective group O, but it is entirely possible to design the part NS so that the rays enter the part O with a slight convergence or divergence, when this may be desirable for the sake of fine correction of the entire system. This freedom of choice to produce slight convergence or divergence at this point would result in only an insignificant dioptric effect on the fundamental properties of the main objective O and/or the back focus of the entire objective system.

5. The main objective group or portion O should have a paraxial intrinsic focal length ($f_o$) which is not less than 1.53 times and not more than 2.73 times the equivalent focal length (F) of the entire lens system. The importance of this design rule or condition will be understood when it is borne in mind that if the stated upper limit is exceeded, the difficulties in obtaining a high relative aperture increased progressively in an undesirable manner, while if the lower limit is violated, this would read to an increase in the aberrations of higher order. These undesirable consequences are successfully eliminated by following the design rules or conditions above set forth, thereby giving the optical designer great freedom in the arrangement of many lens details, as may be readily noted by observing the details of the specific examples given below, and noting, in comparing one example with another, how many of these details can be varied.

The new lens system of the present invention can be provided in a particularly advantageous manner with one or two aspherically shaped lens surfaces, in order to carry out specific correction processes by means of the aspherical surfaces. Thus the possibility is established of maintaining a large number of the individual lens elements free of specifically these partial effects of the correction process, as for instance for utilization of the reduction of aberrations of a higher order. It will be noted from some of the examples that the aspherical surfaces can be introduced with great advantage not only in the main objective assembly or group (O) which produces the real image, but also, in a manner both effective and surprising, in the Newtonian system assembly (NS).

It may be mentioned here that when considering the various limits or ranges of variable factors as mentioned above, it is customary to allow a tolerance of less or minus 5%.

The various examples of the following tables illustrate that many of the components can be formed either as single individual lens elements, or as doublets or other split components formed of a plurality of individual lens elements. Frequently, but not necessarily, the neighboring radii of curvature are made the same both in size and in sign, so that they may be cemented if desired. It may be pointed out in this connection that the lens diagrams which illustrate various embodiments of the invention are to be regarded as "exploded" view, with adjacent lens surfaces slightly separated from each other for the sake of clarity of illustration, even though in the data tables it may be indicated that there is zero spacing, denoting a cemented surface.

In the data tables, all linear measurements such as radii, thicknesses, and spacings are not given as absolute dimensions, but rather are stated as proportions of the equivalent focal length (F) of the entire objective lens system, which is considered as unity. That is, F = 1.00000. The individual lens elements are indicated by the letter L with a subscript corresponding to the number of the individual lens element as numbered consecutively from front to rear, except that in some instances two or more related lens elements are given the same numerical subscript followed by a letter of the alphabet to distinguish one from another.

The notations or symbols used in the data tables and also in the lens diagrams are in accordance with the notations and symbols often used in many lens patents, and will be well understood by those skilled in the art. For instance, the radii of curvature of the front surface and the rear surface of each element are indicated by R and R', respectively, with a subscript indicating the number of that particular element. Positive values of R or R' indicates surfaces convex toward the front of the lens, and negative values indicates surfaces concave toward the front, in accordance with customary usage. The end of the lens toward the distant object or longer conjugate is referred to for convenience as the front, and the end toward the image (that is, toward the camera, if the lens system is used on a photographic camera) is referred to for convenience as the rear of the lens. The light is assumed, in accordance with conventional lens patent practice, to enter from the front, and to pass through the lens from left to right.

The axial thicknesses of individual lens elements are indicated in the tables by the letter $d$ with a subscript identifying the particular element. Axial spacings between elements are indicated by the letter $s$ likewise with a subscript, but in the case of these spacings, the subscript refers to the identifying number of the lens in front of and the lens behind the space is question. Zero spacing indicates elements cemented to each other. All spacings greater than zero refer to air spacings. The lens elements or groups of elements which may be regarded or submembers are indicated by Roman numerals.

The index of refraction is indicated by $n$ with a subscript identifying the lens element, in some of the tables. In other tables, the indices of refraction are given in a column headed $n_d$ for the sake of compactness when the data also include the Abbe number or dispersive index, stated in an adjacent column headed $v_d$. When an objective is designed for use in only a very narrow spectral range, the refractive index refers specifically to this narrow range. If the lens system is to be used over a wide spectral range, as for example in color photography, then instead of monochromatic image error correction, achromatism should be brought out over the wider spectral range required. For this purpose, in known manner, the glasses used in the elements are to be chosen so that the color dispersion of the glasses used serves to eliminate the chromatic deviations or errors due to the wavelengths which enter into consideration.

During the course of development of this invention it was found, by way of confirmation, that upon the development of the so-called preforms or initial forms of the objectives, and then during the course of the following technical rough development to produce a rough form in known manner with the first correction normally customary in the Seidel range (third order), the use of one of the standard refractive indices can take place in a routine manner. A convenient index to use for this purpose is the index of refraction for the yellow d-line of the helium spectrum, with a wavelength of 5876 Angstrom units. Data for this wavelength are customarily shown in many commercial catalogues of manufacturers of optical glasses.

In the heading of each data table there is indicated the figure number of the particular lens diagram which is intended to illustrate the specific example in the table. In this connection it should be borne in mind that the lens diagrams are not intended to be drawn strictly to scale, but are intended merely to furnish a quick visual indication of the general characteristics of the particular specific example. Thus a single lens diagrams is sufficient to illustrate two or more specific examples which are of the same general configuration but which may differ somewhat from each other in thicknesses, spacings, curvatures, or other factors.

The specific example tables also indicate, in each case, the relative aperture for which the particular example is intended, expressed as a conventional $f$ number, and the angular field of view, expressed in degrees, and the back focus from the axial vertex of the last lens element to the focal plane (for an object at infinity) expressed in proportion to the equivalent focal length (F) of the entire objective lens system. The heading of each table also indicates the diameter of the entrance pupil, expressed in proportion to the equivalent focal length (F) of the entire system, and the refractive power of the entire Newtonian finder telescope system NS expressed in proportion to the refractive power ($\phi$) of the entire object lens system as a whole.

The first five examples relate to embodiments of the invention which are developed with only spherical surfaces. Then, in examples 6–15, data are given for ten additional embodiments of extremely high image-forming ability, which are provided with aspherical surfaces. As already indicated, the lens system of the present invention is particularly suitable and advantageous for introduction of aspherical surfaces to provide a very high quality of image.

In these examples, the possible breaking down of lens components by splitting into a plurality of individual elements is shown both by the data in the tables, and pictorially in the lens diagrams, both for the negative group NN and for the ocular group NO of the Newtonian finder telescope NS. Possible splitting of components within the main objective part O which forms the real image, is also indicated both pictorially and by the data in the tables.

A few comments on some of the specific examples will be given, before turning to the actual data tables themselves. In example 1 (illustrated by the diagram in FIG. 1). there is given a compilation of data for a preform of a lens system according to the invention, intended for a relative aperture of f/1.35 and a total field angle of 52°, in which the Newtonian finder telescope (NS) is constructed in the simplest fashion from a three part Newtonian negative or diverging group (NN) and a two part Newtonian ocular (NO), the entire objective being provided with a monochromatic precorrection in the Seidel range of third order.

Example 2 (FIG. 2) shows an embodiment in which the Newtonian occular (NO) has a total of three individual elements, in which a doublet of diverging action which is concave toward the front is split into two individual elements of opposite sign of power. This is followed by a biconvex lens element. In order to illustrate the wide possibilities of development opened up by the new principle of design, this biconvex lens element is shown as an equal sided or equiconvex lens, constituting the last element of the Newtonian finder telescope (NS) at the rear end thereof. This embodiment of the invention is contemplated for an angular field of view of 53° and a relative aperture of f/1.33 and a corresponding entrance pupil diameter of 0.752 F. It is monochromatically precorrected in the region of the third order. The back focus, for an object at infinity, is somewhat greater than 1.40 F, thus allowing room for installing this lens system in mirror reflex cameras currently on the market.

In contrast to this, the structure in example 3 (illustrated in FIG. 3) has the collecting component of the Newtonian ocular (NO) split into two individual lens elements with refractive power of the same sign, so that the lens designer working in accordance therewith is shown, based on these data, this specific development within the scope of the present invention. This practical example is intended for a total field angle of 60° and an entrance pupil diameter of 0.769° F, corresponding to a relative aperture of f/1.30. It is monochromatically precorrected in the third order Seidel range, since there is here concerned an extremely high speed lens system for the recording of substantially monochromatic signals which lie within a very narrow spectral range.

The same is also true of all those examples which give only the refractive indices of the glasses without mention of the Abbe numbers or dispersive indices. On the other hand, examples 4 and 5 are embodiments designed for forming an image of multi-color objects within the visible spectrum, and accordingly the types of glasses used are characterized by giving both the refractive indices and the Abbe numbers, which assure achromatization over the required broad spectral range of visible light.

The same method is also taken as a basis for the following examples, which are equipped with aspherical surfaces for further correction of aberrations and enhancement of image quality. In examples 6 and 13, only one aspherical surface has been introduced into the system. In examples 7–12 as well as examples 14 and 15, two aspherical surfaces are provided in each example.

In order to prove the broad scope of use which is opened up so successfully for practical use by the new principle of design and its concrete rules of technical action, it is shown by way of demonstration in the following data tables that such aspherical surfaces can be arranged either in the Newtonian finder telescope portion or section (NS) of the system, or in the main objective portion or section (O) which produces the real image, or in both of such sections. Likewise, aspherical surfaces can be used either in the entrance part (EO) of the main objective (O), or in the rear portion of this main objective (O), or in both.

The aspherical development of a deformed surface is determined by the known camber expression:

$$P = c_1 \cdot H^2 + c_2 \cdot H^4 + c_3 \cdot H^6 + c_4 \cdot H^8 + c_5 \cdot H^{10},$$

wherein H is the height of the perpendicular to the axis at its specific place of surface penetration. The values of the coefficients c for each individual example including an aspherical surface are given at the end of the appropriate data table. It is also shown by the data that two or more neighboring surfaces can be combined to form pairs of cemented surfaces in the main objective part (O).

It should be emphasized that the previously mentioned characteristic enlargement ($V_{NS}$) as known applies strictly to the region of Gaussian dioptrics only when the paraxial rays from the Newtonian finder telescope (NS) and therefore also from the Newtonian ocular (NO) emerge "telecentrally," and thus have an infinitely long image distance at this place. In practice, as in certain telescopes or Galilean glasses, the course of such rays will frequently not be precisely telecentric, but will emerge from the telescope system with a back focus which is numerically very long. It is known to the optical designer to use the reciprocal of such an accidentally occurring very long back focus with reversed sign of the power for the arithmetical compensation for the determination of the strict paraxial enlargement ($V_{NS}$) in the same way as is customary in the case of a practical telescope system, to bring about the precise telecentric ray path on the side of the eye of the observer, simply by accurate focusing adjustment of the ocular. The corresponding above treatment of the arithmetical determination of the strict value of the paraxial enlargement of the finder telescope part is also indicated for the new objectives of the present invention, whenever no ocular adjustment is provided between the diverging objective (NN) and the collecting ocular (NO) and the internal spacing distance between them ($s_l$) is thus constant.

In the case of objective lens systems for installation, for example, in motion picture cameras, these fast objectives of the present invention may be given relatively extremely long structural length, for additional reduction of aberrations of higher order. Furthermore it may be desirable to provide these objectives with a very long back focus, for example in order to facilitate the mechanical arrangement of fixed or movable deflection elements between the last lens element and the image plane. Examples 16–20 indicate that, in accordance with the present invention, it is possible to produce such systems with entrance pupil diameters which can be increased to more than 0.95 times the equivalent focal length (F) of the entire objective.

Example 1 (FIG. 1)
F = 1.00000   f/1.34   $2\omega_o$ = 52°   $s'_\infty$ = +1.4095 F
Diameter of entrance pupil = 0.746 F   $\Phi_{NS}$ = +0.0537 $\Phi$

| Lens | Radii | Thicknesses and spacings | N | | |
|---|---|---|---|---|---|
| I $L_1$ | $R_1$ = +3.3100 | $d_1$ = 0.14600 | $n_1$ = 1.639 | | |
| | $R'_1$ = +1.6700 | $s_{12}$ = 0.34600 | | | |
| II $L_2$ | $R_2$ = +40.000 | $d_2$ = 0.23700 | $n_2$ = 1.673 | NN | |
| | $R'_2$ = −4.5350 | $s_{23}$ = 0.20140 | | | |
| III $L_3$ | $R_3$ = +1.9710 | $d_3$ = 0.53380 | $n_3$ = 1.744 | | NS |
| | $R'_3$ = +0.7735 | $s_l = s_{34}$ = 0.83250 | | | |
| IV { $L_{4a}$ | $R_{4a}$ = −0.9192 | $d_{4a}$ = 0.61260 | $n_{4a}$ = 1.623 | | |
| | $R'_{4a}$ = −1.35568 | $s_{4a,b}$ = 0.06850 | | NO | |
| $L_{4b}$ | $R_{4b}$ = +4.0000 | $d_{4b}$ = 0.26642 | $n_{4b}$ = 1.623 | | |
| | $R'_{4b}$ = −4.0000 | $s_{45}$ = 0.00638 | | | |
| V { $L_{5a}$ | $R_{5a}$ = +1.7310 | $d_{5a}$ = 0.25246 | $n_{5a}$ = 1.658 | | |
| | $R'_{5a}$ = +5.42638 | $s_{5a,b}$ = 0.33569 | | EO | |
| $L_{5b}$ | $R_{5b}$ = + 2.3605 | $d_{5b}$ = 0.14605 | $n_{5b}$ = 1.785 | | |
| | $R'_{5b}$ = +1.1830 | $s_{56}$ = 0.21823 | | | |
| VI $L_6$ | $R_6$ = +11.5687 | $d_6$ = 0.09232 | $n_6$ = 1.805 | | |
| | $R'_6$ = +1.4258 | $s_{67}$ = 0 | | | O |
| VII $L_7$ | $R_7$ = +1.4258 | $d_7$ = 0.30382 | $n_7$ = 1.488 | | |
| | $R'_7$ = −3.06946 | $s_{78}$ = 0.00336 | | | |
| VIII $L_8$ | $R_8$ = +1.8595 | $d_8$ = 0.19465 | $n_8$ = 1.658 | | |
| | $R'_8$ = −12.0749 | $s_{89}$ = 0.00336 | | | |
| IX $L_9$ | $R_9$ = +4.10615 | $d_9$ = 0.16280 | $n_9$ = 1.623 | | |
| | $R'_9$ = +47.4162 | | | | |

Example 2 (FIG. 2)
F = 1.00000   f/1.33   $2\omega_o$ = 52°   $s'_\infty$ = +1.4095 F
Diameter of entrance pupil = 0.752 F   $\Phi_{NS}$ = +0.0537 $\Phi$

| Lens | Radii | Thicknesses and spacings | N | |
|---|---|---|---|---|
| I $L_1$ | $R_1$ = +3.31000 | $d_1$ = 0.14600 | $n_1$ = 1.6390 | |
| | $R'_1$ = +1.67000 | $s_{12}$ = 0.34600 | | |
| II $L_2$ | $R_2$ = +40.0000 | $d_2$ = 0.23700 | $n_2$ = 1.6730 | NN |
| | $R'_2$ = −4.53500 | | | |

-continued

Figure 2:
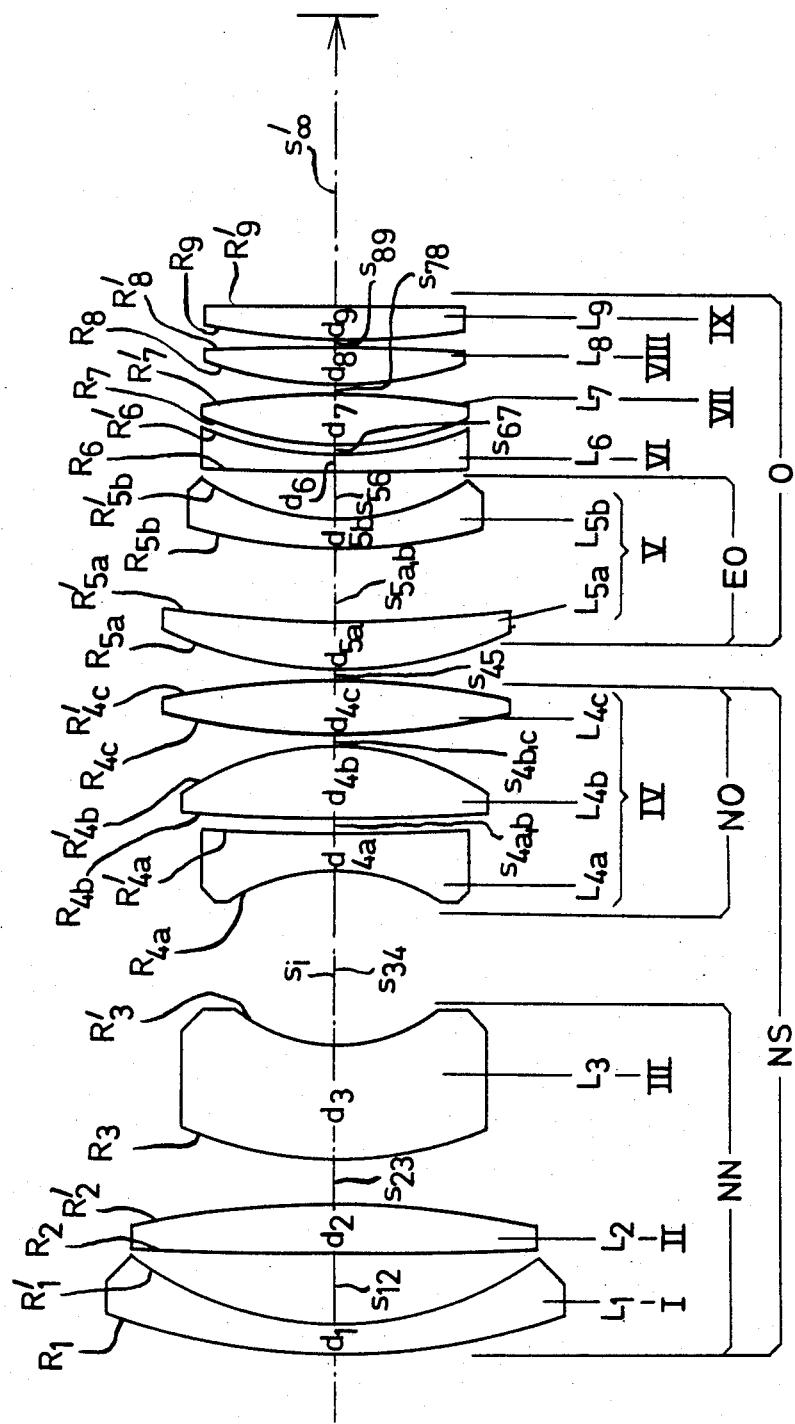
FIGS. 2-15 are similar lens diagrams illustrating other embodiments.

Example 2 (FIG. 2)

F = 1.00000  f/1.33  $2\omega_s = 52°$  $s'_\infty = +1.4095$ F
Diameter of entrance pupil = 0.752 F  $\Phi_{NS} = +0.0537$ $\Phi$

| Lens | Radii | Thicknesses and spacings | N | |
|---|---|---|---|---|
| | | $s_{23} = 0.20140$ | | |
| III $L_3$ | $R_3 = +1.97100$ | $d_3 = 0.53380$ | $n_3 = 1.7440$ | |
| | $R'_3 = +0.77350$ | $s_t = s_{34} = 0.83250$ | | NS |
| IV $\begin{cases} L_{4a} \\ L_{4b} \\ L_{4c} \end{cases}$ | $R_{4a} = -0.91920$ | $d_{4a} = 0.16230$ | $n_{4a} = 1.6230$ | |
| | $R'_{4a} = +10.2000$ | $s_{4a,b} = 0.0685003$ | | |
| | $R_{4b} = +9.38050$ | $d_{4b} = 0.334851$ | $n_{4b} = 1.6204$ | NO |
| | $R'_{4b} = -1.3728209$ | $s_{4b,c} = 0.0685002$ | | |
| | $R_{4c} = +4.00000$ | $d_{4c} = 0.26642$ | $n_{4c} = 1.6230$ | |
| | $R'_{4c} = -4.00000$ | $s_{45} = 0.006380$ | | |
| V $\begin{cases} L_{5a} \\ L_{5b} \end{cases}$ | $R_{5a} = +1.73100$ | $d_{5a} = 0.25246$ | $n_{5a} = 1.6580$ | |
| | $R'_{5a} = +5.42638$ | $s_{5a,b} = 0.33569$ | | EO |
| | $R_{5b} = +2.36050$ | $d_{5b} = 0.14605$ | $n_{5b} = 1.7850$ | |
| | $R'_{5b} = +1.18300$ | $s_{56} = 0.21823$ | | |
| VI $L_6$ | $R_6 = +11.56870$ | $d_6 = 0.09232$ | $n_6 = 1.8050$ | |
| | $R'_6 = +1.42580$ | $s_{67} = 0$ | | O |
| VII $L_7$ | $R_7 = +1.42580$ | $d_7 = 0.30382$ | $n_7 = 1.4880$ | |
| | $R'_7 = -3.06946$ | $s_{78} = 0.00336$ | | |
| VIII $L_8$ | $R_8 = +1.85950$ | $d_8 = 0.19465$ | $n_8 = 1.6580$ | |
| | $R'_8 = -12.07490$ | $s_{89} = 0.00336$ | | |
| IX $L_9$ | $R_9 = +4.10615$ | $d_9 = 0.16280$ | $n_9 = 1.6230$ | |
| | $R'_9 = -47.4162$ | | | |

Figure 3:
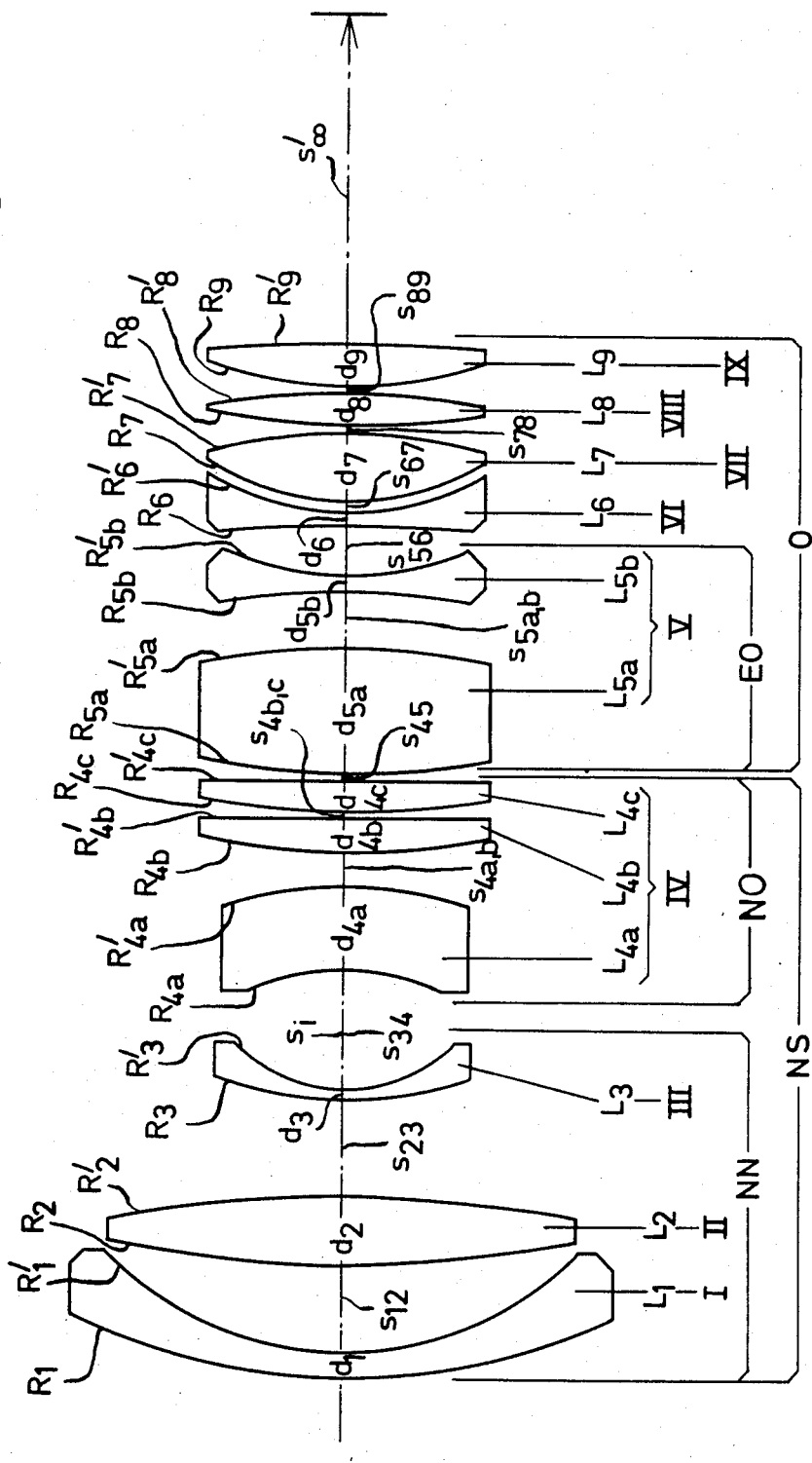

Example 3 (FIG. 3)

F = 1.00000  f/1.33  $2\omega_s = 61°$  $s'_\infty = +1.5959$ F
Diameter of entrance pupil = 0.752 F  $\Phi_{NS} = 0$ (telezentr.)

| Lens | Radii | Thicknesses and spacings | N | |
|---|---|---|---|---|
| I $L_1$ | $R_1 = +3.25586$ | $d_1 = 0.139391$ | $n_1 = 1.62299$ | |
| | $R'_1 = +1.69156$ | $s_{12} = 0.412113$ | | |
| II $L_2$ | $R_2 = +5.78979$ | $d_2 = 0.343428$ | $n_2 = 1.64250$ | NN |
| | $R'_2 = -5.87383$ | $s_{23} = 0.460597$ | | |
| III $L_3$ | $R_3 = +1.99604$ | $d_3 = 0.056565$ | $n_3 = 1.74400$ | |
| | $R'_3 = +0.80039$ | $s_t = s_{34} = 0.569686$ | | NS |
| IV $\begin{cases} L_{4a} \\ L_{4b} \\ L_{4c} \end{cases}$ | $R_{4a} = -1.25941$ | $d_{4a} = 0.428275$ | $n_{4a} = 1.62004$ | |
| | $R'_{4a} = -1.92550$ | $s_{4a,b} = 0.149492$ | | |
| | $R_{4b} = +3.78696$ | $d_{4b} = 0.164250$ | $n_{4b} = 1.64250$ | NO |
| | $R'_{4b} = $ plan | $s_{4b,c} = 0.010000$ | | |
| | $R_{4c} = +4.050827$ | $d_{4c} = 0.178470$ | $n_{4c} = 1.78470$ | |
| | $R'_{4c} = $ plan | $s_{45} = 0.020000$ | | |

-continued

Example 3 (FIG. 3)
F = 1.00000  f/1.33  2ω$_e$ = 61°  s'$_\infty$ = +1.5959 F
Diameter of entrance pupil = 0.752 F  Φ$_{NS}$ = 0 (telezentr.)

| Lens | Radii | Thicknesses and spacings | N | |
|---|---|---|---|---|
| V {L$_{5a}$ | R$_{5a}$ = +4.183696<br>R'$_{5a}$ = −4.183696 | d$_{5a}$ = 0.624055<br>s$_{5a,b}$ = 0.267900 | n$_{5a}$ = 1.78600 | EO |
| L$_{5b}$} | R$_{5b}$ = −4.050827<br>R'$_{5b}$ = +1.500270 | d$_{5b}$ = 0.080000<br>CS = s$_{56}$ = 0.249073 | n$_{5b}$ = 1.80518 | |
| VI L$_6$ | R$_6$ = −8.417200<br>R'$_6$ = +1.16357 | d$_6$ = 0.0646458<br>s$_{67}$ = 0 | n$_6$ = 1.78470 | O |
| VII L$_7$ | R$_7$ = +1.16357<br>R'$_7$ = −2.47696 | d$_7$ = 0.410093<br>s$_{78}$ = 0.004040 | n$_7$ = 1.71300 | |
| VIII L$_8$ | R$_8$ = +3.84187<br>R'$_8$ = −3.95403 | d$_8$ = 0.191916<br>s$_{89}$ = 0.004040 | n$_8$ = 1.64250 | |
| IX L$_9$ | R$_9$ = +1.96752<br>R'$_9$ = −7.94652 | d$_9$ = 0.212117 | n$_9$ = 1.56384 | |

Example 4 (FIG. 1)
F = 1.00000  f/1.29  2ω$_e$ = 53.5°  s'$_\infty$ = +1.4095 F
Diameter of entrance pupil = 0.775 F  Φ$_{NS}$ = +0.102023 Φ

| Lens | Radii | Thicknesses and spacings | n$_d$/ν$_d$ | Bez. |
|---|---|---|---|---|
| I L$_1$ | R$_1$ = +3.30888<br>R'$_1$ = +1.67033 | d$_1$ = 0.146023<br>s$_{12}$ = 0.345755 | 1.63854/55.38 | |
| II L$_2$ | R$_2$ = +39.89615<br>R'$_2$ = −4.54148 | d$_2$ = 0.236994<br>s$_{23}$ = 0.201411 | 1.67270/32.20 | NN |
| III L$_3$ | R$_3$ = +1.97097<br>R'$_3$ = +0.77345 | d$_3$ = 0.533739<br>s$_i$ = s$_{34}$ = 0.832498 | 1.74400/44.77 | NS |
| IV {L$_{4a}$<br>L$_{4b}$} | R$_{4a}$ = −0.91924<br>R'$_{4a}$ = −1.35576<br>R$_{4b}$ = +3.82110<br>R'$_{4b}$ = −3.60727 | d$_{4a}$ = 0.612625<br>s$_{4a,b}$ = 0.068815<br>d$_{4b}$ = 0.281975<br>s$_{45}$ = 0.003357 | 1.62299/58.06<br><br>1.62299/58.06 | NO |
| V {L$_{5a}$<br>L$_{5b}$} | R$_{5a}$ = +1.73153<br>R'$_{5a}$ = +4.47636<br>R$_{5b}$ = +2.35943<br>R'$_{5b}$ = +1.18252 | d$_{5a}$ = 0.238336<br>s$_{5a,b}$ = 0.335685<br>d$_{5b}$ = 0.146023<br>CS = s$_{56}$ = 0.218195 | 1.65844/50.88<br><br>1.78470/26.08 | EO |
| VI L$_6$ | R$_6$ = +11.57274<br>R'$_6$ = +1.42579 | d$_6$ = 0.092313<br>s$_{67}$ = 0 | 1.80518/25.43 | O |
| VII L$_7$ | R$_7$ = +1.42579<br>R'$_7$ = −3.05708 | d$_7$ = 0.302116<br>s$_{78}$ = 0.003357 | 1.48749/70.45 | |
| VIII L$_8$ | R$_8$ = +1.86073<br>R'$_8$ = −12.08331 | d$_8$ = 0.194697<br>s$_{89}$ = 0.003357 | 1.65844/50.88 | |

-continued

Example 4 (FIG. 1)
F = 1.00000  f/1.29  $2\omega_o = 53.5°$  $s'_\omega = +1.4095$ F
Diameter of entrance pupil = 0.775 F  $\Phi_{NS} = +0.102023\ \Phi$

| Lens | Radii | Thicknesses and spacings | $n_d/\nu_d$ | Bez. |
|---|---|---|---|---|
| IX $L_9$ | $R_9 = +4.10610$ $R'_9 = -47.41549$ | $d_9 = 0.162807$ | 1.62299/58.06 | |

Figure 4:
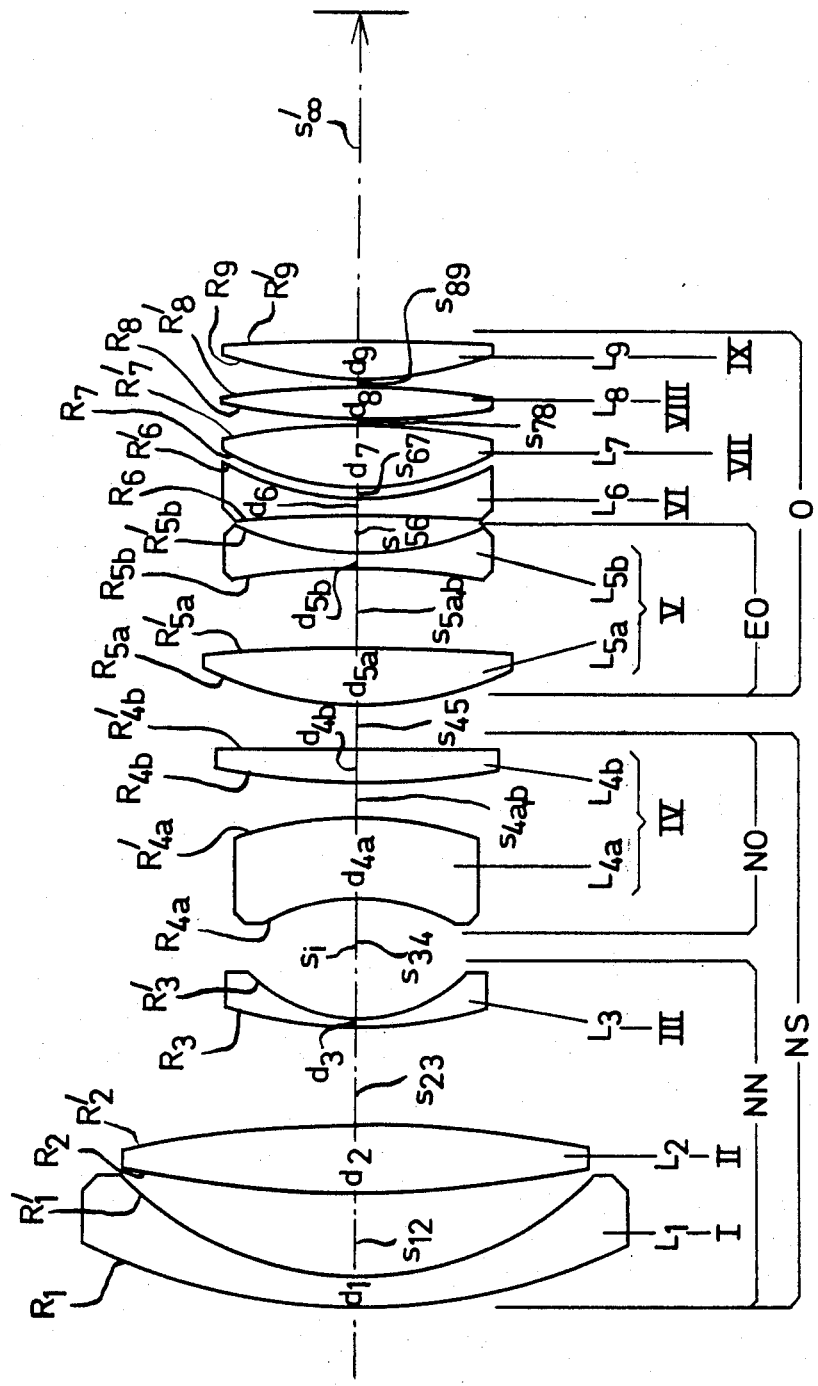

Example 5 (FIG. 4)
F = 1.00000  f/1.3  $2\omega_o = 61.5°$  $s'_\omega = +1.59591$ F
Diameter of entrance pupil = 0.769 F  $\Phi_{NS} = -0.3467\ \Phi$

| Lens | Radii | Thicknesses and spacings | $n_d/\nu_d$ | Bez. |
|---|---|---|---|---|
| I $L_1$ | $R_1 = +3.25586$ $R'_1 = +1.69156$ | $d_1 = 0.139391$ $s_{12} = 0.412113$ | 1.62299/58.06 | |
| II $L_2$ | $R_2 = +5.78979$ $R'_2 = -5.87383$ | $d_2 = 0.343428$ $s_{23} = 0.460597$ | 1.64250/57.94 | NN |
| III $L_3$ | $R_3 = +1.99604$ $R'_3 = +0.80039$ | $d_3 = 0.056565$ $s_l = s_{34} = 0.569686$ | 1.74400/44.77 | NS |
| IV $L_{4a}$ $L_{4b}$ | $R_{4a} = -1.25941$ $R'_{4a} = -1.92550$ $R_{4b} = +3.78696$ $R'_{4b} = +117.1978$ | $d_{4a} = 0.428275$ $s_{4a,b} = 0.149492$ $d_{4b} = 0.175754$ $s_{45} = 0.218178$ | 1.62004/36.37 1.64250/57.94 | NO |
| V $L_{5a}$ $L_{5b}$ | $R_{5a} = +1.70381$ $R'_{5a} = -9.44427$ $R_{5b} = -4.56597$ $R'_{5b} = +1.47541$ | $d_{5a} = 0.298984$ $s_{5a,b} = 0.391104$ $d_{5b} = 0.076766$ $CS = s_{56} = 0.183835$ | 1.78470/26.08 1.80518/25.43 | EO |
| VI $L_6$ | $R_6 = -8.41722$ $R'_6 = +1.16357$ | $d_6 = 0.064645$ $s_{67} = 0$ | 1.78470/26.08 | O |
| VII $L_7$ | $R_7 = +1.16357$ $R'_7 = -2.47696$ | $d_7 = 0.410093$ $s_{78} = 0.004040$ | 1.71300/53.85 | |
| VIII $L_8$ | $R_8 = +3.84187$ $R'_8 = -3.95403$ | $d_8 = 0.191916$ $s_{89} = 0.004040$ | 1.64250/57.94 | |
| IX $L_9$ | $R_9 = +1.96752$ $R'_9 = -7.94652$ | $d_9 = 0.212117$ | 1.56384/60.82 | |

Example 6 (FIG. 5)
F = 1.00000  f/1.37  $2\omega_o = 70°$  $s'_\omega = +1.37816$
Diameter of entrance pupil = 0.730 F  $\Phi_{NS} = +0.1190\ \Phi$

| Lens | Radii | Thicknesses and spacings | N |
|---|---|---|---|
| I $L_{1a}$ $L_{1b}$ | $R_{1a} = +2.600$ $R'_{1a} = +4.220$ $R_{1b} = +4.220$ $R'_{1b} = +1.305$ | $d_{1a} = 0.162$ $s_{1a,b} = 0.030$ $d_{1b} = 0.078$ | $n_{1a} = 1.620$ $n_{1b} = 1.630$ |

-continued

Figure 5:
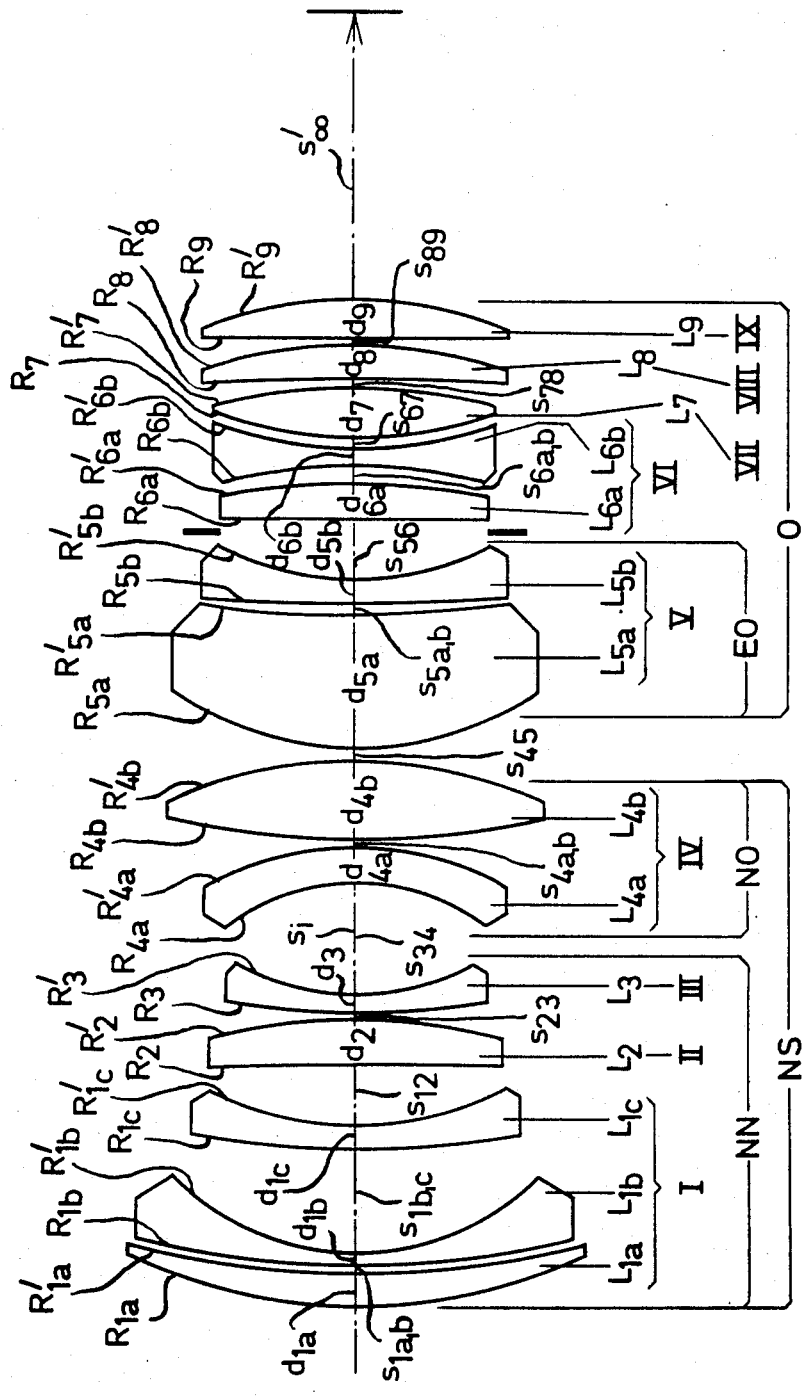

Example 6 (FIG. 5)

$F = 1.00000$   $f/1.37$   $2\omega_o = 70°$   $s'_o = +1.37816$
Diameter of entrance pupil = 0.730 F   $\Phi_{NS} = +0.1190\ \Phi$

| Lens | Radii | Thicknesses and spacings | N | |
|---|---|---|---|---|
| | | $s_{1a,c} = 0.499$ | | |
| $L_{1c}$ | $R_{1c} = +6.200$ | $d_{1c} = 0.090$ | $n_{1c} = 1.620$ | NN |
| | $R'_{1c} = +1.630$ | $s_{12} = 0.294$ | | |
| II $L_2$ | $R_2 = -36.01$ | $d_2 = 0.232$ | $n_2 = 1.670$ | NS |
| | $R'_2 = -2.790$ | $s_{23} = 0.003$ | | |
| III $L_3$ | $R_3 = +3.760$ | $d_3 = 0.0908$ | $n_3 = 1.713$ | |
| | $R'_3 = +1.180$ | $s_f = s_{34} = 0.534$ | | |
| IV $L_{4a}$ | $R_{4a} = -1.110$ | $d_{4a} = 0.186$ | $n_{4a} = 1.740$ | |
| | $R'_{4a} = -1.490$ | $s_{4a,b} = 0.010$ | | NO |
| $L_{4b}$ | $R_{4b} = +4.220$ | $d_{4b} = 0.411$ | $n_{4b} = 1.730$ | |
| | $R'_{4b} = -2.030$ | $s_{45} = 0.013$ | | |
| V $L_{5a}$ | $R_{5a} = +1.437$ | $d_{5a} = 0.667$ | $n_{5a} = 1.744$ | |
| | $R'_{5a} = +4.917$ | $s_{5a,b} = 0.052$ | | EO |
| $L_{5b}$ | $R_{5b} = +12.55$ | $d_{5b} = 0.105$ | $n_{5b} = 1.756$ | |
| | $R'_{5b} = +1.342$ | $CS = s_{56} = 0.320$ | | |
| VI $L_{6a}$ | $R_{6a} = \pm\text{plan}$ | $d_{6a} = 0.157$ | $n_{6a} = 1.548$ | |
| | $R'_{6a} = -3.119$ | $s_{6a,b} = 0.079$ | | |
| $L_{6b}$ | $R_{6b} = -2.837$ | $d_{6b} = 0.075$ | $n_{6b} = 1.805$ | O |
| | $R'_{6b} = +1.691$ | $s_{67} = 0$ | | |
| VII $L_7$ | $R_7 = +1.691$ | $d_7 = 0.320$ | $n_7 = 1.510$ | |
| | $R'_7 = -2.068$ | $s_{78} = 0.004$ | | |
| VIII $L_8$ | $R_8 = -21.43$ | $d_8 = 0.172$ | $n_8 = 1.713$ | |
| | $R'_8 = -2.470$ | $s_{89} = 0.004$ | | |
| IX $L_9$ | $R_9 = -29.95$ | $d_9 = 0.175$ | $n_9 = 1.713$ | |
| | $R'_9 = -1.932329$ | | | |

Aspherical surface $R_{6a}$ with: $c_1 = c_4 = c_5 = 0$, $c_2 = -1.984\ 1448 \cdot 10^{-1}$, $c_3 = -2.189\ 7588 \cdot 10^{-2}$.

Figure 6:
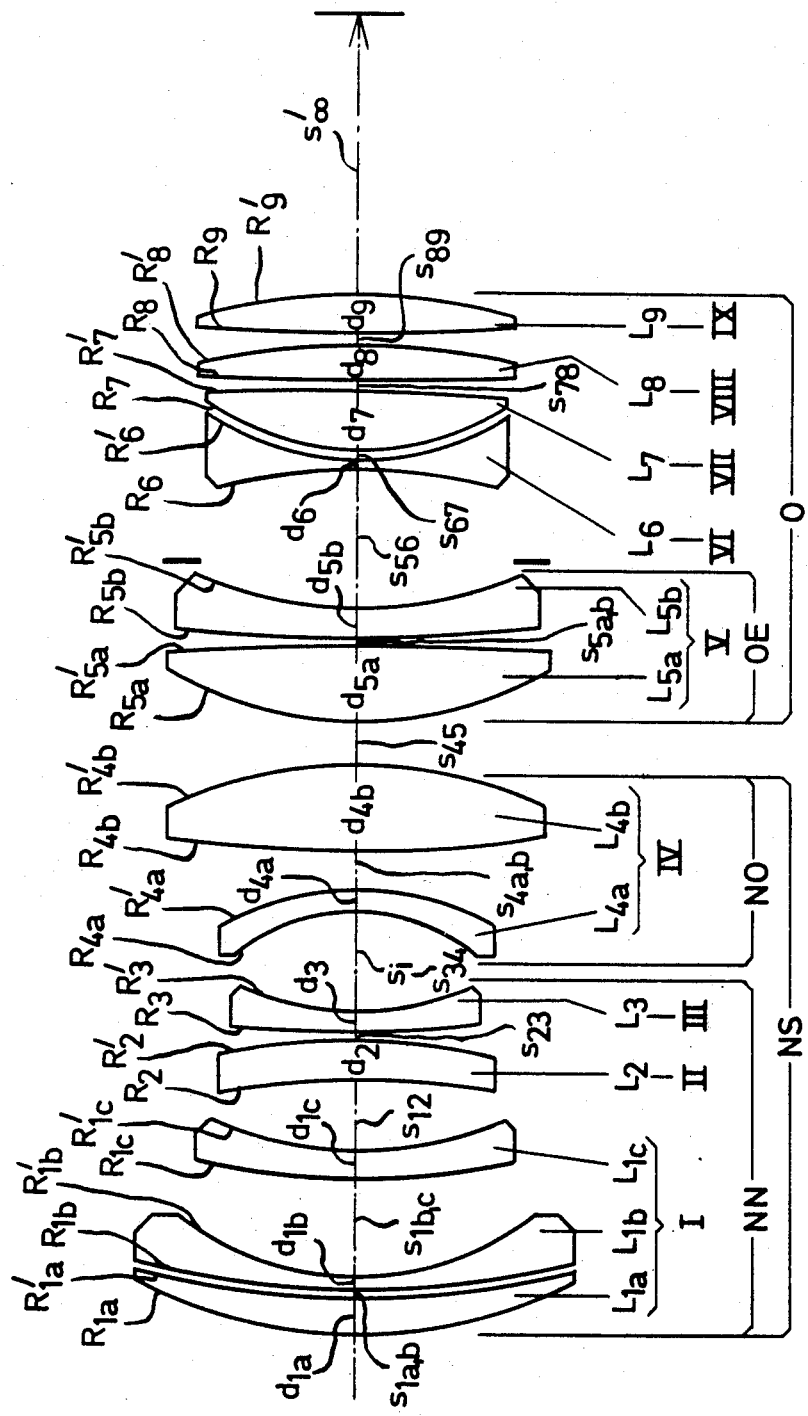

Example 7 (FIG. 6)

$F = 1.00000$   $f/1.35$   $2\omega_o = 61°$   $s'_o = +1.38483\ F$
Diameter of entrance pupil = 0.741 F   $\Phi_{NS} = +0.0297\ \Phi$

| Lens | Radii | Thickness and spacings | N | |
|---|---|---|---|---|
| I $L_{1a}$ | $R_{1a} = +2.3500$ | $d_{1a} = 0.900$ | $n_{1a} = 1.620$ | |
| | $R'_{1a} = +8.4100$ | $s_{1a,b} = 0.0100$ | | |
| $L_{1b}$ | $R_{1b} = +8.4100$ | $d_{1b} = 0.0500$ | $n_{1b} = 1.625$ | |
| | $R'_{1b} = +1.4000$ | $s_{1b,c} = 0.3613$ | | |
| $L_{1c}$ | $R_{1c} = +4.2100$ | $d_{1c} = 0.0800$ | $n_{1c} = 1.625$ | NN |
| | $R'_{1c} = +1.7800$ | $s_{12} = 0.3205$ | | |
| II $L_2$ | $R_2 = -8.4100$ | $d_2 = 0.2109$ | $n_2 = 1.670$ | |
| | $R'_2 = -2.8100$ | $s_{23} = 0.0197$ | | NS |

-continued

Example 7 (FIG. 6)

F = 1.00000   f/1.35   $2\omega_e = 61°$   $s'_\omega = +1.38483$ F
Diameter of entrance pupil = 0.741 F   $\Phi_{NS} = +0.0297\ \Phi$

| Lens | | Radii | Thickness and spacings | N | |
|---|---|---|---|---|---|
| III | $L_3$ | $R_3 = +5.8900$ | $d_3 = 0.0880$ | $n_3 = 1.713$ | |
| | | $R'_3 = +1.1080$ | | | |
| | | | $s_f = s_{34} = 0.4850$ | | |
| IV | $L_{4a}$ | $R_{4a} = -0.9906$ | $d_{4a} = 0.1189$ | $n_{4a} = 1.662$ | |
| | | $R'_{4a} = -1.2803$ | $s_{4a,b} = 0.1647$ | | NO |
| | $L_{4b}$ | $R_{4b} = +4.8876$ | $d_{4b} = 0.4167$ | $n_{4b} = 1.788$ | |
| | | $R'_{4b} = -2.2904$ | | | |
| | | | $s_{45} = 0.2058$ | | |
| V | $L_{5a}$ | $R_{5a} = +1.8900$ | $d_{5a} = 0.3710$ | $n_{5a} = 1.744$ | |
| | | $R'_{5a} = -13.203$ | $s_{5a,b} = 0.0097$ | | EO |
| | $L_{5b}$ | $R_{5b} = +5.6822$ | $d_{5b} = 0.1554$ | $n_{5b} = 1.794$ | |
| | | $R'_{5b} = +2.1055$ | | | |
| | | | CS = $s_{56} = 0.6609$ | | |
| VI | $L_6$ | $R_6 = -3.1200$ | $d_6 = 0.0650$ | $n_6 = 1.805$ | |
| | | $R'_6 = +1.1784$ | | | |
| | | | $s_{67} = 0$ | | O |
| VII | $L_7$ | $R_7 = +1.1784$ | $d_7 = 0.3148$ | $n_7 = 1.510$ | |
| | | $R'_7 = -6.0511$ | | | |
| | | | $s_{78} = 0.0044$ | | |
| VIII | $L_8$ | $R_8 = +10.250$ | $d_8 = 0.1697$ | $n_8 = 1.721$ | |
| | | $R'_8 = -3.4884$ | | | |
| | | | $s_{89} = 0.0044$ | | |
| IX | $L_9$ | $R_9 = +5.1200$ | $d_9 = 0.1960$ | $n_9 = 1.787$ | |
| | | $R'_9 = -2.543163$ | | | |

Aspherical surfaces: $R_{4b}$ with $c_1 = (2 \cdot R_{4b})^{-1}$, $c_2 = -1.390\ 4948 \cdot 10^{-2}$, $c_3 = -1.532\ 5255 \cdot 10^{-2}$, $c_4 = c_5 = 0$
$R_9$ with $c_1 = (2 \cdot R_9)^{-1}$, $c_2 = -4.405\ 4084 \cdot 10^{-2}$, $c_3 = c_4 = c_5 = 0$.

Figure 7:
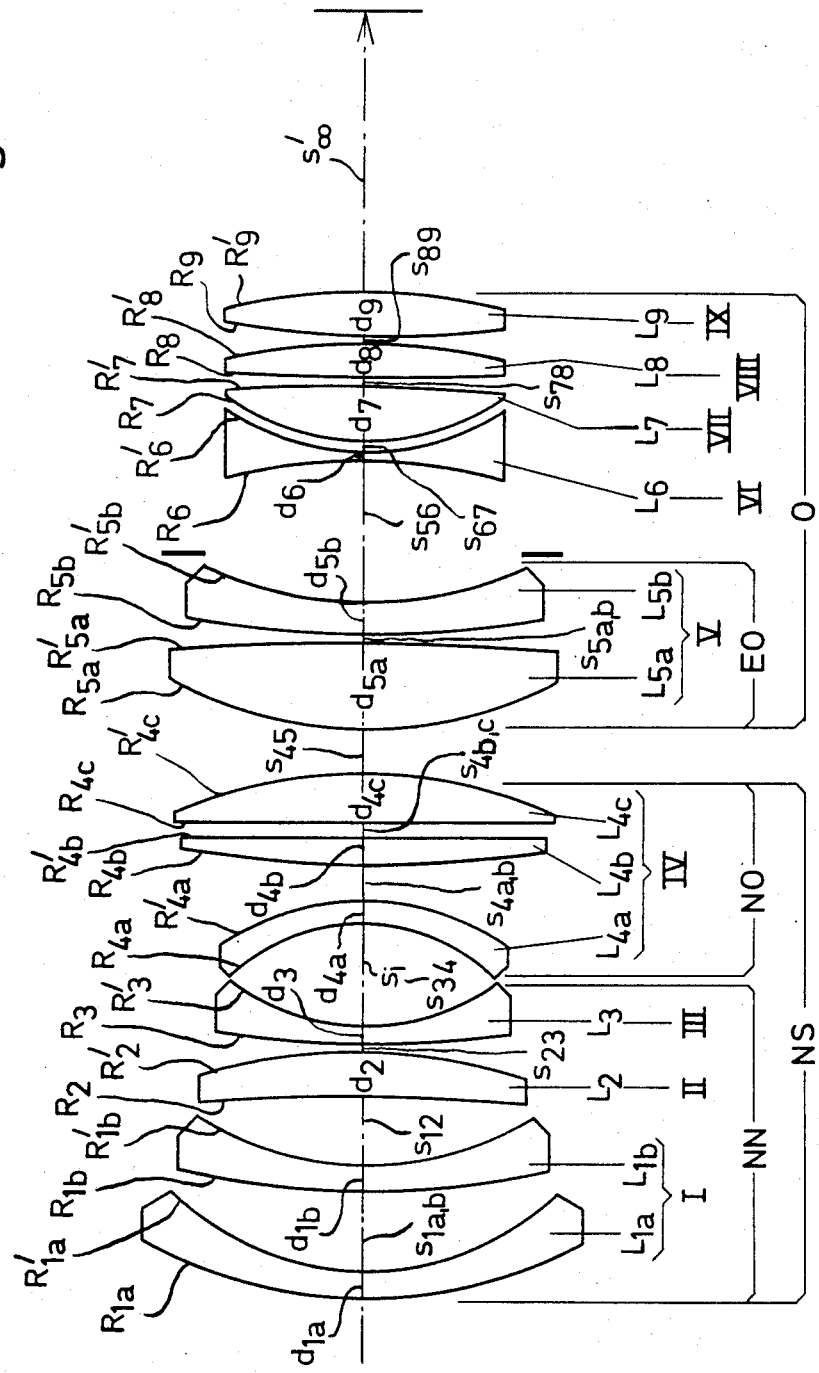

Example 8 (FIG. 7)

F = 1.00000   f/1.33   $2\omega_e = 62°$   $s'_\omega = +1.38445$ F
Diameter of entrance pupil = 0.752 F   $\Phi_{NS} = +0.0300\ \Phi$

| Lens | | Radii | Thicknesses and spacings | N | |
|---|---|---|---|---|---|
| I | $L_{1a}$ | $R_{1a} = +2.3360$ | $d_{1a} = 0.1309$ | $n_{1a} = 1.623$ | |
| | | $R'_{1a} = +1.4320$ | $s_{1a,b} = 0.3686$ | | |
| | $L_{1b}$ | $R_{1b} = +4.2120$ | $d_{1b} = 0.1366$ | $n_{1b} = 1.624$ | |
| | | $R'_{1b} = +1.7280$ | | | |
| | | | $s_{12} = 0.3222$ | | NN |
| II | $L_2$ | $R_2 = -9.3050$ | $d_2 = 0.2140$ | $n_2 = 1.641$ | |
| | | $R'_2 = -2.8230$ | | | |
| | | | $s_{23} = 0.0196$ | | |
| III | $L_3$ | $R_3 = +5.8930$ | $d_3 = 0.0878$ | $n_3 = 1.713$ | |
| | | $R'_3 = +1.1080$ | | | |
| | | | $s_f = s_{34} = 0.4851$ | | NS |
| IV | $L_{4a}$ | $R_{4a} = -0.9890$ | $d_{4a} = 0.1188$ | $n_{4a} = 1.661$ | |
| | | $R'_{4a} = -1.2780$ | $s_{4a,b} = 0.1647$ | | |
| | $L_{4b}$ | $R_{4b} = +4.8870$ | $d_{4b} = 0.1160$ | $n_{4b} = 1.788$ | NO |
| | | $R'_{4b} = \pm$plan | $s_{4b,c} = 0.06819$ | | |
| | $L_{4c}$ | $R_{4c} = \pm$plan | $d_{4c} = 0.1788$ | $n_{4c} = 1.788$ | |
| | | $R'_{4c} = -2.2900$ | | | |
| | | | $s_{45} = 0.18821$ | | |

-continued

Example 8 (FIG. 7)

$F = 1.00000$   $f/1.33$   $2\omega_o = 62°$   $s'_\infty = +1.38445\ F$
Diameter of entrance pupil = 0.752 F   $\Phi_{NS} = +0.0300\ \Phi$

| Lens | | Radii | Thicknesses and spacings | N | |
|---|---|---|---|---|---|
| V | $L_{5a}$ | $R_{5a} = +1.8900$ | $d_{5a} = 0.3710$ | $n_{5a} = 1.744$ | |
| | | $R'_{5a} = -13.200$ | $s_{5a,b} = 0.0096$ | | EO |
| | $L_{5b}$ | $R_{5b} = +5.6820$ | $d_{5b} = 0.1554$ | $n_{5b} = 1.795$ | |
| | | $R'_{5b} = +2.1050$ | $CS = s_{56} = 0.6610$ | | |
| VI $L_6$ | | $R_6 = -3.1210$ | $d_6 = 0.0648$ | $n_6 = 1.805$ | |
| | | $R'_6 = +1.1790$ | $s_{67} = 0$ | | O |
| VII $L_7$ | | $R_7 = +1.1790$ | $d_7 = 0.3147$ | $n_7 = 1.510$ | |
| | | $R'_7 = -6.0500$ | $s_{78} = 0.0044$ | | |
| VIII $L_8$ | | $R_8 = +9.3050$ | $d_8 = 0.1500$ | $n_8 = 1.720$ | |
| | | $R'_8 = -3.6060$ | $s_{89} = 0.0052$ | | |
| IX $L_9$ | | $R_9 = +5.12012$ | $d_9 = 0.1960$ | $n_9 = 1.788$ | |
| | | $R'_9 = -2.54700$ | | | |

Aspherical surfaces: $R_{5b}$ with $c_1 = (2 \cdot R_{5b})^{-1}$, $c_2 = -1.390\ 4948 \cdot 10^{-2}$, $c_3 = -1.532\ 5255 \cdot 10^{-3}$, $c_4 = c_5 = 0$
$R_9$ with $c_1 = (2 \cdot R_9)^{-1}$, $c_2 = -4.405\ 4084 \cdot 10^{-2}$, $c_3 = c_4 = c_5 = 0$.

Figure 8:
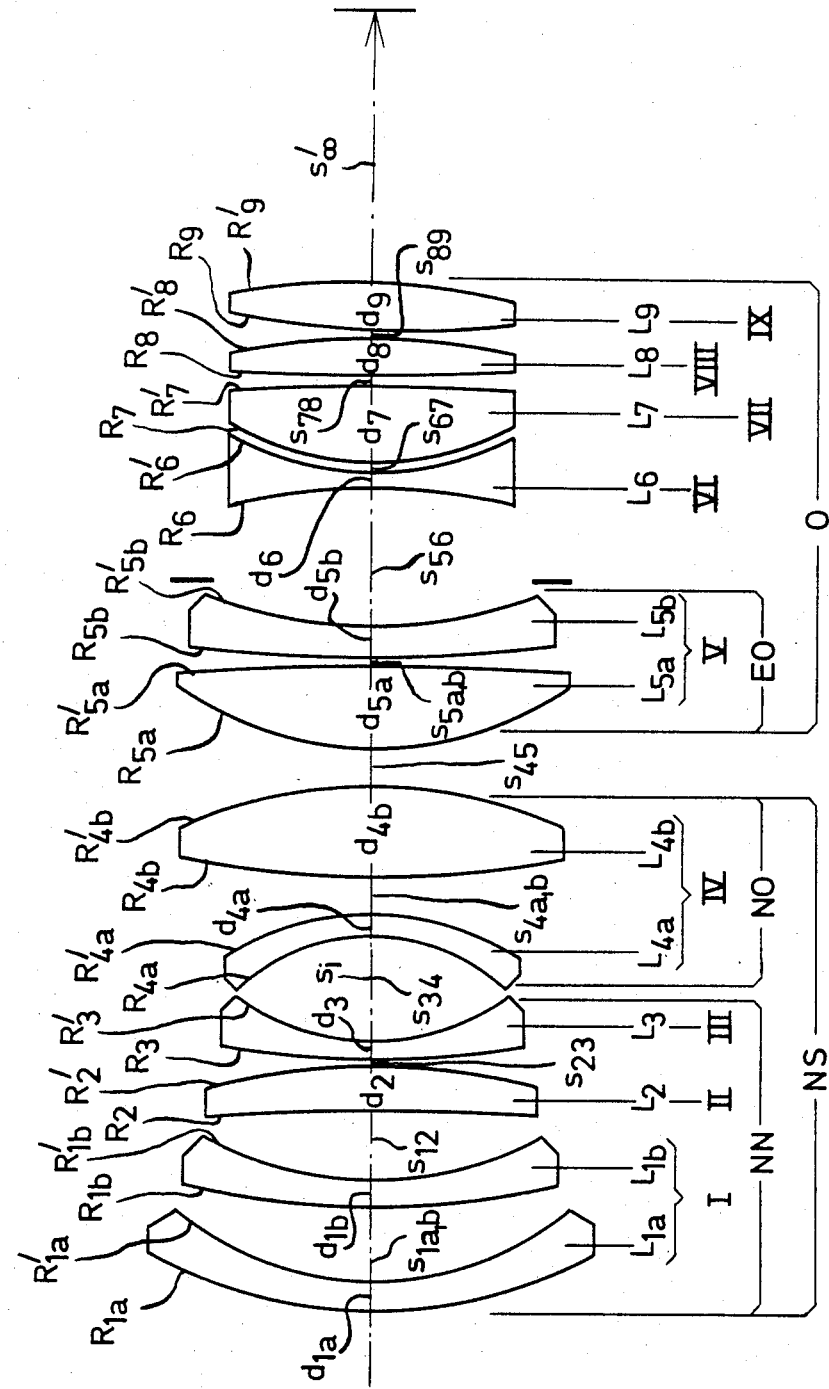

Example 9 (FIG. 8)

$F = 1.00000$   $f/1.30$   $2\omega_o = 62°$   $s'_\infty = +1.38442\ F$
Diameter of entrance pupil = 0.769 F   $\Phi_{NS} = 0$ (telezent.)

| Lens | | Radii | Thicknesses and spacings | N | |
|---|---|---|---|---|---|
| I | $L_{1a}$ | $R_{1a} = +2.3250$ | $d_{1a} = 0.1300$ | $n_{1a} = 1.620$ | |
| | | $R'_{1a} = +1.4200$ | $s_{1a,b} = 0.3685$ | | |
| | $L_{1b}$ | $R_{1b} = +4.2000$ | $d_{1b} = 0.1367$ | $n_{1b} = 1.625$ | |
| | | $R'_{1b} = +1.8000$ | $s_{12} = 0.3322$ | | NN |
| II $L_2$ | | $R_2 = -8.0000$ | $d_2 = 0.2140$ | $n_2 = 1.670$ | |
| | | $R'_2 = -3.0000$ | $s_{23} = 0.0200$ | | NS |
| III $L_3$ | | $R_3 = +6.0000$ | $d_3 = 0.0880$ | $n_3 = 1.713$ | |
| | | $R'_3 = +1.1080$ | $s_f = s_{34} = 0.4781$ | | |
| IV | $L_{4a}$ | $R_{4a} = -1.0000$ | $d_{4a} = 0.1200$ | $n_{4a} = 1.670$ | |
| | | $R'_{4a} = -1.3000$ | $s_{4a,b} = 0.1650$ | | NO |
| | $L_{4b}$ | $R_{4b} = +4.5000$ | $d_{4b} = 0.4113$ | $n_{4b} = 1.788$ | |
| | | $R'_{4b} = -2.4290$ | $s_{45} = 0.2060$ | | |
| V | $L_{5a}$ | $R_{5a} = +1.8300$ | $d_{5a} = 0.3833$ | $n_{5a} = 1.744$ | |
| | | $R'_{5a} = -13.150$ | $s_{5a,b} = 0.0100$ | | EO |
| | $L_{5b}$ | $R_{5b} = +5.6800$ | $d_{5b} = 0.1550$ | $n_{5b} = 1.795$ | |
| | | $R'_{5b} = +2.1070$ | $CS = s_{56} = 0.6610$ | | |
| VI $L_6$ | | $R_6 = -3.1200$ | $d_6 = 0.0620$ | $n_6 = 1.805$ | |
| | | $R'_6 = +1.3000$ | $s_{67} = 0$ | | O |
| VII $L_7$ | | $R_7 = +1.3000$ | $d_7 = 0.4247$ | $n_7 = 1.520$ | |

-continued

Example 9 (FIG. 8)

F = 1.00000  f/1.30  $2\omega_e = 62°$  $s'_\infty = +1.38442$ F
Diameter of entrance pupil = 0.769 F  $\Phi_{NS} = 0$ (telezent.)

| Lens | Radii | Thicknesses and spacings | N |
|---|---|---|---|
|  | $R'_7 = -9.6900$ |  |  |
|  |  | $s_{78} = 0.0044$ |  |
| VIII $L_8$ | $R_8 = +9.6900$ | $d_8 = 0.1695$ | $n_8 = 1.720$ |
|  | $R'_8 = -3.5500$ |  |  |
|  |  | $s_{89} = 0.0040$ |  |
| IX $L_9$ | $R_9 = +5.1200$ | $d_9 = 0.19597$ | $n_9 = 1.788$ |
|  | $R'_9 = -2.5472$ |  |  |

Aspherical surfaces: $R_{4b}$ with $c_1 = (2 \cdot R_{4b})^{-1}$, $c_2 = -1.390\ 4948 \cdot 10^{-2}$, $c_3 = -1.532\ 5255 \cdot 10^{-2}$, $c_4 = c_5 = 0$
$R_9$ with $c_1 = (2 \cdot R_9)^{-1}$, $c_2 = -4.405\ 4084 \cdot 10^{-2}$, $c_3 = c_4 = c_5 = 0$.

Figure 14:
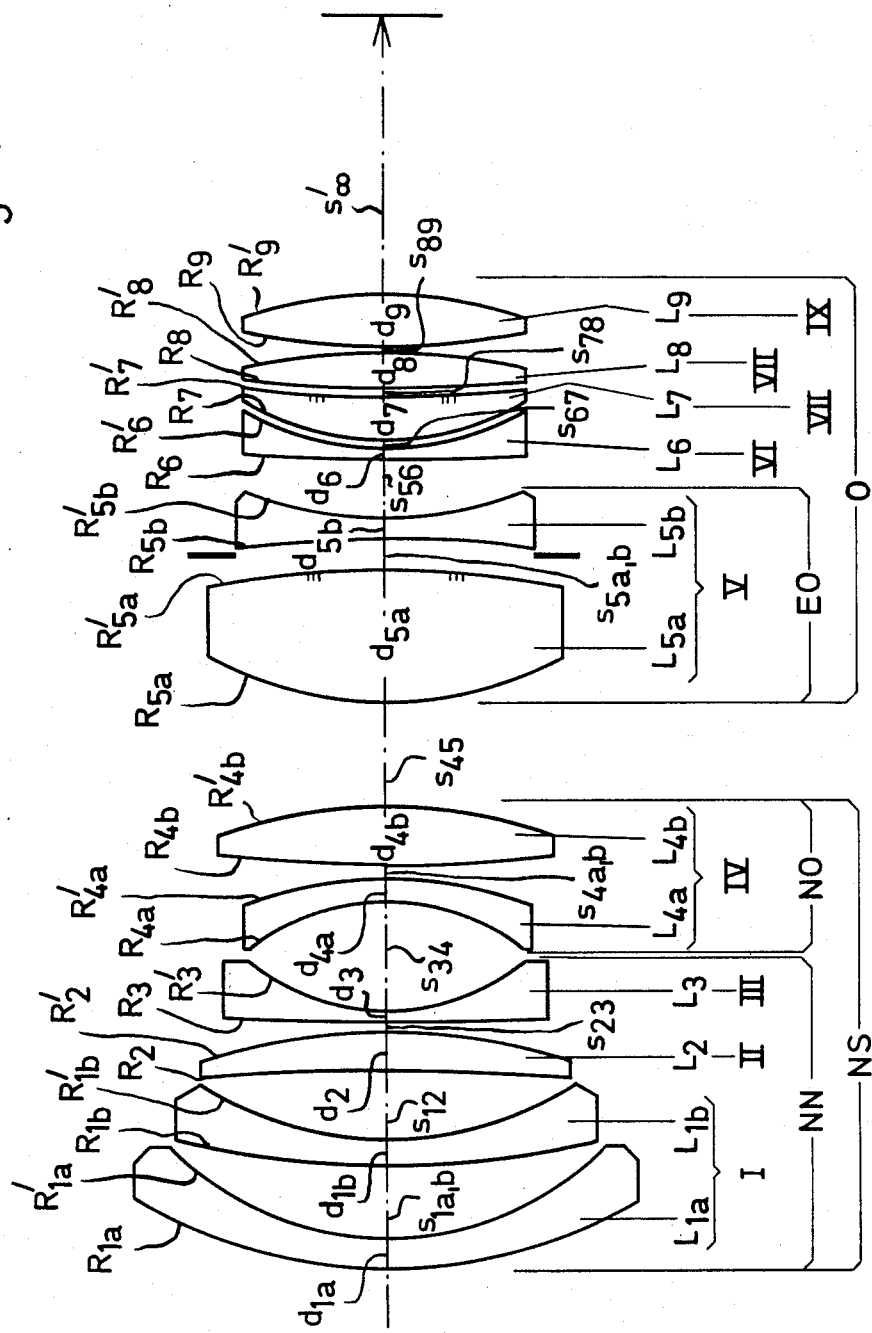

Example 10 (FIG. 14)

F = 1.00000  f/1.27  $2\omega_e = 63°$  $s'_\infty = +1.37988$ F
Diameter of entrance pupil = 0.787 F  $\Phi_{NS} = -0.0599\ \Phi$

| Lens | Radii | Thicknesses and spacings | N | |
|---|---|---|---|---|
| I $\begin{cases} L_{1a} \\ \\ L_{1b} \end{cases}$ | $R_{1a} = +2.47176$ | $d_{1a} = 0.130780$ | $n_{1a} = 1.62299$ | |
|  | $R'_{1a} = +1.43597$ |  |  | |
|  |  | $s_{1a,b} = 0.379206$ |  | |
|  | $R_{1b} = +5.06090$ | $d_{1b} = 0.119586$ | $n_{1b} = 1.57376$ | |
|  | $R'_{1b} = +1.67312$ |  |  | |
|  |  | $s_{12} = 0.327155$ |  | NN |
| II $L_2$ | $R_2 = -12.2972$ | $d_2 = 0.204174$ | $n_2 = 1.68628$ | |
|  | $R'_2 = -2.65889$ |  |  | |
|  |  | $s_{23} = 0.006045$ |  | NS |
| III $L_3$ | $R_3 = +19.9265$ | $d_3 = 0.079438$ | $n_3 = 1.48787$ | |
|  | $R'_3 = +1.03249$ |  |  | |
|  |  | $s_i = s_{34} = 0.513494$ |  | |
| IV $\begin{cases} L_{4a} \\ \\ L_{4b} \end{cases}$ | $R_{4a} = -1.06224$ | $d_{4a} = 0.143429$ | $n_{4a} = 1.66526$ | |
|  | $R'_{4a} = -1.51053$ |  |  | |
|  |  | $s_{4a,b} = 0.006604$ |  | NO |
|  | $R_{4b} = +4.80894$ | $d_{4b} = 0.310924$ | $n_{4b} = 1.75862$ | |
|  | $R'_{4b} = -2.33692$ |  |  | |
|  |  | $s_{45} = 0.486479$ |  | |
| V $\begin{cases} L_{5a} \\ \\ L_{5b} \end{cases}$ | $R_{5a} = +1.78534$ | $d_{5a} = 0.632408$ | $n_{5a} = 1.74400$ | |
|  | $R'_{5a} = -4.53844$ |  |  | |
|  |  | $s_{5a,b} = 0.140780$ |  | EO |
|  | $R_{5b} = -5.04251$ | $d_{5b} = 0.104960$ | $n_{5b} = 1.80975$ | |
|  | $R'_{5b} = +1.92364$ |  |  | |
|  |  | CS = $s_{56}$ = 0.278537 |  | |
| VI $L_6$ | $R_6 = +19.36343$ | $d_6 = 0.075558$ | $n_6 = 1.80518$ | |
|  | $R'_6 = +1.31773$ |  |  | |
|  |  | $s_{67} = 0$ |  | O |
| VII $L_7$ | $R_7 = +1.31773$ | $d_7 = 0.208427$ | $n_7 = 1.51009$ | |
|  | $R'_7 = +7.64015$ |  |  | |
|  |  | $s_{78} = 0.018470$ |  | |
| VIII $L_8$ | $R_8 = +6.67422$ | $d_8 = 0.165331$ | $n_8 = 1.71300$ | |
|  | $R'_8 = -3.70201$ |  |  | |
|  |  | $s_{89} = 0.004403$ |  | |
| IX $L_9$ | $R_9 = +4.36936$ | $d_9 = 0.216561$ | $n_9 = 1.78581$ | |
|  | $R'_9 = -2.11985$ |  |  | |

Aspherical surfaces: $R'_{5a}$ with $c_1 = (2 \cdot R'_{5a})^{-1}$, $c_2 = +3.155\ 8520 \cdot 10^{-2}$, $c_3 = -1.093\ 4658 \cdot 10^{-2}$, $c_4 = c_5 = 0$,
$R'_7$ with $c_1 = (2 \cdot R'_7)^{-1}$, $c_2 = +7.743\ 2718 \cdot 10^{-2}$, $c_3 = c_4 = c_5 = 0$.

Figure 15:
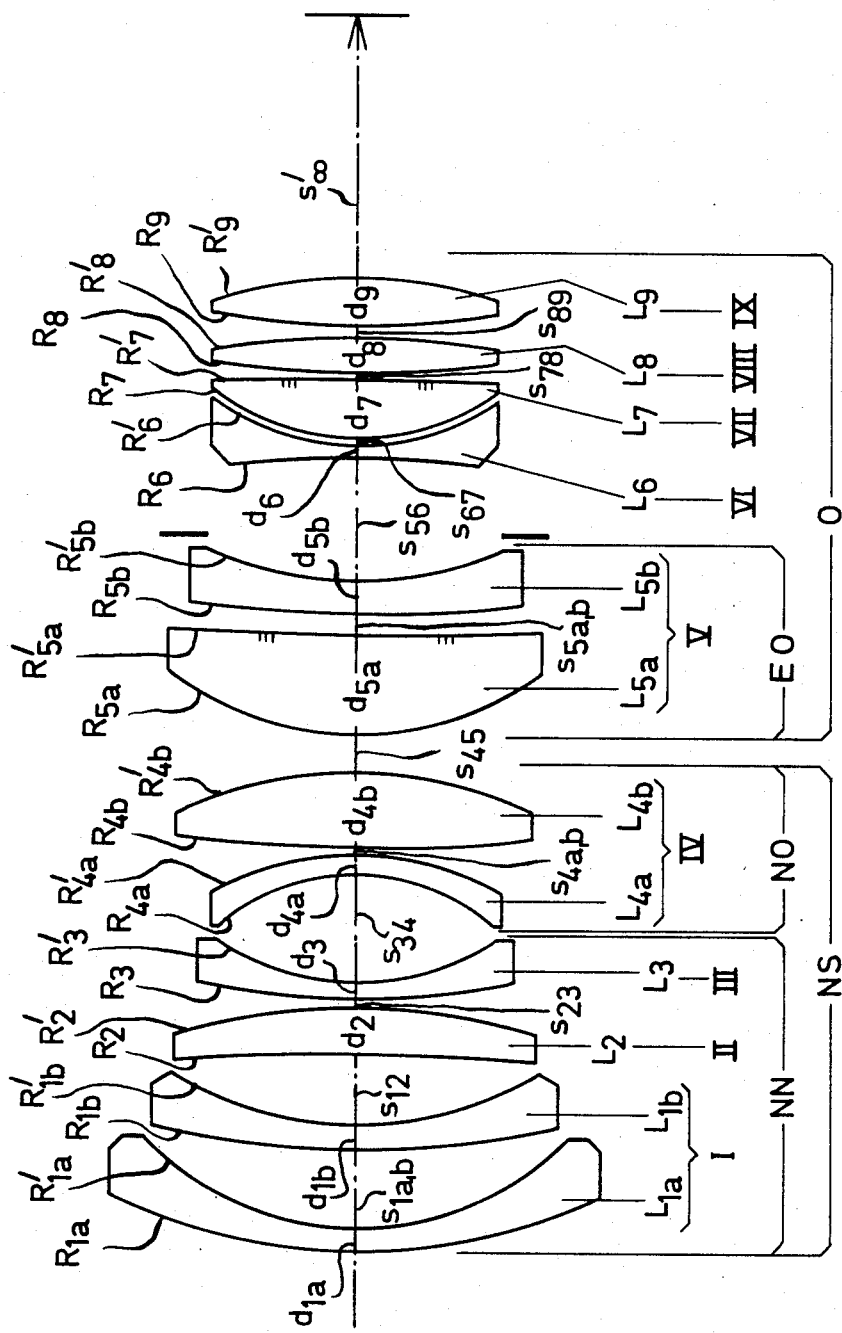

Example 11 (FIG. 15)

$F = 1.00000$   $f/1.27$   $2\omega_o = 71°$   $s'_m = +1.38267\,F$
Diameter of entrance pupil $= 0.787\,F$   $\Phi_{NS} = -0.0905\,\Phi$

| Lens | Radii | Thicknesses and spacings | N | | |
|---|---|---|---|---|---|
| I | $L_{1a}$ $R_{1a} = +2.74796$ | $d_{1a} = 0.113696$ | $n_{1a} = 1.62299$ | | |
|  | $R'_{1a} = +1.38529$ | $s_{1a,b} = 0.396517$ | | | |
|  | $L_{1b}$ $R_{1b} = 4.72779$ | $d_{1b} = 0.113050$ | $n_{1b} = 1.63282$ | | |
|  | $R'_{1b} = +1.62153$ | $s_{12} = 0.336512$ | | NN | |
| II $L_2$ | $R_2 = -9.76130$ | $d_2 = 0.251728$ | $n_2 = 1.70223$ | | |
|  | $R'_2 = -2.55659$ | $s_{23} = 0.003873$ | | | NS |
| III $L_3$ | $R_3 = +5.24780$ | $d_3 = 0.075885$ | $n_3 = 1.59282$ | | |
|  | $R'_3 = +1.14502$ | $s_t = s_{34} = 0.496877$ | | | |
| IV | $L_{4a}$ $R_{4a} = -1.08216$ | $d_{4a} = 0.108446$ | $n_{4a} = 1.73174$ | | |
|  | $R'_{4a} = -1.64005$ | $s_{4a,b} = 0.031053$ | | NO | |
|  | $L_{4b}$ $R_{4b} = +8.23292$ | $d_{4b} = 0.379461$ | $n_{4b} = 1.75711$ | | |
|  | $R'_{4b} = -1.87001$ | $s_{45} = 0.176652$ | | | |
| V | $L_{5a}$ $R_{5a} = +1.56677$ | $d_{5a} = 0.465503$ | $n_{5a} = 1.74400$ | | |
|  | $R'_{5a} = +233.608$ | $s_{5a,b} = 0.079057$ | | EO | |
|  | $L_{5b}$ $R_{5b} = +6.15175$ | $d_{5b} = 0.156555$ | $n_{5b} = 1.71941$ | | |
|  | $R'_{5b} = +1.70231$ | $CS = s_{56} = 0.596110$ | | | |
| VI $L_6$ | $R_6 = -5.99853$ | $d_6 = 0.089333$ | $n_6 = 1.80518$ | | |
|  | $R'_6 = +1.11299$ | $s_{67} = 0$ | | | O |
| VII $L_7$ | $R_7 = +1.11299$ | $d_7 = 0.286056$ | $n_7 = 1.51009$ | | |
|  | $R'_7 = -27.8242$ | $s_{78} = 0.003799$ | | | |
| VIII $L_8$ | $R_8 = +5.38523$ | $d_8 = 0.167282$ | $n_8 = 1.71360$ | | |
|  | $R'_8 = -3.54530$ | $s_{89} = 0.003731$ | | | |
| IX $L_9$ | $R_9 = +5.52585$ | $d_9 = 0.189790$ | $n_9 = 1.78730$ | | |
|  | $R'_9 = -2.37677$ | | | | |

Aspherical surfaces: $R'_{5a}$ with $c_1 = (2 \cdot R'_{5a})^{-1}$, $c_2 = +2.816\,6962 \cdot 10^{-2}$, $c_3 = -7.553\,0319 \cdot 10^{-3}$, $c_4 = c_5 = 0$,
$R'_7$ with $c_1 = (2 \cdot R'_7)^{-1}$, $c_2 = +6.553\,3496 \cdot 10^{-2}$, $c_3 = c_4 = c_5 = 0$.

Figure 9:
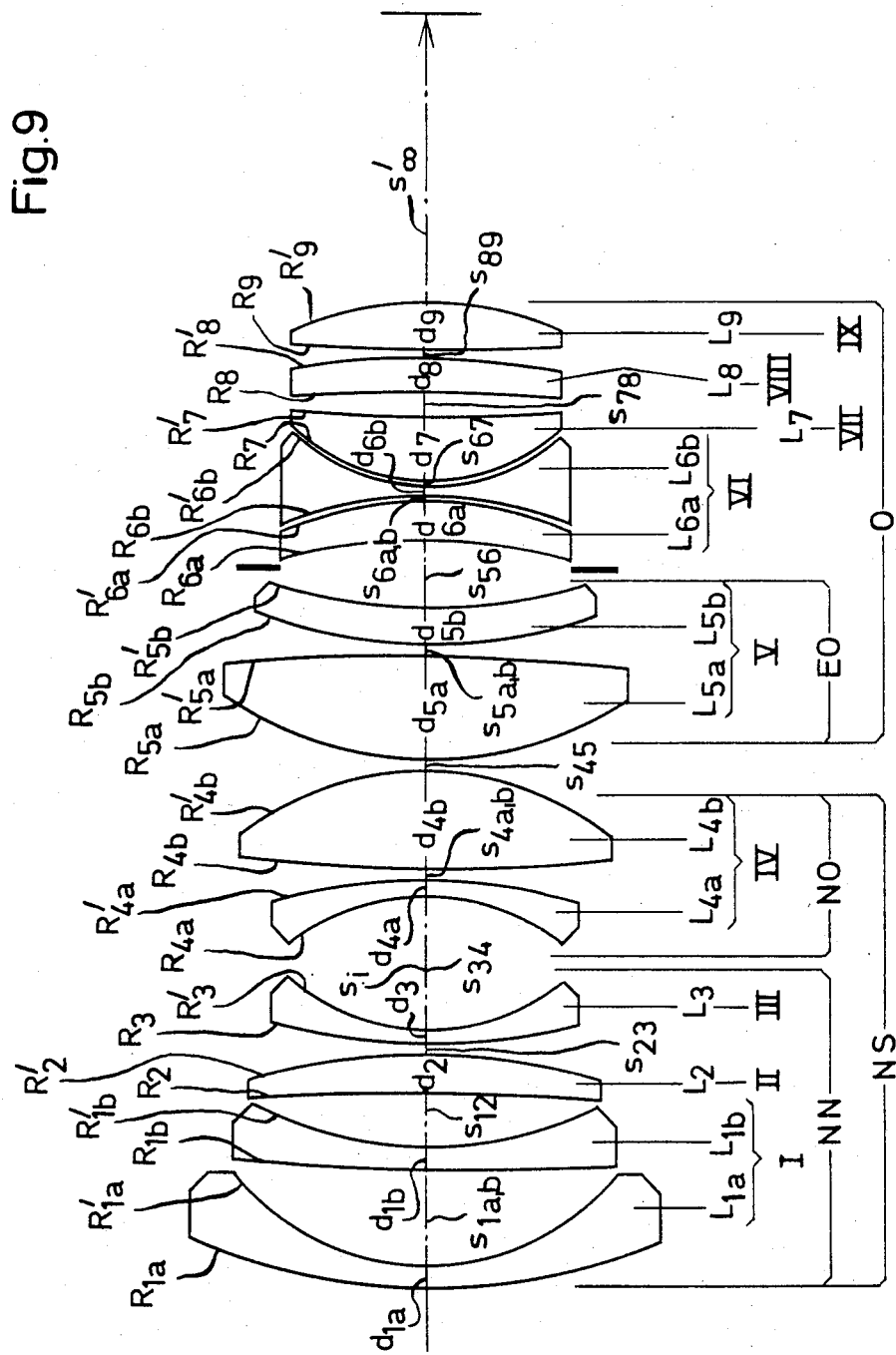

Example 12 (Fig. 9)

$F = 1.00000$   $f/1.25$   $2\omega_o = 78°$   $s'_m = +1.37450\,F$
Diameter of entrance pupil $= 0.800\,F$   $\Phi_{NS} = 0.2405\,\Phi$

| Lens | Radii | Thicknesses and spacings | N | | |
|---|---|---|---|---|---|
| I | $L_{1a}$ $R_{1a} = +3.06439$ | $d_{1a} = 0.102379$ | $n_{1a} = 1.62299$ | | |
|  | $R'_{1a} = +1.23750$ | $s_{1a,b} = 0.440991$ | | | |
|  | $L_{1b}$ $R_{1b} = +10.38196$ | $d_{1b} = 0.125732$ | $n_{1b} = 1.66846$ | | |
|  | $R'_{1b} = +2.10356$ | $s_{12} = 0.262269$ | | NN | |
| II $L_2$ | $R_2 = -9.76062$ | $d_2 = 0.201702$ | $n_2 = 1.74555$ | | |
|  | $R'_2 = -2.47073$ | $s_{23} = 0.005522$ | | | NS |
| III $L_3$ | $R_3 = +2.54629$ | $d_3 = 0.084891$ | $n_3 = 1.54834$ | | |
|  | $R'_3 = +1.11281$ | $s_t = s_{34} = 0.620145$ | | | |

-continued

Example 12 (Fig. 9)
F = 1.00000   f/1.25   $2\omega_e = 78°$   $s'_e = +1.37450$ F
Diameter of entrance pupil = 0.800 F   $\Phi_{NS} = 0.2405 \Phi$

| Lens | Radii | Thicknesses and spacings | N | |
|---|---|---|---|---|
| IV | $L_{4a}$ $R_{4a} = -1.18498$ | $d_{4a} = 0.107960$ | $n_{4a} = 1.65843$ | |
| | $R'_{4a} = -2.07360$ | $s_{4a,b} = 0.016611$ | | NO |
| | $L_{4b}$ $R_{4b} = +7.38277$ | $d_{4b} = 0.494227$ | $n_{4b} = 1.45818$ | |
| | $R'_{4b} = -1.49120$ | $s_{45} = 0.003862$ | | |
| V | $L_{5a}$ $R_{5a} = +1.71860$ | $d_{5a} = 0.524953$ | $n_{5a} = 1.74400$ | |
| | $R'_{5a} = -8.79790$ | $s_{5a,b} = 0.042897 = s_{IN}$ | | EO |
| | $L_{5b}$ $R_{5b} = +2.52240$ | $d_{5b} = 0.164345$ | $n_{5b} = 1.59810$ | |
| | $R'_{5b} = +2.42654$ | CS = $s_{56} = 0.345369$ | | |
| VI | $L_{6a}$ $R_{6a} = -2.26150$ | $d_{6a} = 0.212701$ | $n_{6a} = 1.62109$ | |
| | $R'_{6a} = -1.87031$ | $s_{6a,b} = 0$ | | |
| | $L_{6b}$ $R_{6b} = -1.87031$ | $d_{6b} = 0.067369$ | $n_{6b} = 1.80518$ | O |
| | $R'_{6b} = +0.99891$ | $s_{67} = 0$ | | |
| VII $L_7$ | $R_7 = +0.99891$ | $d_7 = 0.280335$ | $n_7 = 1.62059$ | |
| | $R'_7 = +7.52353$ | $s_{78} = 0.141992$ | | |
| VIII $L_8$ | $R_8 = -12.94667$ | $d_8 = 0.167916$ | $n_8 = 1.74400$ | |
| | $R'_8 = -3.21190$ | $s_{89} = 0.015969$ | | |
| IX $L_9$ | $R_9 = +7.02160$ | $d_9 = 0.239763$ | $n_9 = 1.78742$ | |
| | $R'_9 = -1.72219$ | | | |

Aspherical surfaces: $R'_7$ with $c_1 = (2 \cdot R'_7)^{-1}$, $c_2 = +1.137\,5238 \cdot 10^{-1}$, $c_3 = -9.1802926 \cdot 10^{-2}$, $c_4 = c_5 = 0$,
$R_8$ with $c_1 = (2 \cdot R_8)^{-1}$, $c_2 = -4.471\,3009 \cdot 10^{-2}$, $c_3 = -6.452\,3482 \cdot 10^{-2}$, $c_4 = c_5 = 0$.

Example 13 (FIG. 10)
F = 1.00000   f/1.25   $2\omega_e = 78°$   $s'_e = +1.37760$ F
Diameter of entrance pupil = 0.800 F   $\Phi_{NS} = -0.1180 \Phi$

| Lens | Radii | Thicknesses and spacings | N | |
|---|---|---|---|---|
| I | $L_{1a}$ $R_{1a} = +2.59200$ | $d_{1a} = 0.117052$ | $n_{1a} = 1.62299$ | |
| | $R'_{1a} = +1.32769$ | $s_{1a,b} = 0.418691$ | | |
| | $L_{1b}$ $R_{1b} = +6.22602$ | $d_{1b} = 0.117974$ | $n_{1b} = 1.62354$ | |
| | $R'_{1b} = +1.63444$ | $s_{12} = 0.288116$ | | NN |
| II $L_2$ | $R_2 = -36.16198$ | $d_2 = 0.232183$ | $n_2 = 1.66946$ | |
| | $R'_2 = -2.78970$ | $s_{23} = 0.004672$ | | NS |
| III $L_3$ | $R_3 = +3.77575$ | $d_3 = 0.089881$ | $n_3 = 1.71321$ | |
| | $R'_3 = +1.17608$ | $s_i = s_{34} = 0.531844$ | | |
| IV | $L_{4a}$ $R_{4a} = -1.11123$ | $d_{4a} = 0.186795$ | $n_{4a} = 1.73764$ | |
| | $R'_{4a} = -1.49128$ | $s_{4a,b} = 0.009011$ | | NO |
| | $L_{4b}$ $R_{4b} = +4.21870$ | $d_{4b} = 0.411960$ | $n_{4b} = 1.73270$ | |
| | $R'_{4b} = -2.04042$ | $s_{45} = 0.013735$ | | |
| V | $L_{5a}$ $R_{5a} = +1.43571$ | $d_{5a} = 0.667893$ | $n_{5a} = 1.74400$ | |
| | $R'_{5a} = +4.91662$ | $s_{5a,b} = 0.051485 = s_{IN}$ | | EO |
| | $L_{5b}$ $R_{5b} = +12.54440$ | $d_{5b} = 0.104870$ | $n_{5b} = 1.75644$ | |
| | $R'_{5b} = +1.34195$ | CS = $s_{56} = 0.322004$ | | |
| VI | $L_{6a}$ $R_{6a} = \pm$ plan | $d_{6a} = 0.156762$ | $n_{6a} = 1.54814$ | |
| | $R'_{6a} = -3.11895$ | $s_{6a,b} = 0.079336$ | | O |
| | $R_{6b} = -2.84169$ | | | |

Figure 10:
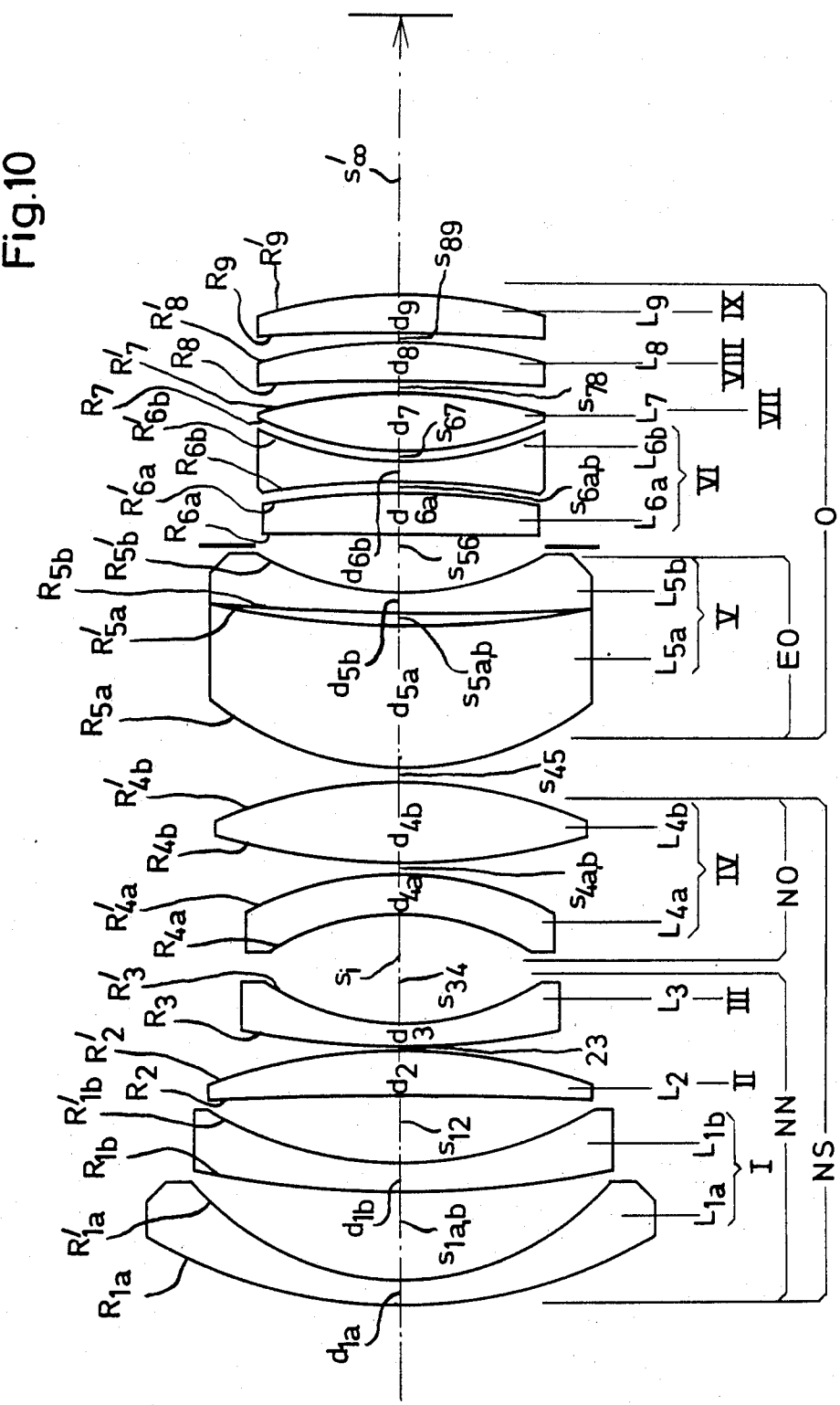

Example 13 (FIG. 10)

$F = 1.00000$   $f/1.25$   $2\omega_e = 78°$   $s'_u = +1.37760\ F$
Diameter of entrance pupil $= 0.800\ F$   $\Phi_{NS} = -0.1180\ \Phi$

| Lens | Radii | Thicknesses and spacings | N |
|---|---|---|---|
| $L_{6b}$ | | $d_{6b} = 0.074429$ | $n_{6b} = 1.80518$ |
| | $R'_{6b} = +1.69106$ | | |
| | | $s_{67} = 0$ | |
| | $R_7 = +1.69106$ | | |
| VII $L_7$ | | $d_7 = 0.320337$ | $n_7 = 1.51009$ |
| | $R'_7 = -2.06825$ | | |
| | | $s_{78} = 0.003780$ | |
| | $R_8 = -21.43097$ | | |
| VIII $L_8$ | | $d_8 = 0.171855$ | $n_8 = 1.71328$ |
| | $R'_8 = -2.47440$ | | |
| | | $s_{89} = 0.004522$ | |
| | $R_9 = -30.57726$ | | |
| IX $L_9$ | | $d_9 = 0.176090$ | $n_9 = 1.71368$ |
| | $R'_9 = -1.93341$ | | |

Aspherical surface $R_{6a}$ with $c_1 = c_4 = c_5 = 0$, $c_2 = -1.984\ 1317 \cdot 10^{-1}$, $c_3 = -2.189\ 7347 \cdot 10^{-2}$

---

Example 14 (FIG. 8)

$F = 1.00000$   $f/1.25$   $2\omega_e = 74°$   $s'_u = +1.37634\ F$
Diameter of entrance pupil $= 0.800\ F$   $\Phi_{NS} = -0.0105\ \Phi$

| Lens | Radii | Thicknesses and spacings | $n_d/\nu_d$ | Bez. |
|---|---|---|---|---|
| I $\{L_{1a}$ | $R_{1a} = +3.47226$ | $d_{1a} = 0.110822$ | 1.62299/58.06 | |
| | $R'_{1a} = +1.39191$ | | | |
| | | $s_{1a,b} = 0.386569$ | | |
| | $R_{1b} = +7.23358$ | | | |
| $\ L_{1b}$ | | $d_{1b} = 0.113060$ | 1.74400/44.77 | |
| | $R'_{1b} = +1.74031$ | | | |
| | | $s_{12} = 0.314181$ | | NN |
| | $R_2 = -9.78625$ | | | |
| II $L_2$ | | $d_2 = 0.201867$ | 1.80518/25.43 | |
| | $R'_2 = -2.49382$ | | | |
| | | $s_{23} = 0.004851$ | | NS |
| | $R_3 = +2.08322$ | | | |
| III $L_3$ | | $d_3 = 0.097762$ | 1.71300/53.85 | |
| | $R'_3 = +1.14642$ | | | |
| | | $s_i = s_{34} = 0.667914$ | | |
| | $R_{4a} = -1.27713$ | | | |
| IV $\{L_{4a}$ | | $d_{4a} = 0.117911$ | 1.72830/28.68 | |
| | $R'_{4a} = -2.00964$ | | | |
| | | $s_{4a,b} = 0.009328$ | | NO |
| | $R_{4b} = +5.82914$ | | | |
| $\ L_{4b}$ | | $d_{4b} = 0.554481$ | 1.57250/57.60 | |
| | $R'_{4b} = -1.59620$ | | | |
| | | $s_{45} = 0.005970$ | | |
| | $R_{5a} = +1.42266$ | | | |
| V $\{L_{5a}$ | | $d_{5a} = 0.493286$ | 1.74400/44.77 | |
| | $R'_{5a} = +26.75841$ | | | |
| | | $s_{5a,b} = 0.070896 = s_{IN}$ | | EO |
| | $R_{5b} = +2.94259$ | | | |
| $\ L_{5b}$ | | $d_{5b} = 0.107090$ | 1.75520/27.58 | |
| | $R'_{5b} = +1.34296$ | | | |
| | | $CS = s_{56} = 0.531346$ | | |
| | $R_6 = -2.51162$ | | | |
| VI $L_6$ | | $d_6 = 0.144031$ | 1.80518/25.43 | |
| | $R'_6 = +1.16310$ | | | |
| | | $s_{67} = 0$ | | O |
| | $R_7 = +1.16310$ | | | |
| VII $L_7$ | | $d_7 = 0.304106$ | 1.53996/59.73 | |
| | $R'_7 = -9.12969$ | | | |
| | | $s_{78} = 0.016791$ | | |
| | $R_8 = +20.38444$ | | | |
| VIII $L_8$ | | $d_8 = 0.162314$ | 1.74400/44.77 | |
| | $R'_8 = -4.00969$ | | | |
| | | $s_{89} = 0.003731$ | | |
| | $R_9 = +6.35608$ | | | |
| IX $L_9$ | | $d_9 = 0.228733$ | 1.78831/47.37 | |
| | $R'_9 = -1.83008$ | | | |

Aspherical surfaces: $R'_{5a}$ with $c_1 = (2 \cdot R'_{5a})^{-1}$, $c_2 = +3.864\ 7311 \cdot 10^{-2}$, $c_3 = -6.078\ 3773 \cdot 10^{-3}$, $c_4 = c_5 = 0$,
$R'_7$ with $c_1 = (2 \cdot R'_7)^{-1}$, $c_2 = +1.177\ 2204 \cdot 10^{-1}$, $c_3 = +6.739\ 1168 \cdot 10^{-2}$, $c_4 = c_5 = 0$.

Figure 11:
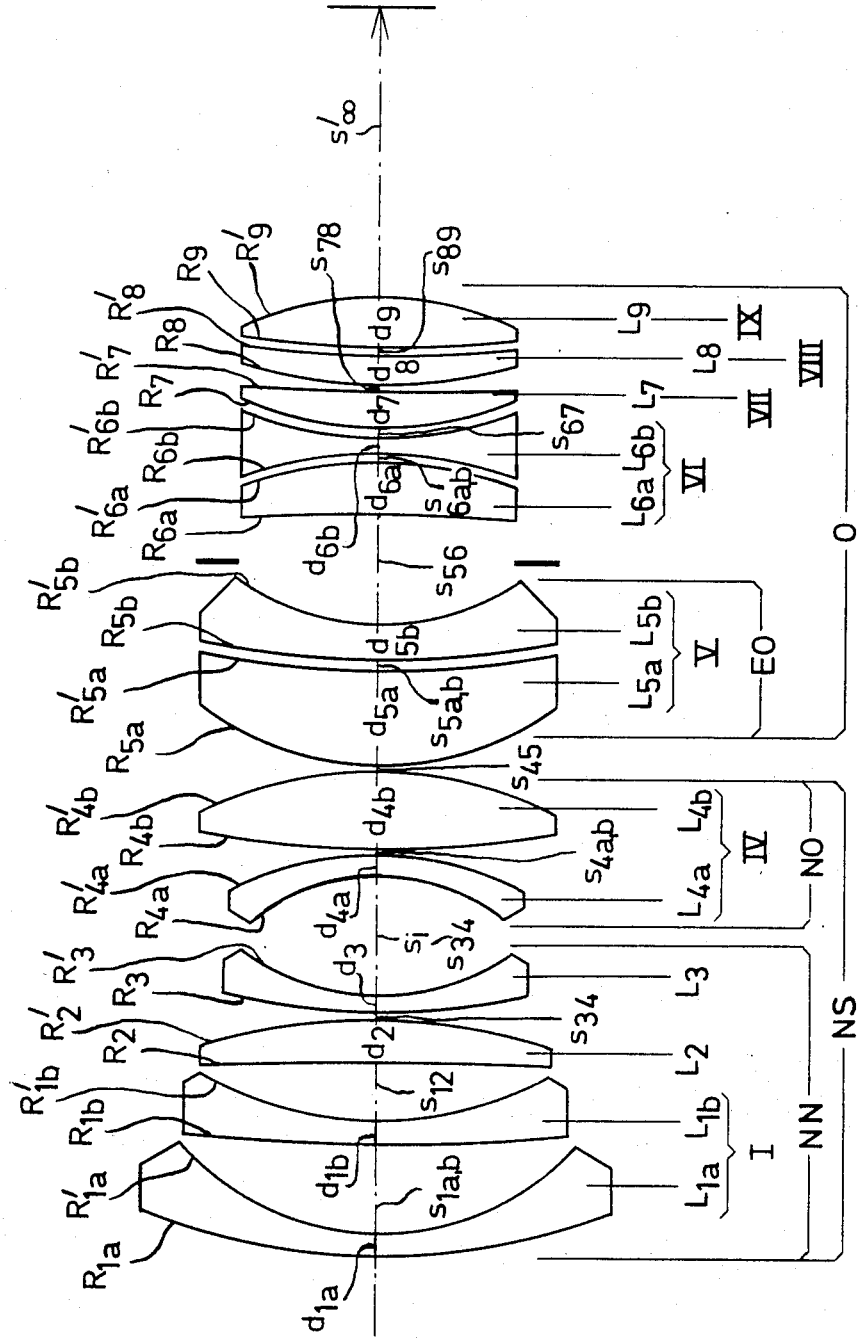

Example 15 (FIG. 11)

F = 1.00000  f/1.25  $2\omega_o = 78°$  $s'_o = +1.37384$ F
Diameter of entrance pupil = 0.800 F  $\Phi_{NS} = +0.622$ $\Phi$

| Lens | Radii | Thicknesses and spacings | $n_d/\nu_d$ | Bez. |
|---|---|---|---|---|
| I  $L_{1a}$ | $R_{1a} = +3.42199$ | $d_{1a} = 0.104456$ | 1.62299/58.06 | |
|  | $R'_{1a} = +1.33320$ | $s_{1a,b} = 0.415587$ | | |
|  $L_{1b}$ | $R_{1b} = +8.84707$ | $d_{1b} = 0.124974$ | 1.62299/58.06 | |
|  | $R'_{1b} = +1.92420$ | $s_{12} = 0.269348$ | | NN |
| II $L_2$ | $R_2 = -14.22209$ | $d_2 = 0.211897$ | 1.71736/29.52 | |
|  | $R'_2 = -2.47531$ | $s_{23} = 0.011192$ | | NS |
| III $L_3$ | $R_3 = +3.11656$ | $d_3 = 0.090653$ | 1.74400/44.77 | |
|  | $R'_3 = +1.21412$ | $s_l = s_{34} = 0.562944$ | | |
| IV $L_{4a}$ | $R_{4a} = -1.06668$ | $d_{4a} = 0.111544$ | 1.76180/26.95 | |
|  | $R'_{4a} = -1.38211$ | $s_{4a,b} = 0.003731$ | | NO |
|  $L_{4b}$ | $R_{4b} = +5.66302$ | $d_{4b} = 0.393949$ | 1.67790/55.20 | |
|  | $R'_{4b} = -1.76505$ | $s_{45} = 0.007088$ | | |
| V $L_{5a}$ | $R_{5a} = +1.46325$ | $d_{5a} = 0.503628$ | 1.74400/44.77 | |
|  | $R'_{5a} = +5.66302$ | $s_{5a,b} = 0$ | | EO |
|  $L_{5b}$ | $R_{5b} = +5.66302$ | $d_{5b} = 0.185410$ | 1.62004/36.37 | |
|  | $R'_{5b} = +1.30473$ | CS = $s_{56} = 0.520789$ | | |
| VI $L_{6a}$ | $R_{6a} = -8.11401$ | $d_{6a} = 0.253306$ | 1.63854/55.38 | |
|  | $R'_{6a} = -2.28707$ | $s_{6a,b} = 0$ | | |
|  $L_{6b}$ | $R_{6b} = -2.28707$ | $d_{6b} = 0.133182$ | 1.80518/25.43 | O |
|  | $R'_{6b} = +1.38211$ | $s_{67} = 0$ | | |
| VII $L_7$ | $R_7 = +1.38211$ | $d_7 = 0.207047$ | 1.58913/61.24 | |
|  | $R'_7 = +11.79684$ | $s_{78} = 0.003731$ | | |
| VIII $L_8$ | $R_8 = +2.49330$ | $d_8 = 0.176456$ | 1.78831/47.37 | |
|  | $R'_8 = +17.30998$ | $s_{89} = 0.017907$ | | |
| IX $L_9$ | $R_9 = +6.82834$ | $d_9 = 0.239503$ | 1.78831/47.37 | |
|  | $R'_9 = -1.65421$ | | | |

Aspherical surfaces: $R_{6a}$ with $c_1 = (2 \cdot R_{6a})^{-1}$, $c_2 = +3.388\ 7542 \cdot 10^{-2}$, $c_3 = +7.045\ 4329 \cdot 10^{-4}$, $c_4 = +2.543\ 9721 \cdot 10^{-4}$, $c_5 = 0$.
$R'_9$ with $c_1 = (2 \cdot R'_9)^{-1}$, $c_2 = +1.175\ 3002 \cdot 10^{-1}$, $c_3 = -1.076\ 9779 \cdot 10^{-2}$, $c_4 = c_5 = 0$.

Figure 12:
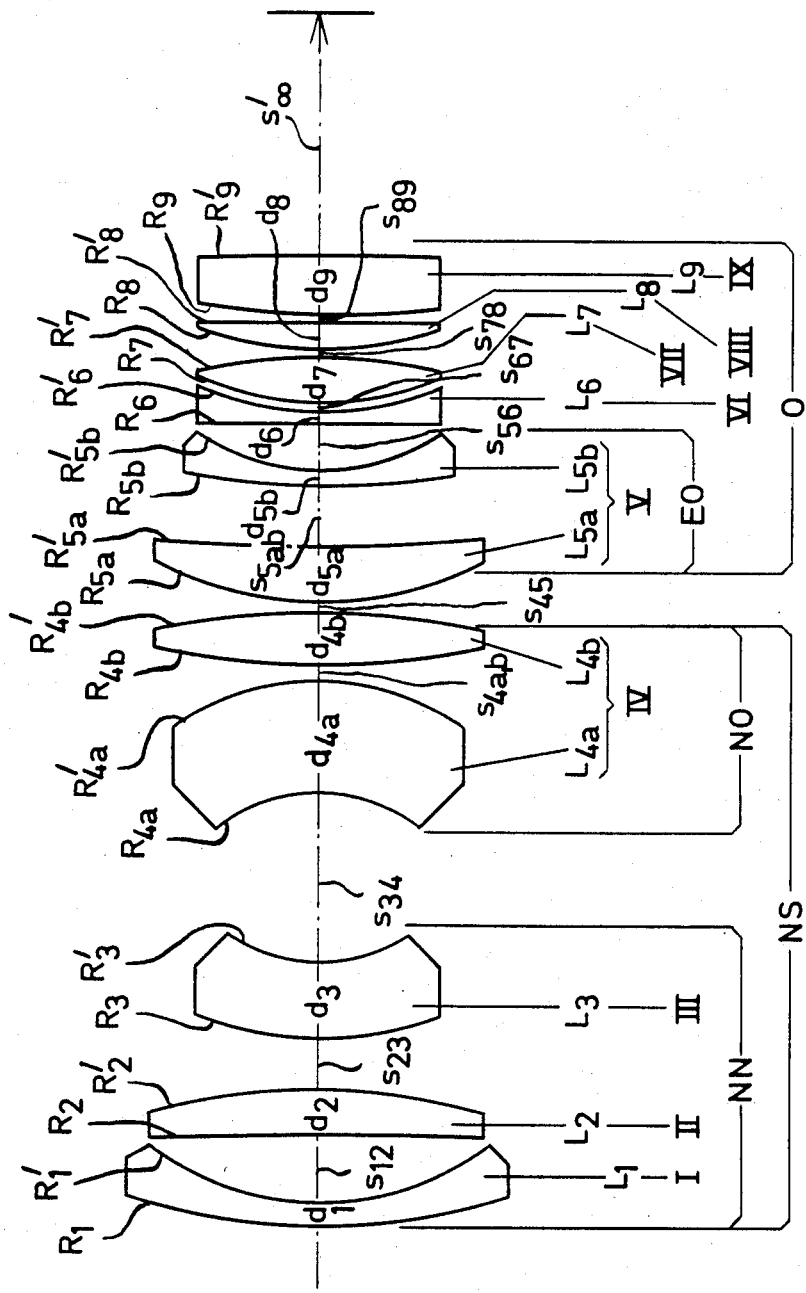

Example 16 (FIG. 12)

F = 1.00000  f/1.03  $2\omega_o = 50°$  $s'_o = +1.6723$ F
Diameter of entrance pupil = 0.970 F  $\Phi_{NS} = -0.12570$ $\Phi$

| Lens | Radii | Thicknesses and spacings | N | |
|---|---|---|---|---|
| I $L_1$ | $R_1 = +3.12540$ | $d_1 = 0.225586$ | $n_1 = 1.69766$ | |
|  | $R'_1 = +1.67740$ | $s_{12} = 0.283246$ | | |
| II $L_2$ | $R_2 = +4.72183$ | $d_2 = 0.804452$ | $n_2 = 1.74855$ | NN |
|  | $R'_2 = -6.03608$ | $s_{23} = 0.202643$ | | |
| III $L_3$ | $R_3 = +2.30430$ | $d_3 = 0.151272$ | $n_3 = 1.78831$ | NS |
|  | $R'_3 = +0.92630$ | $s_l = s_{34} = 0.651910$ | | |
| IV $L_{4a}$ | $R_{4a} = -1.42395$ | $d_{4a} = 1.110675$ | $n_{4a} = 1.58725$ | |
|  | $R'_{4a} = -2.48132$ | $s_{4a,b} = 0.557327$ | | NO |
|  $L_{4b}$ | $R_{4b} = +34.75847$ | $d_{4b} = 0.333179$ | $n_{4b} = 1.58324$ | |
|  | $R'_{4b} = -4.49128$ | $s_{45} = 0.005920$ | | |

-continued

Example 16 (FIG. 12)

F = 1.00000  f/1.03  $2\omega_e = 50°$  $s'_\infty = +1.6723$ F
Diameter of entrance pupil = 0.970 F  $\Phi_{NS} = -0.12570\ \Phi$

| Lens | Radii | Thicknesses and spacings | N | |
|---|---|---|---|---|
| V $\{$ $L_{5a}$ | $R_{5a} = +2.21649$ | $d_{5a} = 0.818633$ | $n_{5a} = 1.66838$ | |
| | $R'_{5a} = -15.46901$ | $s_{5a,b} = 0.257125$ | | EO |
| $L_{5b}$ | $R_{5b} = -40.83014$ | $d_{5b} = 0.145921$ | $n_{5b} = 1.71241$ | |
| | $R'_{5b} = +1.58895$ | $s_{56} = 0.322577$ | | |
| VI $L_6$ | $R_6 = -23.68569$ | $d_6 = 0.107960$ | $n_6 = 1.80518$ | |
| | $R'_6 = +1.86230$ | $s_{67} = 0$ | | O |
| VII $L_7$ | $R_7 = +1.86230$ | $d_7 = 0.664753$ | $n_7 = 1.65750$ | |
| | $R'_7 = -5.57027$ | $s_{78} = 0.003278$ | | |
| VIII $L_8$ | $R_8 = +4.03129$ | $d_8 = 0.315353$ | $n_8 = 1.71228$ | |
| | $R'_8 = -6.81727$ | $s_{89} = 0.001973$ | | |
| IX $L_9$ | $R_9 = +2.15163$ | $d_9 = 0.360637$ | $n_9 = 1.70904$ | |
| | $R'_9 = \pm\text{plan}$ | | | |

Aspherical surface: $R_{4b}$ with $c_1 = (2 \cdot R_{4b})^{-1}$, $c_2 = +3.018\,9030 \cdot 10^{-4}$, $c_3 = c_4 = c_5 = 0$.

Example 17 (FIG. 1)

F = 1.00000  f/1.03  $2\omega_e = 50°$  $s'_\infty = +1.6703$ F
Diameter of entrance pupil = 0.970 F  $\Phi_{NS} = +0.07058\ \Phi$

| Lens | Radii | Thicknesses and spacings | N | |
|---|---|---|---|---|
| I $L_1$ | $R_1 = +3.37508$ | $d_1 = 0.156624$ | $n_1 = 1.67758$ | |
| | $R'_1 = +1.81527$ | $s_{12} = 0.229605$ | | |
| II $L_2$ | $R_2 = +5.13335$ | $d_2 = 0.251159$ | $n_2 = 1.70684$ | NN |
| | $R'_2 = -7.48648$ | $s_{23} = 0.540079$ | | |
| III $L_3$ | $R_3 = +3.09067$ | $d_3 = 0.104627$ | $n_3 = 1.78831$ | NS |
| | $R'_3 = +0.98321$ | $s_l = s_{34} = 1.108094$ | | |
| IV $\{$ $L_{4a}$ | $R_{4a} = -1.05451$ | $d_{4a} = 1.006475$ | $n_{4a} = 1.60156$ | |
| | $R'_{4a} = -1.89550$ | $s_{4a,b} = 0.046315$ | | NO |
| $L_{4b}$ | $R_{4b} = +7.53207$ | $d_{4b} = 0.493897$ | $n_{4b} = 1.64987$ | |
| | $R'_{4b} = -3.57956$ | $s_{45} = 0.003475$ | | |
| V $\{$ $L_{5a}$ | $R_{5a} = +2.22790$ | $d_{5a} = 0.464257$ | $n_{5a} = 1.57938$ | |
| | $R'_{5a} = +8.61454$ | $s_{5a,b} = 0.346597$ | | EO |
| $L_{5b}$ | $R_{5b} = +4.03619$ | $d_{5b} = 0.144828$ | $n_{5b} = 1.80797$ | |
| | $R'_{5b} = +1.76905$ | $s_{56} = 0.327984$ | | |
| VI $L_6$ | $R_6 = +25.48305$ | $d_6 = 0.118495$ | $n_6 = 1.80518$ | |
| | $R'_6 = +1.85408$ | $s_{67} = 0$ | | O |
| VII $L_7$ | $R_7 = +1.85408$ | $d_7 = 0.543889$ | $n_7 = 1.49541$ | |
| | $R'_7 = -4.65393$ | $s_{78} = 0.002205$ | | |
| VIII $L_8$ | $R_8 = +3.29999$ | $d_8 = 0.266631$ | $n_8 = 1.69932$ | |
| | $R'_8 = +139.3801$ | $s_{89} = 0.002272$ | | |
| IX $L_9$ | $R_9 = +2.08234$ | $d_9 = 0.382252$ | $n_9 = 1.60202$ | |
| | $R'_9 = \pm\text{plan}$ | | | |

Aspherical surface: $R_{4b}$ with $c_1 = (2 \cdot R_{4b})^{-1}$, $c_2 = -1.868\,2513 \cdot 10^{-3}$, $c_3 = c_4 = c_5 = 0$.

Figure 13:
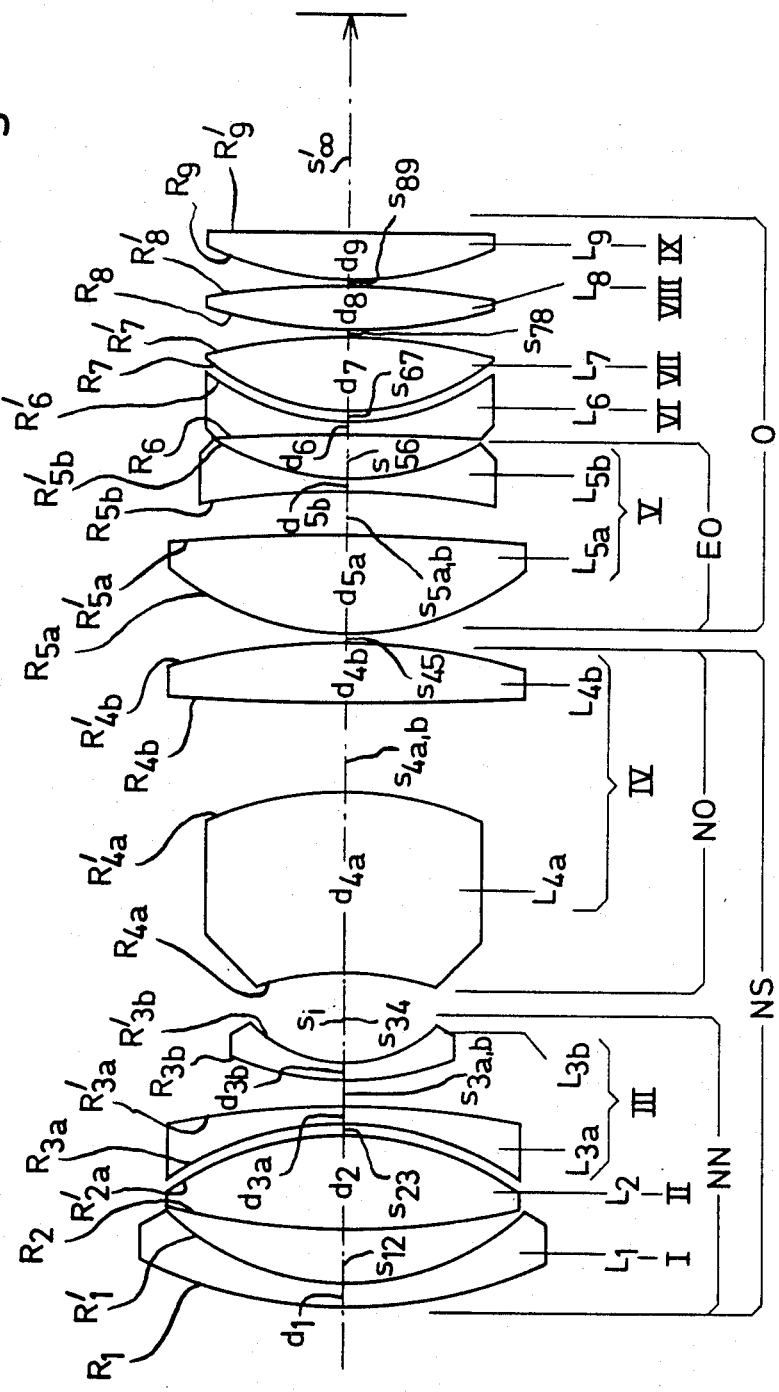

Example 18 (FIG. 13)

F = 1.00000  f/1.03  $2\omega_0 = 60°$  $s'_\infty = +1.5725$ F  
Diameter of entrance pupil = 0.970 F  $\Phi NS = -0.09231 \Phi$

| Lens | Radii | Thicknesses and spacings | N | |
|---|---|---|---|---|
| I L$_1$ | R$_1$ = +3.17554 | d$_1$ = 0.147782 | n$_1$ = 1.74400 | |
| | R'$_1$ = +1.72019 | s$_{12}$ = 0.373225 | | |
| II L$_2$ | R$_2$ = +5.39546 | d$_2$ = 0.683184 | n$_2$ = 1.74400 | |
| | R'$_2$ = -1.82276 | s$_{23}$ = 0 | | NN |
| III {L$_{3a}$ | R$_{3a}$ = -1.82276 | d$_{3a}$ = 0.132500 | n$_{3a}$ = 1.72293 | |
| | R'$_{3a}$ = -6.47118 | s$_{3a,b}$ = 0.186613 | | NS |
| L$_{3b}$ | R$_{3b}$ = +2.19333 | d$_{3b}$ = 0.114355 | n$_{3b}$ = 1.78831 | |
| | R'$_{3b}$ = +0.96524 | s$_i$ = s$_{34}$ = 0.615604 | | |
| IV {L$_{4a}$ | R$_{4a}$ = -1.51067 | d$_{4a}$ = 1.206328 | n$_{4a}$ = 1.56770 | |
| | R'$_{4a}$ = -2.27995 | s$_{4a,b}$ = 0.589354 | | NO |
| L$_{4b}$ | R$_{4b}$ = +76.89089 | d$_{4b}$ = 0.378144 | n$_{4b}$ = 1.58215 | |
| | R'$_{4b}$ = -4.93095 | s$_{45}$ = 0.054395 | | |
| V {L$_{5a}$ | R$_{5a}$ = +1.94227 | d$_{5a}$ = 0.672095 | n$_{5a}$ = 1.76302 | |
| | R'$_{5a}$ = -13.11638 | s$_{5a,b}$ = 0.276209 | | EO |
| L$_{5b}$ | R$_{5b}$ = -6.06972 | d$_{5b}$ = 0.092661 | n$_{5b}$ = 1.84666 | |
| | R'$_{5b}$ = +1.73584 | s$_{56}$ = 0.300766 | | |
| VI L$_6$ | R$_6$ = -17.50515 | d$_6$ = 0.090040 | n$_6$ = 1.81003 | |
| | R'$_6$ = +1.63509 | s$_{67}$ = 0 | | O |
| VII L$_7$ | R$_7$ = +1.63509 | d$_7$ = 0.575886 | n$_7$ = 1.68714 | |
| | R'$_7$ = -3.44805 | s$_{78}$ = 0.002056 | | |
| VIII L$_8$ | R$_8$ = +3.83796 | d$_8$ = 0.271290 | n$_8$ = 1.69782 | |
| | R'$_8$ = -7.65103 | s$_{89}$ = 0.002540 | | |
| IX L$_9$ | R$_9$ = +2.20451 | d$_9$ = 0.291411 | n$_9$ = 1.62890 | |
| | R'$_9$ = ±plan | | | |

Example 19 (FIG. 12)

F = 1.00000  f/1.30  $2\omega_0 = 53.5°$  $s'_\infty = 1.37352$ F  
Diameter of entrance pupil = 0.770 F  $\Phi NS = +0.11921 \Phi$

| Lens | Radii | Thicknesses and spacings | n$_d$/ν$_d$ | Bez. |
|---|---|---|---|---|
| I L$_1$ | R$_1$ = +3.38273 | d$_1$ = 0.139963 | 1.63854/55.38 | |
| | R'$_1$ = +1.61177 | s$_{12}$ = 0.370064 | | |
| II L$_2$ | R$_2$ = -52.57847 | d$_2$ = 0.244159 | 1.67270/32.20 | NN |
| | R'$_2$ = -4.06399 | s$_{23}$ = 0.301373 | | |
| III L$_3$ | R$_3$ = +1.98189 | d$_3$ = 0.406607 | 1.74400/44.77 | NS |
| | R'$_3$ = +0.83213 | s$_i$ = s$_{34}$ = 0.954689 | | |
| IV {L$_{4a}$ | R$_{4a}$ = -1.00073 | d$_{4a}$ = 0.643115 | 1.62299/58.06 | |
| | R'$_{4a}$ = -1.38657 | s$_{4a,b}$ = 0.088154 | | NO |
| L$_{4b}$ | R$_{4b}$ = +4.65051 | d$_{4b}$ = 0.300803 | 1.62299/58.06 | |
| | R'$_{4b}$ = -3.79456 | s$_{45}$ = 0.001678 | | |
| V {L$_{5a}$ | R$_{5a}$ = +1.71929 | d$_{5a}$ = 0.334326 | 1.70181/41.02 | |
| | R'$_{5a}$ = +7.69345 | s$_{5a,b}$ = 0.341608 | | EO |
| L$_{5b}$ | R$_{5b}$ = +5.24069 | d$_{5b}$ = 0.093388 | 1.80518/25.43 | |
| | R'$_{5b}$ = +1.26146 | | | |

-continued

Example 19 (FIG. 12)
F = 1.00000   f/1.30   $2\omega_o$ = 53.5°   $s'_\omega$ = 1.37352 F
Diameter of entrance pupil = 0.770 F   $\Phi NS$ = +0.11921 $\Phi$

| Lens | Radii | Thicknesses and spacings | $n_d/\nu_d$ | Bez. |
|---|---|---|---|---|
| VI $L_6$ | $R_6$ = +7.85137 | $s_{56}$ = 0.211105 | | |
|  | $R'_6$ = +1.57841 | $d_6$ = 0.108288 | 1.80518/25.43 | |
| VII $L_7$ | $R_7$ = +1.57841 | $s_{67}$ = 0 | | O |
|  | $R'_7$ = −2.70741 | $d_7$ = 0.319259 | 1.48749/70.45 | |
| VIII $L_8$ | $R_8$ = +1.87531 | $s_{78}$ = 0.001678 | | |
|  | $R'_8$ = +300.6715 | $d_8$ = 0.181039 | 1.65844/50.88 | |
| IX $L_9$ | $R_9$ = +4.84509 | $s_{89}$ = 0.001678 | | |
|  | $R'_9$ = −23.38907 | $d_9$ = 0.326071 | 1.62299/58.06 | |

Example 20 (FIG. 4)
F = 1.00000   f/1.30   $2\omega_o$ = 60°   $s'_\omega$ = +1.53252 F
Diameter of entrance pupil = 0.770 F   $\Phi_{NS}$ = −0.30684 $\Phi$

| Lens | Radii | Thicknesses and spacings | $n_d/\nu_d$ | Bez. |
|---|---|---|---|---|
| I $L_1$ | $R_1$ = +2.81910 | $d_1$ = 0.138164 | 1.62299/58.06 | |
|  | $R'_1$ = +1.60408 | $s_{12}$ = 0.398024 | | |
| II $L_2$ | $R_2$ = +4.87862 | $d_2$ = 0.332861 | 1.64250/57.94 | NN |
|  | $R'_2$ = −6.62313 | $s_{23}$ = 0.336934 | | |
| III $L_3$ | $R_3$ = +2.25473 | $d_3$ = 0.141277 | 1.74400/44.77 | NS |
|  | $R'_3$ = +0.79371 | $s_3 = s_{34}$ = 0.543265 | | |
| IV { $L_{4a}$ | $R_{4a}$ = −1.38496 | $d_{4a}$ = 0.529119 | 1.62004/36.37 | |
|  | $R'_{4a}$ = −2.72430 | $s_{4a,b}$ = 0.038339 | | NO |
|  $L_{4b}$ | $R_{4b}$ = +10.56737 | $d_{4b}$ = 0.178584 | 1.64250/57.94 | |
|  | $R'_{4b}$ = −3.64117 | $s_{45}$ = 0.2654594 | | |
| V { $L_{5a}$ | $R_{5a}$ = +1.59675 | $d_{5a}$ = 0.285969 | 1.78470/26.08 | |
|  | $R'_{5a}$ = −56.84085 | $s_{5a,b}$ = 0.408633 | | EO |
|  $L_{5b}$ | $R_{5b}$ = −10.07983 | $d_{5b}$ = 0.074812 | 1.80518/25.43 | |
|  | $R'_{5b}$ = +1.33822 | $s_{56}$ = 0.204165 | | |
| VI $L_6$ | $R_6$ = −9.53618 | $d_6$ = 0.068505 | 1.78470/26.08 | |
|  | $R'_6$ = +1.18245 | $s_{67}$ = 0 | | |
| VII $L_7$ | $R_7$ = +1.18245 | $d_7$ = 0.396121 | 1.71300/53.85 | |
|  | $R'_7$ = −2.53940 | $s_{78}$ = 0.002016 | | |
| VIII $L_8$ | $R_8$ = +2.68615 | $d_8$ = 0.209613 | 1.64250/57.94 | |
|  | $R'_8$ = −4.65915 | $s_{89}$ = 0.002016 | | |
| IX $L_9$ | $R_9$ = +2.33476 | $d_9$ = 0.184984 | 1.56384/60.82 | |
|  | $R'_9$ = −7.91351 | | | |

It should be mentioned that in the specific examples which include aspherical surfaces, the value given in the data table for the radius of the aspherical surface refers to the vertex radius of the surface in question, at the axial vertex point at the place of passage of the optical axis.

In order to show the breadth of use of the new principle of design in accordance with the present invention, numerical values for certain partial features of the various examples are given in the following tables I and II. The numerical values given in these tables are the rounded-off results of a multi-place computation by digital electronics. In each case the values are stated with respect to the total equivalent focal length (F) considered as unity, of the entire objective lens system as a whole, or with respect to the total refractive power ($\Phi$) of the entire system. Of course the refractive power is the reciprocal of the focal length, as well understood in the art.

From the numerical values of the individual focal length ($f_{NN}$) of the Newtonian negative component (NN) on the one hand, and the air lens refractive power ($\phi_l$) of the air lens between this group and the following ocular group (NO) on the other hand, it can easily be noted by comparing these two numerical values, with due consideration to their common negative sign, that in fact a very strong divergent ray path prevails within the Newtonian ocular (NO) for the central bundles of rays, which accordingly also continues into the lateral area of the image.

In the last vertical column of table II, there is an indication of which claim or claims, among the first five claims, is intended to relate to the particular example in question. This provides a good view of some of the relationships of different examples to each other, and of the intended scope of the claims which are expressed in general language, as distinguished from claims containing specific tabular data.

Table I

| Example | $f_{NN}$ | $\phi_l$ | $\Phi_{NO} = f_{NO}^{-1}$ | $\lvert V_{NS} \rvert$ |
|---|---|---|---|---|
| 1 | −1.94003 F | −1.63962 Φ | +0.29023 Φ | 0.56305 |
| 2 | −1.94003 F | −1.63962 Φ | +0.29026 Φ | 0.56311 |
| 3 | −1.99610 F | −1.42187 Φ | +0.28782 Φ | 0.57453 |
| 4 | −1.94002 F | −1.63965 Φ | +0.32014 Φ | 0.62108 |
| 5 | −1.99610 F | −1.42187 Φ | +0.06034 Φ | 0.12044 |
| 6 | −1.28338 F | −1.27090 Φ | +0.43228 Φ | 0.55478 |
| 7 | −1.21413 F | −1.31178 Φ | +0.40979 Φ | 0.49754 |
| 8 | −1.21448 F | −1.31185 Φ | +0.40298 Φ | 0.48941 |
| 9 | −1.19776 F | −1.31350 Φ | +0.40018 Φ | 0.47932 |
| 10 | −1.38831 F | −1.09880 Φ | +0.34656 Φ | 0.48113 |
| 11 | −1.32780 F | −1.19392 Φ | +0.32003 Φ | 0.42493 |
| 12 | −1.54644 F | −1.04840 Φ | +0.17432 Φ | 0.26957 |
| 13 | −1.27863 F | −1.27023 Φ | +0.43308 Φ | 0.55375 |
| 14 | −1.51227 F | −1.19220 Φ | +0.29330 Φ | 0.44354 |
| 15 | −1.34987 F | −1.32697 Φ | +0.38991 Φ | 0.52633 |
| 16 | −2.69614 F | −1.26344 Φ | +0.09262 Φ | 0.24970 |
| 17 | −2.21420 F | −1.37224 Φ | +0.22742 Φ | 0.50356 |
| 18 | −2.69800 F | −1.19249 Φ | +0.11249 Φ | 0.30349 |
| 19 | −1.90198 F | −1.51662 Φ | +0.30772 Φ | 0.58528 |
| 20 | −1.95996 F | −1.38506 Φ | +0.08906 Φ | 0.17456 |

Table II

| Example | $\phi_{IN}$ | $f_o$ | Claim Nr. |
|---|---|---|---|
| 1 | +0.21130 Φ | +2.06031 F | 2 |
| 2 | +0.21130 Φ | +2.06031 F | 2 and 4 |
| 3 | −0.01090 Φ | +1.74056 F | 1 and 4 |
| 4 | +0.18549 Φ | +2.11270 F | 2 |
| 5 | −0.09326 Φ | +1.68117 F | 1 |
| 6 | −0.09092 Φ | +2.14998 F | 1,3,5 |
| 7 | +0.19608 Φ | +2.10051 F | 2,3,5 |
| 8 | +0.19628 Φ | +2.13695 F | 2 to 5 |
| 9 | +0.19654 Φ | +2.08629 F | 2,3,5 |
| 10 | +0.00335 Φ | +1.88436 F | 1,3,5 |
| 11 | +0.11634 Φ | +2.01931 F | 1,3,5 |
| 12 | +0.32168 Φ | +2.05755 F | 2,3,5 |
| 13 | −0.09102 Φ | +2.14887 F | 1,3,5 |
| 14 | +0.22884 Φ | +2.20934 F | 2,3,5 |
| 15 | −0.02189 Φ | +2.09041 F | 1,3,5 |
| 16 | +0.02576 Φ | +2.14883 F | 1 and 5 |
| 17 | +0.13293 Φ | +2.46367 F | 1 and 5 |
| 18 | −0.08132 Φ | +2.16950 F | 1 |
| 19 | +0.06242 Φ | +2.33563 F | 1 |
| 20 | −0.06608 Φ | +1.68190 F | 1 |

What is claimed is:

1. An extremely high speed wide angle objective lens system for forming an image of a distant object in front of said system on an image plane in rear of said system, said lens system comprising in succession from front to rear
   1. a diverging group (NN) composed of a plurality of components,
   2. a converging ocular group (NO), and
   3. a main objective group (O) serving to form a real image on said image plane in rear of said main objective group, said diverging group (NN) and said converging ocular group (NO) together forming a Newtonian finder telescope (NS) in the nature of a reverse Galilean telescope, said groups being so formed and dimensioned and so related to each other that
   4. the focal length of said diverging group (NN) is not less than 0.106 and not more than 0.690 times the focal length of said converging ocular group (NO), and
   5. said diverging group (NN) has at least three components,
      i. of which is a negative component having a rear surface which is bounded by air and which is concave toward the rear,
      ii. another of which is a positive component located behind said negative component, and
      iii. another of which is a negative component located behind said positive component and having a rear surface which is concave toward the rear and which constitutes the rearmost surface of said diverging group (NN),
      iv. there being an air lens of diverging action between said first mentioned negative component and said positive component, and an air lens of converging action between said positive component and said other negative component,
   6. said converging ocular group (NO) is spaced rearwardly from said diverging group (NN) to provide between them an air lens of diverging action having a paraxial surface refractive power sum ($\phi_l$) which in negative numerical value is not less than 0.948 and not more than 1.808 times the equivalent refractive power (Φ) of the entire lens system,
   7. said converging ocular group (NO) has a plurality of components spaced axially from each other to provide an air lens of collecting action followed by a positive component, such air lens acting to provide, for a middle bundle of rays, a strongly divergent ray path bent by said positive component to a ray path differing only slightly from a paraxial course,
   8. said main objective group (O) has a plurality of components receiving rays from said converging ocular group (NO) and transmitting them to produce a real image on said image plane, and
   9. said main objective group (O) has a paraxial focal length which is not less than 1.53 and not more than 2.73 times the equivalent focal length of the entire lens system.

2. A lens system as defined in claim 1, wherein said main objective group (O) has an entrance component (EO) at the forward end of said group (O), said entrance component having two adjacent lens elements having an inner neighboring pair of surfaces (IN) which have a collecting surface power sum ($\phi_{IN}$) not less than 0.167 nor more than 0.357 times the equivalent refractive power (Φ) of the entire lens system.

3. A lens system as defined in claim 1, wherein the forward one of said three components of said first diverging group (NN) comprises at least two negative lens elements separated by an air space shaped to provide an air lens of diverging action, through which light rays entering the front of the lens system must pass before entering the next succeeding one of said three components of said diverging group (NN).

4. A lens system as defined in claim 1, wherein said converging ocular group (NO) includes a component split into two adjacent individual lens elements.

spacings being expressed in proportion to the equivalent focal length of the entire system, which is considered as unity:

| | | | | | |
|---|---|---|---|---|---|
| I L$_1$ | R$_1$ = +3.3100 | d$_1$ = 0.14600 | n$_1$ = 1.639 | | |
| | R'$_1$ = +1.6700 | s$_{12}$ = 0.34600 | | | |
| II L$_2$ | R$_2$ = +40.000 | d$_2$ = 0.23700 | n$_2$ = 1.673 | NN | |
| | R'$_2$ = −4.5350 | s$_{23}$ = 0.20140 | | | |
| III L$_3$ | R$_3$ = +1.9710 | d$_3$ = 0.53380 | n$_3$ = 1.744 | NS | |
| | R'$_3$ = +0.7735 | s$_l$ = s$_{34}$ = 0.83250 | | | |
| IV { L$_{4a}$ | R$_{4a}$ = −0.9192 | d$_{4a}$ = 0.61260 | n$_{4a}$ = 1.623 | | |
| | R'$_{4a}$ = −1.35568 | s$_{4a,b}$ = 0.06850 | | NO | |
| | R$_{4b}$ = +4.0000 | d$_{4b}$ = 0.26642 | n$_{4b}$ = 1.623 | | |
| L$_{4b}$ | R'$_{4b}$ = −4.0000 | s$_{45}$ = 0.00638 | | | |
| V { L$_{5a}$ | R$_{5a}$ = +1.7310 | d$_{5a}$ = 0.25246 | n$_{5a}$ = 1.658 | | |
| | R'$_{5a}$ = +5.42638 | s$_{5a,b}$ = 0.33569 | | EO | |
| | R$_{5b}$ = +2.3605 | d$_{5b}$ = 0.14605 | n$_{5b}$ = 1.785 | | |
| L$_{5b}$ | R'$_{5b}$ = +1.1830 | s$_{56}$ = 0.21823 | | | |
| VI L$_6$ | R$_6$ = +11.5687 | d$_6$ = 0.09232 | n$_6$ = 1.805 | | |
| | R'$_6$ = +1.4258 | s$_{67}$ = 0 | | | O |
| VII L$_7$ | R$_7$ = +1.4258 | d$_7$ = 0.30382 | n$_7$ = 1.488 | | |
| | R'$_7$ = −3.06946 | s$_{78}$ = 0.00336 | | | |
| VIII L$_8$ | R$_8$ = +1.8595 | d$_8$ = 0.19465 | n$_8$ = 1.658 | | |
| | R'$_8$ = −12.0749 | s$_{89}$ = 0.00336 | | | |
| IX L$_9$ | R$_9$ = +4.10615 | d$_9$ = 0.16280 | n$_9$ = 1.623 | | |
| | R'$_9$ = −47.4162. | | | | |

5. A lens system as defined in claim 1, wherein at least one individual lens element of the entire lens system has a surface shaped aspherically.

6. A lens system as defined in claim 1, wherein the characteristics of the components of the system and their spatial relationship to each other are substantially in the proportions indicated by the data in the following table, all linear dimensions of radii, thicknesses, and spacings being expressed in proportion to the equivalent focal length of the entire system, which is considered as unity:

7. A lens system as defined in claim 1, wherein the characteristis of the components of the system and their spatial relationship to each other are substantially in the proportions indicated by the data in the following table, all linear dimensions of radii, thicknesses, and spacings being expressed in proportion to the equivalent focal length of the entire system, which is considered as unity:

| | | | | | |
|---|---|---|---|---|---|
| I L$_1$ | R$_1$ = +3.31000 | d$_1$ = 0.14600 | n$_1$ = 1.6390 | | |
| | R'$_1$ = +1.67000 | s$_{12}$ = 0.34600 | | | |
| II L$_2$ | R$_2$ = +40.0000 | d$_2$ = 0.23700 | n$_2$ = 1.6730 | NN | |
| | R'$_2$ = −4.53500 | s$_{23}$ = 0.20140 | | | |
| III L$_3$ | R$_3$ = +1.97100 | d$_3$ = 0.53380 | n$_3$ = 1.7440 | | |
| | R'$_3$ = +0.77350 | s$_l$ = s$_{34}$ = 0.83250 | | NS | |
| IV { L$_{4a}$ | R$_{4a}$ = −0.91920 | d$_{4a}$ = 0.16230 | n$_{4a}$ = 1.6230 | | |
| | R'$_{4a}$ = +10.2000 | s$_{4a,b}$ = 0.0685003 | | | |
| | R$_{4b}$ = +9.38050 | d$_{4b}$ = 0.334851 | n$_{4b}$ = 1.6204 | NO | |
| L$_{4b}$ | R'$_{4b}$ = −1.3728209 | | | | |

-continued

| | | | | |
|---|---|---|---|---|
| | | $s_{4b,c} = 0.0685002$ | | |
| $L_{4c}$ | $R_{4c} = +4.00000$ | $d_{4c} = 0.26642$ | $n_{4c} = 1.6230$ | |
| | $R'_{4c} = -4.00000$ | $s_{45} = 0.006380$ | | |
| V $\{L_{5a}$ | $R_{5a} = +1.73100$ | $d_{5a} = 0.25246$ | $n_{5a} = 1.6580$ | |
| | $R'_{5a} = 5.42638$ | $s_{5a,b} = 0.33569$ | | EO |
| $L_{5b}$ | $R_{5b} = +2.36050$ | $d_{5b} = 0.14605$ | $n_{5b} = 1.7850$ | |
| | $R'_{5b} = +1.18300$ | $s_{56} = 0.21823$ | | |
| VI $L_6$ | $R_6 = +11.56870$ | $d_6 = 0.09232$ | $n_6 = 1.8050$ | |
| | $R'_6 = +1.42580$ | $s_{67} = 0$ | | O |
| VII $L_7$ | $R_7 = +1.42580$ | $d_7 = 0.30382$ | $n_7 = 1.4880$ | |
| | $R'_7 = -3.06946$ | $s_{78} = 0.00336$ | | |
| VIII $L_8$ | $R_8 = 1.85950$ | $d_8 = 0.19465$ | $n_8 = 1.6580$ | |
| | $R'_8 = -12.07490$ | $s_{89} = 0.00336$ | | |
| IX $L_9$ | $R_9 = +4.10615$ | $d_9 = 0.16280$ | $n_9 = 1.6230$ | |
| | $R'_9 = -47.4162.$ | | | |

8. A lens system as defined in claim 1, wherein the characteristics of the components of the system and their spatial relationship to each other are substantially in the proportions indicated by the data in the following table, all linear dimensions of radii, thicknesses, and spacings being expressed in proportion to the equivalent focal length of the entire system, which is considered as unity:

| | | | | |
|---|---|---|---|---|
| I $L_1$ | $R_1 = +3.25586$ | $d_1 = 0.139391$ | $n_1 = 1.62299$ | |
| | $R'_1 = +1.69156$ | $s_{12} = 0.412113$ | | |
| II $L_2$ | $R_2 = +5.78979$ | $d_2 = 0.343428$ | $n_2 = 1.64250$ | NN |
| | $R'_2 = -5.87383$ | $s_{23} = 0.460597$ | | |
| III $L_3$ | $R_3 = +1.99604$ | $d_3 = 0.056565$ | $n_3 = 1.74400$ | |
| | $R'_3 = +0.80039$ | $s_i = s_{34} = 0.569686$ | | NS |
| IV $\{L_{4a}$ | $R_{4a} = -1.25941$ | $d_{4a} = 0.428275$ | $n_{4a} = 1.62004$ | |
| | $R'_{4a} = -1.92550$ | $s_{4a,b} = 0.149492$ | | |
| $L_{4b}$ | $R_{4b} = +3.78696$ | $d_{4b} = 0.164250$ | $n_{4b} = 1.64250$ | NO |
| | $R'_{4b} = $ plan | $s_{4b,c} = 0.010000$ | | |
| $L_{4c}$ | $R_{4c} = +4.050827$ | $d_{4c} = 0.178470$ | $n_{4c} = 1.78470$ | |
| | $R'_{4c} = $ plan | $s_{45} = 0.020000$ | | |
| V $\{L_{5a}$ | $R_{5a} = +4.183696$ | $d_{5a} = 0.624055$ | $n_{5a} = 1.78600$ | |
| | $R'_{5a} = -4.183696$ | $s_{5a,b} = 0.267900$ | | EO |
| $L_{5b}$ | $R_{5b} = -4.050827$ | $d_{5b} = 0.080000$ | $n_{5b} = 1.80518$ | |
| | $R'_{5b} = +1.500270$ | $CS = s_{56} = 0.249073$ | | |
| VI $L_6$ | $R_6 = -8.417200$ | $d_6 = 0.0646458$ | $n_6 = 1.78470$ | |
| | $R'_6 = +1.16357$ | $s_{67} = 0$ | | O |
| VII $L_7$ | $R_7 = +1.16357$ | $d_7 = 0.410093$ | $n_7 = 1.71300$ | |
| | $R'_7 = -2.47696$ | $s_{78} = 0.004040$ | | |
| VIII $L_8$ | $R_8 = +3.84187$ | $d_8 = 0.191916$ | $n_8 = 1.64250$ | |
| | $R'_8 = -3.95403$ | | | |

-continued

|  |  |  | $s_{89} = 0.004040$ |  |
|---|---|---|---|---|
| IX | $L_9$ | $R_9 = +1.96752$ | $d_9 = 0.212117$ | $n_9 = 1.56384$ |
|  |  | $R'_9 = 7.94652$ |  |  |

9. A lens system as defined in claim 1, wherein the characteristis of the components of the system and their spatial relationship to each other are substantially in the proportions indicated by the data in the following table, all linear dimensions of radii, thicknesses, and spacings being expressed in proportion to the equivalent focal length of the entire system, which is considered as unity:

| I | $L_1$ | $R_1 = +3.30888$ | $d_1 = 0.146023$ | 1.63854/55.38 |  |
|---|---|---|---|---|---|
|  |  | $R'_1 = +1.67033$ | $s_{12} = 0.345755$ |  |  |
| II | $L_2$ | $R_2 = +39.89615$ | $d_2 = 0.236994$ | 1.67270/32.20 | NN |
|  |  | $R'_2 = -4.54148$ | $s_{23} = 0.201411$ |  |  |
| III | $L_3$ | $R_3 = +1.97097$ | $d_3 = 0.533739$ | 1.74400/44.77 |  |
|  |  | $R'_3 = 0.77345$ | $s_t = s_{34} = 0.832498$ |  | NS |
| IV | $L_{4a}$ | $R_{4a} = -0.91924$ | $d_{4a} = 0.612625$ | 1.62299/58.06 |  |
|  |  | $R'_{4a} = -1.35576$ | $s_{4a,b} = 0.068815$ |  | NO |
|  | $L_{4b}$ | $R_{4b} = +3.82110$ | $d_{4b} = 0.281975$ | 1.62299/58.06 |  |
|  |  | $R'_{4b} = -3.60727$ | $s_{45} = 0.003357$ |  |  |
| V | $L_{5a}$ | $R_{5a} = +1.73153$ | $d_{5a} = 0.238336$ | 1.65844/50.88 |  |
|  |  | $R'_{5a} = +4.47636$ | $s_{5a,b} = 0.335685$ |  | EO |
|  | $L_{5b}$ | $R_{5b} = 2.35943$ | $d_{5b} = 0.146023$ | 1.78470/26.08 |  |
|  |  | $R'_{5b} = +1.18252$ | $CS = s_{56} = 0.218195$ |  |  |
| VI | $L_6$ | $R_6 = +11.57274$ | $d_6 = 0.092313$ | 1.80518/25.43 |  |
|  |  | $R'_6 = +1.42579$ | $s_{67} = 0$ |  | O |
| VII | $L_7$ | $R_7 = +1.42579$ | $d_7 = 0.302116$ | 1.48749/70.45 |  |
|  |  | $R'_7 = -3.05708$ | $s_{78} = 0.003357$ |  |  |
| VIII | $L_8$ | $R_8 = +1.86073$ | $d_8 = 0.194697$ | 1.65844/50.88 |  |
|  |  | $R'_8 = -12.08331$ | $s_{89} = 0.003357$ |  |  |
| IX | $L_9$ | $R_9 = +4.10610$ | $d_9 = 0.162807$ | 1.62299/58.06 |  |
|  |  | $R'_9 = -47.41549$ |  |  |  |

10. A lens system as defined in claim 1, wherein the characteristics of the components of the system and their spatial relationship to each other are substantially in the proportions indicated by the data in the following table, all linear dimensions of radii, thicknesses, and spacings being expressed in proportion to the equivalent focal length of the entire system, which is considered as unity:

| I | $L_1$ | $R_1 = +3.25586$ | $d_1 = 0.139391$ | 1.62299/58.06 |  |
|---|---|---|---|---|---|
|  |  | $R'_1 = +1.69156$ | $s_{12} = 0.412113$ |  |  |
| II | $L_2$ | $R_2 = +5.78979$ | $d_2 = 0.343428$ | 1.64250/57.94 | NN |
|  |  | $R'_2 = -5.87383$ | $s_{23} = 0.460597$ |  |  |
| III | $L_3$ | $R_3 = +1.99604$ | $d_3 = 0.056565$ | 1.74400/44.77 | NS |
|  |  | $R'_3 = +0.80039$ | $s_t = s_{34} = 0.569686$ |  |  |
|  |  | $R_{4a} = 1.25941$ |  |  |  |

-continued

| | | | | |
|---|---|---|---|---|
| IV | $L_{4a}$ $R'_{4a} = -1.92550$ $R_{4b} = +3.78696$ $L_{4b}$ $R'_{4b} = +117.1978$ | $d_{4a} = 0.428275$ $s_{4a,b} = 0.149492$ $d_{4b} = 0.175754$ $s_{45} = 0.218178$ | 1.62004/36.37 1.64250/57.94 | NO |
| V | $L_{5a}$ $R_{5a} = +1.70381$ $R'_{5a} = -9.44427$ $R_{5b} = -4.56597$ $L_{5b}$ $R'_{5b} = +1.47541$ | $d_{5a} = 0.298984$ $s_{5a,b} = 0.391104$ $d_{5b} = 0.076766$ $CS = s_{56} = 0.183835$ | 1.78470/26.08 1.80518/25.43 | EO |
| VI $L_6$ | $R_6 = -8.41722$ $R'_6 = +1.16357$ | $d_6 = 0.064645$ $s_{67} = 0$ | 1.78470/26.08 | O |
| VII $L_7$ | $R_7 = +1.16357$ $R'_7 = -2.47696$ | $d_7 = 0.410093$ $s_{78} = 0.004040$ | 1.71300/53.85 | |
| VIII $L_8$ | $R_8 = +3.84187$ $R'_8 = -3.95403$ | $d_8 = 0.191916$ $s_{89} = 0.004040$ | 1.64250/57.94 | |
| IX $L_9$ | $R_9 = +1.96752$ $R'_9 = -7.94652$ | $d_9 = 0.212117$ | 1.56384/60.82 | |

11. A lens system as defined in claim 1, wherein the characteristics of the components of the system and their spatial relationship to each other are substantially in the proportions indicated by the data in the following table, all linear dimensions of radii, thicknesses, and spacings being expressed in proportion to the equivalent focal length of the entire system, which is considered as unity:

| | | | | |
|---|---|---|---|---|
| I | $L_{1a}$ $R_{1a} = +2.600$ $R'_{1a} = +4.220$ $L_{1b}$ $R_{1b} = +4.220$ $R'_{1b} = +1.305$ $L_{1c}$ $R_{1c} = +6.200$ $R'_{1c} = +1.630$ | $d_{1a} = 0.162$ $s_{1a,b} = 0.030$ $d_{1b} = 0.078$ $s_{1b,c} = 0.499$ $d_{1c} = 0.090$ $s_{12} = 0.294$ | $n_{1a} = 1.620$ $n_{1b} = 1.630$ $n_{1c} = 1.620$ | NN |
| II $L_2$ | $R_2 = -36.01$ $R'_2 = -2.790$ | $d_2 = 0.232$ $s_{23} = 0.003$ | $n_2 = 1.670$ | NS |
| III $L_3$ | $R_3 = +3.760$ $R'_3 = +1.180$ | $d_3 = 0.0908$ $s_t = s_{34} = 0.534$ | $n_3 = 1.713$ | |
| IV | $L_{4a}$ $R_{4a} = -1.110$ $R'_{4a} = -1.490$ $R_{4b} = +4.220$ $L_{4b}$ $R'_{4b} = -2.030$ | $d_{4a} = 0.186$ $s_{4a,b} = 0.010$ $d_{4b} = 0.411$ $s_{45} = 0.013$ | $n_{4a} = 1.740$ $n_{4b} = 1.730$ | NO |
| V | $L_{5a}$ $R_{5a} = 1.437$ $R'_{5a} = +4.917$ $R_{5b} = +12.55$ $L_{5b}$ $R'_{5b} = +1.342$ | $d_{5a} = 0.667$ $s_{5a,b} = 0.052$ $d_{5b} = 0.105$ $CS = s_{56} = 0.320$ | $n_{5a} = 1.744$ $n_{5b} = 1.756$ | EO |
| VI | $L_{6a}$ $R_{6a} = \pm plan$ $R'_{6a} = -3.119$ $L_{6b}$ $R_{6b} = -2.837$ | $d_{6a} = 0.157$ $s_{6a,b} = 0.079$ $d_{6b} = 0.075$ | $n_{6a} = 1.548$ $n_{6b} = 1.805$ | O |

-continued

|   |   |   |   |   |
|---|---|---|---|---|
|  | $R'_{6b} = +1.691$ | $s_{67} = 0$ |  |  |
| VII $L_7$ | $R_7 = +1.691$ | $d_7 = 0.320$ | $n_7 = 1.510$ |  |
|  | $R'_7 = -2.068$ | $s_{78} = 0.004$ |  |  |
| VIII $L_8$ | $R_8 = -21.43$ | $d_8 = 0.172$ | $n_8 = 1.713$ |  |
|  | $R'_8 = 2.470$ | $s_{89} = 0.004$ |  |  |
| IX $L_9$ | $R_9 = -29.95$ | $d_9 = 0.175$ | $n_9 = 1.713$ |  |
|  | $R'_9 = -1.932329$ |  |  |  |

Aspherical surface $R_{4a}$ with: $c_1 = c_4 = c_5 = 0$, $c_2 = -1.984\ 1448 \cdot 10^{-1}$, $c_3 = -2.189\ 7588 \cdot 10^{-2}$.

12. A lens system as defined in claim 1, wherein the characteristics of the components of the system and their spatial relationship to each other are substantially in the proportions indicated by the data in the following table, all linear dimensions of radii, thicknesses, and spacings being expressed in proportion to the equivalent focal length of the entire system, which is considered as unity:

|   |   |   |   |   |   |
|---|---|---|---|---|---|
| I | $L_{1a}$ | $R_{1a} = +2.3500$ | $d_{1a} = 0.0900$ | $n_{1a} = 1.620$ |  |
|  |  | $R'_{1a} = +8.4100$ | $s_{1a,b} = 0.0100$ |  |  |
|  | $L_{1b}$ | $R_{1b} = +8.4100$ | $d_{1b} = 0.0500$ | $N_{1b} = 1.625$ |  |
|  |  | $R'_{1b} = +1.4000$ | $s_{1b,c} = 0.3613$ |  |  |
|  | $L_{1c}$ | $R_{1c} = +4.2100$ | $d_{1c} = 0.0800$ | $n_{1c} = 1.625$ | NN |
|  |  | $R'_{1c} = +1.7800$ | $s_{12} = 0.3205$ |  |  |
| II | $L_2$ | $R_2 = -8.4100$ | $d_2 = 0.2109$ | $n_2 = 1.670$ |  |
|  |  | $R'_2 = -2.8100$ | $s_{22} = 0.0197$ |  | NS |
| III | $L_3$ | $R_3 = +5.8900$ | $d_3 = 0.0880$ | $n_3 = 1.713$ |  |
|  |  | $R'_3 = +1.1080$ | $s_1 = s_{34} = 0.4850$ |  |  |
| IV | $L_{4a}$ | $R_{4a} = -0.9906$ | $d_{4a} = 0.1189$ | $n_{4a} = 1.662$ |  |
|  |  | $R'_{4a} = -1.2803$ | $s_{4a,b} = 0.1647$ |  | NO |
|  | $L_{4b}$ | $R_{4b} = +4.8876$ | $d_{4b} = 0.4167$ | $n_{4b} = 1.788$ |  |
|  |  | $R'_{4b} = -2.2904$ | $s_{45} = 0.2058$ |  |  |
| V | $L_{5a}$ | $R_{5a} = +1.8900$ | $d_{5a} = 0.3710$ | $n_{5a} = 1.744$ |  |
|  |  | $R'_{5a} = -13.203$ | $s_{5a,b} = 0.0097$ |  | EO |
|  | $L_{5b}$ | $R_{5b} = +5.6822$ | $d_{5b} = 0.1554$ | $n_{5b} = 1.794$ |  |
|  |  | $R'_{5b} = +2.1055$ | $CS = s_{56} = 0.6609$ |  |  |
| VI | $L_6$ | $R_6 = -3.1200$ | $d_6 = 0.0650$ | $n_6 = 1.805$ |  |
|  |  | $R'_6 = +1.1784$ | $s_{67} = 0$ |  | O |
| VII | $L_7$ | $R_7 = +1.1784$ | $d_7 = 0.3148$ | $n_7 = 1.510$ |  |
|  |  | $R'_7 = -6.0511$ | $s_{78} = 0.0044$ |  |  |
| VIII | $L_8$ | $R_8 = +10.250$ | $d_8 = 0.1697$ | $n_8 = 1.721$ |  |
|  |  | $R'_8 = -3.4884$ | $s_{89} = 0.0044$ |  |  |
| IX | $L_9$ | $R_9 = +5.1200$ | $d_9 = 0.1960$ | $n_9 = 1.787$ |  |
|  |  | $R'_9 = -2.543163$ |  |  |  |

Aspherical surfaces: $R_{4b}$ with $c_1 = (2 \cdot R_{4b})^{-1}$, $c_2 = -1.390\ 4948 \cdot 10^{-1}$, $c_3 = -1.532\ 5255 \cdot 10^{-3}$, $c_4 = c_5 = 0$
$R_9$ with $c_1 = (2 \cdot R_9)^{-1}$, $c_2 = -4.405\ 4084 \cdot 10^{-2}$, $c_3 = c_4 = c_5 = 0$.

13. A lens system as defined in claim 1, wherein the characteristics of the components of the system and their spatial relationship to each other are substantially in the proportions indicated by the data in the following table, all linear dimensions of radii, thicknesses, and spacings being expressed in proportion to the equivalent focal length of the entire system, which is considered as unity:

their spatial relationship to each other are substantially in the proportions indicated by the data in the following table, all linear dimensions of radii, thicknesses, and spacings being expressed in proportion to the equivalent focal length of the entire system, which is considered as unity:

| | | | | | | |
|---|---|---|---|---|---|---|
| I | $L_{1a}$ | $R_{1a} = +2.3360$ | $d_{1a} = 0.1309$ | $n_{1a} = 1.623$ | | |
| | | $R'_{1a} = +1.4320$ | $s_{1a,b} = 0.3686$ | | | |
| | $L_{1b}$ | $R_{1b} = +4.2120$ | $d_{1b} = 0.1366$ | $n_{1b} = 1.624$ | | |
| | | $R'_{1b} = +1.7280$ | $s_{12} = 0.3222$ | | NN | |
| II $L_2$ | | $R_2 = -9.3050$ | $d_2 = 0.2140$ | $n_2 = 1.641$ | | |
| | | $R'_2 = -2.8230$ | $s_{23} = 0.0196$ | | | |
| III $L_3$ | | $R_3 = +5.8930$ | $d_3 = 0.0878$ | $n_3 = 1.713$ | | |
| | | $R'_3 = +1.1080$ | $s_i = s_{34} = 0.4851$ | | | NS |
| IV | $L_{4a}$ | $R_{4a} = -0.9890$ | $d_{4a} = 0.1188$ | $n_{4a} = 1.661$ | | |
| | | $R'_{4a} = -1.2780$ | $s_{4a,b} = 0.1647$ | | | |
| | $L_{4b}$ | $R_{4b} = +4.8870$ | $d_{4b} = 0.1160$ | $n_{4b} = 1.788$ | NO | |
| | | $R'_{4b} = \pm\text{plan}$ | $s_{4b,c} = 0.06819$ | | | |
| | $L_{4c}$ | $R_{4c} = \pm\text{plan}$ | $d_{4c} = 0.1788$ | $n_{4c} = 1.788$ | | |
| | | $R'_{4c} = -2.2900$ | $s_{45} = 0.18821$ | | | |
| V | $L_{5a}$ | $R_{5a} = +1.8900$ | $d_{5a} = 0.3710$ | $n_{5a} = 1.744$ | | |
| | | $R'_{5a} = -13.200$ | $s_{5a,b} = 0.0096$ | | EO | |
| | $L_{5b}$ | $R_{5b} = +5.6820$ | $d_{5b} = 0.1554$ | $n_{5b} = 1.795$ | | |
| | | $R'_{5b} = +2.1050$ | $CS = s_{56} = 0.6610$ | | | |
| VI $L_6$ | | $R_6 = -3.1210$ | $d_6 = 0.0648$ | $n_6 = 1.805$ | | |
| | | $R'_6 = +1.1790$ | $s_{67} = 0$ | | | O |
| VII $L_7$ | | $R_7 = +1.1790$ | $d_7 = 0.3147$ | $n_7 = 1.510$ | | |
| | | $R'_7 = -6.0500$ | $s_{78} = 0.0044$ | | | |
| VIII $L_8$ | | $R_8 = +9.3050$ | $d_8 = 0.1500$ | $n_8 = 1.720$ | | |
| | | $R'_8 = -3.6060$ | $s_{89} = 0.0052$ | | | |
| IX $L_9$ | | $R_9 = +5.12012$ | $d_9 = 0.1960$ | $n_9 = 1.788$ | | |
| | | $R'_9 = -2.54700$ | | | | |

Aspherical surfaces: $R_{4b}$ with $c_1 = (2 \cdot R_{4b})^{-1}$, $c_2 = -1.390\ 4948 \cdot 10^{-2}$, $c_3 = -1.532\ 5255 \cdot 10^{-2}$, $c_4 = c_5 = 0$
$R_6$ with $c_1 = (2 \cdot R_6)^{-1}$, $c_2 = -4.405\ 4084 \cdot 10^{-2}$, $c_3 = c_4 = c_5 = 0$.

14. A lens system as defined in claim 1, wherein the characteristics of the components of the system and their spatial relationship to each other are substantially in the proportions indicated by the data in the following table, all linear dimensions of radii, thicknesses, and spacings being expressed in proportion to the equivalent focal length of the entire system, which is considered as unity:

| | | | | | | |
|---|---|---|---|---|---|---|
| I | $L_{1a}$ | $R_{1a} = +2.3250$ | $d_{1a} = 0.1300$ | $n_{1a} = 1.620$ | | |
| | | $R'_{1a} = +1.4200$ | $s_{1a,b} = 0.3685$ | | | |
| | $L_{1b}$ | $R_{1b} = +4.2000$ | $d_{1b} = 0.1367$ | $n_{1b} = 1.625$ | | |
| | | $R'_{1b} = +1.8000$ | $s_{12} = 0.3322$ | | NN | |
| II $L_2$ | | $R_2 = -8.0000$ | $d_2 = 0.2140$ | $n_2 = 1.670$ | | |
| | | $R'_2 = -3.0000$ | $s_{23} = 0.0200$ | | | NS |
| III $L_3$ | | $R_3 = +6.0000$ | $d_3 = 0.0880$ | $n_3 = 1.713$ | | |
| | | $R'_3 = +1.1080$ | $s_i = s_{34} = 0.4781$ | | | |

-continued

| | | | | | |
|---|---|---|---|---|---|
| IV | $L_{4a}$ { $R_{4a} = -1.0000$ $R'_{4a} = -1.3000$ | $d_{4a} = 0.1200$ $s_{4a,b} = 0.1650$ | $n_{4a} = 1.670$ | NO | |
| | $L_{4b}$ { $R_{4b} = +4.5000$ $R'_{4b} = -2.4290$ | $d_{4b} = 0.4113$ $s_{45} = 0.2060$ | $n_{4b} = 1.788$ | | |
| V | $L_{5a}$ { $R_{5a} = +1.8300$ $R'_{5a} = -13.150$ | $d_{5a} = 0.3833$ $s_{5a,b} = 0.0100$ | $n_{5a} = 1.744$ | EO | |
| | $L_{5b}$ { $R_{5b} = +5.6800$ $R'_{5b} = +2.1070$ | $d_{5b} = 0.1550$ $CS = s_{56} = 0.6610$ | $n_{5b} = 1.795$ | | |
| VI | $L_6$ $R_6 = -3.1200$ $R'_6 = +1.3000$ | $d_6 = 0.0620$ $s_{67} = 0$ | $n_6 = 1.805$ | O | |
| VII | $L_7$ $R_7 = +1.3000$ $R'_7 = -9.6900$ | $d_7 = 0.4247$ $s_{78} = 0.0044$ | $n_7 = 1.520$ | | |
| VIII | $L_8$ $R_8 = +9.6900$ $R'_8 = -3.5500$ | $d_8 = 0.1695$ $s_{89} = 0.0040$ | $n_8 = 1.720$ | | |
| IX | $L_9$ $R_9 = +5.1200$ $R'_9 = -2.5472$ | $d_9 = 0.19597$ | $n_9 = 1.788$ | | |

Aspherical surfaces: $R_{4b}$ with $c_1 = (2 \cdot R_{4b})^{-1}$, $c_2 = -1.390\ 4948 \cdot 10^{-2}$, $c_3 = -1.532\ 5255 \cdot 10^{-3}$, $c_4 = c_5 = 0$
$R_9$ with $c_1 = (2 \cdot 9)^{-1}$, $c_2 = -4.405\ 4084 \cdot 10^{-2}$, $c_3 = c_4 = c_5 = 0$.

15. A lens system as defined in claim 1, wherein the characteristics of the components of the system and their spatial relationship to each other are substantially in the proportions indicated by the data in the following table, all linear dimensions of radii, thicknesses, and spacings being expressed in proportion to the equivalent focal length of the entire system, which is considered as unity:

| | | | | | |
|---|---|---|---|---|---|
| I | $L_{1a}$ { $R_{1a} = +2.47176$ $R'_{1a} = +1.43597$ | $d_{1a} + 0.130780$ $s_{1a,b} = 0.379206$ | $n_{1a} = 1.62299$ | | |
| | $L_{1b}$ { $R_{1b} = +5.06090$ $R'_{1b} = +1.67312$ | $d_{1b} = 0.119586$ $s_{12} = 0.327155$ | $n_{1b} = 1.57376$ | NN | |
| II | $L_2$ $R_2 = -12.2972$ $R'_2 = -2.65889$ | $d_2 = 0.204174$ $s_{23} = 0.006045$ | $n_2 = 1.68628$ | | NS |
| III | $L_3$ $R_3 = +19.9265$ $R'_3 = +1.03249$ | $d_3 = 0.079438$ $s_1 = s_{34} = 0.513494$ | $n_3 = 1.48787$ | | |
| IV | $L_{4a}$ { $R_{4a} = -1.06224$ $R'_{4a} = -1.51053$ | $d_{4a} = 0.143429$ $s_{4a,b} = 0.006604$ | $n_{4a} = 1.66526$ | NO | |
| | $L_{4b}$ { $R_{4b} = +4.80894$ $R'_{4b} = -2.33692$ | $d_{4b} = 0.310924$ $s_{45} = 0.486479$ | $n_{4b} = 1.75862$ | | |
| V | $L_{5a}$ { $R_{5a} = +1.78534$ $R'_{5a} = -4.53844$ | $d_{5a} = 0.632408$ $s_{5a,b} = 0.140780$ | $n_{5a} = 1.74400$ | EO | |
| | $L_{5b}$ { $R_{5b} = 5.04251$ $R'_{5b} = +1.92364$ | $d_{5b} = 0.104960$ $CS = s_{56} = 0.278537$ | $n_{5b} = 1.80975$ | | |
| VI | $L_6$ $R_6 = +19.36343$ $R'_6 = +1.31773$ | $d_6 = 0.075558$ $s_{67} = 0$ | $n_6 = 1.80518$ | O | |
| VII | $L_7$ $R_7 = +1.31773$ $R'_7 = +7.64015$ | $d_7 = 0.208427$ | $n_7 = 1.51009$ | | |

-continued

|  |  |  | $s_{78} = 0.018470$ |  |
|---|---|---|---|---|
| VIII | $L_8$ | $R_8 = +6.67422$ | $d_8 = 0.165331$ | $n_8 = 1.71300$ |
|  |  | $R'_8 = -3.70201$ | $s_{89} = 0.004403$ |  |
| IX | $L_9$ | $R_9 = +4.36936$ | $d_9 = 0.216561$ | $n_9 = 1.78581$ |
|  |  | $R'_9 = -2.11985$ |  |  |

Aspherical surfaces: $R'_{5a}$ with $c_1 = (2 \cdot R'_{5a})^{-1}$, $c_2 = +3.155\ 8520 \cdot 10^{-2}$, $c_3 = -1.093\ 4658 \cdot 10^{-2}$, $c_4 = c_5 = 0$, $R'_7$ with $c_1 = (2 \cdot R'_7)^{-1}$, $c_2 = +7.743\ 2718 \cdot 10^{-2}$, $c_3 = c_4 = c_5 = 0$.

16. A lens system as defined in claim 1, wherein the characteristics of the components of the system and their spatial relationship to each other are substantially in the proportions indicated by the data in the following table, all linear dimensions of radii, thicknesses, and spacings being expressed in proportion to the equivalent focal length of the entire system, which is considered as unity:

17. A lens system as defined in claim 1, wherein the characteristics of the components of the system and their spatial relationship to each other are substantially in the proportions indicated by the data in the following table, all linear dimensions of radii, thicknesses, and spacings being expressed in proportion to the equivalent focal length of the entire system, which is considered as unity:

|  |  |  |  |  |  |
|---|---|---|---|---|---|
|  | $L_{1a}$ | $R_{1a} = +2.74796$ | $d_{1a} = 0.113696$ | $n_{1a} = 1.62299$ |  |
|  |  | $R'_{1a} = +1.38529$ |  |  |  |
| I |  |  | $s_{1a,b} = 0.369517$ |  |  |
|  | $L_{1b}$ | $R_{1b} = +4.72779$ | $d_{1b} = 0.113050$ | $n_{1b} = 1.63281$ |  |
|  |  | $R'_{1b} = +1.62153$ |  |  | NN |
|  |  |  | $s_{12} = 0.336512$ |  |  |
| II | $L_2$ | $R_2 = -9.76130$ | $d_2 = 0.251728$ | $n_2 = 1.70223$ |  |
|  |  | $R'_2 = -2.55659$ |  |  | NS |
|  |  |  | $s_{23} = 0.003873$ |  |  |
| III | $L_3$ | $R_3 = +5.24780$ | $d_3 = 0.075885$ | $n_3 = 1.59282$ |  |
|  |  | $R'_3 = +1.14502$ |  |  |  |
|  |  |  | $s_l = s_{34} = 0.496877$ |  |  |
|  | $L_{4a}$ | $R_{4a} = -1.08216$ | $d_{4a} = 0.108446$ | $n_{4a} = 1.73174$ |  |
|  |  | $R'_{4a} = -1.64005$ |  |  |  |
| IV |  |  | $s_{4a,b} = 0.031053$ |  | NO |
|  | $L_{4b}$ | $R_{4b} = +8.23292$ | $d_{4b} = 0.379461$ | $n_{4b} = 1.75711$ |  |
|  |  | $R'_{4b} = -1.87001$ |  |  |  |
|  |  |  | $s_{45} = 0.176652$ |  |  |
|  | $L_{5a}$ | $R_{5a} = +1.56677$ | $d_{5a} = 0.465503$ | $n_{5a} = 1.74400$ |  |
|  |  | $R'_{5a} = +233.608$ |  |  |  |
| V |  |  | $s_{5a,b} = 0.079057$ |  | EO |
|  | $L_{5b}$ | $R_{5b} = +6.15175$ | $d_{5b} = 0.156555$ | $n_{5b} = 1.71941$ |  |
|  |  | $R'_{5b} = +1.70231$ |  |  |  |
|  |  |  | $CS = s_{56} = 0.596110$ |  |  |
| VI | $L_6$ | $R_6 = -5.99853$ | $d_6 = 0.089333$ | $n_6 = 1.80518$ |  |
|  |  | $R'_6 = +1.11299$ |  |  | O |
|  |  |  | $s_{67} = 0$ |  |  |
| VII | $L_7$ | $R_7 = +1.11299$ | $d_7 = 0.286056$ | $n_7 = 1.51009$ |  |
|  |  | $R'_7 = -27.8242$ |  |  |  |
|  |  |  | $s_{78} = 0.003799$ |  |  |
| VIII | $L_8$ | $R_8 = +5.38523$ | $d_8 = 0.167282$ | $n_8 = 1.71360$ |  |
|  |  | $R'_8 = -3.54530$ |  |  |  |
|  |  |  | $s_{89} = 0.003731$ |  |  |
| IX | $L_9$ | $R_9 = +5.52585$ | $d_9 = 0.189790$ | $n_9 = 1.78730$ |  |
|  |  | $R'_9 = -2.37677$ |  |  |  |

Aspherical surfaces: $R'_{5a}$ with $c_1 = (2 \cdot R'_{5a})^{-1}$, $c_2 = +2.816\ 6962 \cdot 10^{-2}$, $c_3 = -7.553\ 0319 \cdot 10^{-2}$, $c_4 = c_5 = 0$, $R'_7$ with $c_1 = (2 \cdot R'_7)^{-1}$, $c_2 = +6.553\ 3496 \cdot 10^{-2}$, $c_3 = c_4 = c_5 = 0$.

|  |  |  |  |
|---|---|---|---|
| $L_{1a}$ | $R_{1a} = +3.06439$ | $d_{1a} = 0.102379$ | $n_{1a} = 1.62299$ |

-continued

| | | | | | |
|---|---|---|---|---|---|
| I | $R'_{1a} = +1.23750$ | $s_{1a,b} = 0.440991$ | | | |
| | $R_{1b} = +10.38196$ | $d_{1b} = 0.125732$ | $n_{1b} = 1.66846$ | | |
| | $R'_{1b} = +2.10356$ | $s_{12} = 0.262269$ | | NN | |
| II $L_2$ | $R_2 = -9.76062$ | $d_2 = 0.201702$ | $n_2 = 1.74555$ | | |
| | $R'_2 = -2.47073$ | $s_{23} = 0.005522$ | | NS | |
| III $L_3$ | $R_3 = +2.54629$ | $d_3 = 0.084891$ | $n_3 = 1.54834$ | | |
| | $R'_3 = +1.11281$ | $s_I = s_{34} = 0.620145$ | | | |
| IV | $L_{4a}$ $R_{4a} = -1.18498$ | $d_{4a} = 0.107960$ | $n_{4a} = 1.65843$ | | |
| | $R'_{4a} = -2.07360$ | $s_{4a,b} = 0.016611$ | | NO | |
| | $L_{4b}$ $R_{4b} = +7.38277$ | $d_{4b} = 0.494227$ | $n_{4b} = 1.45818$ | | |
| | $R'_{4b} = -1.49120$ | $s_{45} = 0.003862$ | | | |
| V | $L_{5a}$ $R_{5a} = +1.71860$ | $d_{5a} = 0.524953$ | $n_{5a} = 1.74400$ | | |
| | $R'_{5a} = -8.79790$ | $s_{5a,b} = 0.042897 = s_{IN}$ | | EO | |
| | $L_{5b}$ $R_{5b} = +2.52240$ | $d_{5b} = 0.164345$ | $n_{5b} = 1.59810$ | | |
| | $R'_{5b} = +2.42654$ | $CS = s_{56} = 0.345369$ | | | |
| VI | $L_{6a}$ $R_{6a} = -2.26150$ | $d_{6a} = 0.212701$ | $n_{6a} = 1.62109$ | | |
| | $R'_{6a} = -1.87031$ | $s_{6a,b} = 0$ | | | |
| | $L_{6b}$ $R_{6b} = -1.87031$ | $d_{6b} = 0.067369$ | $n_{6b} = 1.80518$ | O | |
| | $R'_{6b} = +0.99891$ | $s_{67} = 0$ | | | |
| VII $L_7$ | $R_7 = +0.99891$ | $d_7 = 0.280335$ | $n_7 = 1.62059$ | | |
| | $R'_7 = +7.52353$ | $s_{78} = 0.141992$ | | | |
| VIII $L_8$ | $R_8 = -12.94667$ | $d_8 = 0.167916$ | $n_8 = 1.74400$ | | |
| | $R'_8 = -3.21190$ | $s_{89} = 0.015969$ | | | |
| IX $L_9$ | $R_9 = +7.02160$ | $d_9 = 0.239763$ | $n_9 = 1.78742$ | | |
| | $R'_9 = -1.72219$ | | | | |

Aspherical surfaces: $R'_7$ with $c_1 = (2 \cdot R'_7)^{-1}$, $c_2 = +1.137\ 5238 \cdot 10^{-1}$, $c_3 = -9.1802926 \cdot 10^{-2}$, $c_4 = c_5 = 0$,
$R_8$ with $c_1 = (2 \cdot R_8)^{-1}$, $c_2 = -4.471\ 3009 \cdot 10^{-2}$, $c_3 = -6.452\ 3482 \cdot 10^{-2}$, $c_4 = c_5 = 0$.

18. A lens system as defined in claim 1, wherein the characteristics of the components of the system and their spatial relationship to each other are substantially in the proportions indicated by the data in the following table, all linear dimensions of radii, thicknesses, and spacings being expressed in proportion to the equivalent focal length of the entire system, which is considered as unity:

| | | | | | |
|---|---|---|---|---|---|
| I | $L_{1a}$ $R_{1a} = +2.59200$ | $d_{1a} = 0.117052$ | $n_{1a} = 1.62299$ | | |
| | $R'_{1a} = +1.32769$ | $s_{1a,b} = 0.418691$ | | | |
| | $L_{1b}$ $R_{1b} = +6.22602$ | $d_{1b} = 0.117974$ | $n_{1b} = 1.62354$ | | |
| | $R'_{1b} = +1.63444$ | $s_{12} = 0.288116$ | | NN | |
| II $L_2$ | $R_2 = -36.16198$ | $d_2 = 0.232183$ | $n_2 = 1.66946$ | | |
| | $R'_2 = -2.78970$ | $s_{23} = 0.004672$ | | | NS |
| III $L_3$ | $R_3 = +3.77575$ | $d_3 = 0.089881$ | $n_3 = 1.71321$ | | |
| | $R'_3 = +1.17608$ | $s_I = s_{34} = 0.531844$ | | | |
| IV | $L_{4a}$ $R_{4a} = -1.11123$ | $d_{4a} = 0.186795$ | $n_{4a} = 1.73764$ | | |
| | $R'_{4a} = -1.49128$ | $s_{4a,b} = 0.009011$ | | NO | |
| | $R_{4b} = +4.21870$ | | | | |

| | | | |
|---|---|---|---|
| | | -continued | |
| $L_{4b}$ $R'_{4b} = -2.04042$ | $d_{4b} = 0.411960$ $s_{45} = 0.013735$ | $n_{4b} = 1.73270$ | |
| V $\begin{cases} L_{5a} \\ L_{5b} \end{cases}$ $R_{5a} = +1.43571$ $R'_{5a} = +4.91662$ $R_{5b} = +12.54440$ $R'_{5b} = +1.34195$ | $d_{5a} = 0.667893$ $s_{5a,b} = 0.051485 = s_{IN}$ $d_{5b} = 0.104870$ CS $= s_{56} = 0.322004$ | $n_{5a} = 1.74400$ $n_{5b} = 1.75644$ | EO |
| VI $\begin{cases} L_{6a} \\ L_{6b} \end{cases}$ $R_{6a} = \pm plan$ $R'_{6a} = -3.11895$ $R_{6b} = -2.84169$ $R'_{6b} = +1.69106$ | $d_{6a} = 0.156762$ $s_{6a,b} = 0.079336$ $d_{6b} = 0.074429$ $s_{67} = 0$ | $n_{6a} = 1.54814$ $n_{6b} = 1.80518$ | O |
| VII $L_7$ $R_7 = +1.69106$ $R'_7 = -2.06825$ | $d_7 = 0.320337$ $s_{78} = 0.003780$ | $n_7 = 1.51009$ | |
| VIII $L_8$ $R_8 = -21.43097$ $R'_8 = -2.47440$ | $d_8 = 0.171855$ $s_{89} = 0.004522$ | $n_8 = 1.71328$ | |
| IX $L_9$ $R_9 = -30.57726$ $R'_9 = -1.93341$ | $d_9 = 0.176090$ | $n_9 = 1.71368$ | |

Aspherical surface $R_{6a}$ with $c_1 = c_4 = c_5 = 0$, $c_2 = -1.984\ 1317 \cdot 10^{-1}$, $c_3 = -2.189\ 7347 \cdot 10^{-2}$.

19. A lens system as defined in claim 1, wherein the characteristis of the components of the system and their spatial relationship to each other are substantially in the proportions indicated by the data in the following table, all linear dimensions of radii, thicknesses, and spacings being expressed in proportion to the equivalent focal length of the entire system, which is considered as unity:

| | | | |
|---|---|---|---|
| I $\begin{cases} L_{1a} \\ L_{1b} \end{cases}$ $R_{1a} = +3.47226$ $R'_{1a} = +1.39191$ $R_{1b} = +7.23358$ $R'_{1b} = +1.74031$ | $d_{1a} = 0.110822$ $s_{1a,b} = 0.386569$ $d_{1b} = 0.113060$ $s_{12} = 0.314181$ | 1.62299/58.06 1.74400/44.77 | NN |
| II $L_2$ $R_2 = -9.78625$ $R'_2 = -2.49382$ | $d_2 = 0.201867$ $s_{23} = 0.004851$ | 1.80518/25.43 | NS |
| III $L_3$ $R_3 = +2.08322$ $R'_3 = +1.14642$ | $d_3 = 0.097762$ $s_1 = s_{34} = 0.667914$ | 1.71300/53.85 | |
| IV $\begin{cases} L_{4a} \\ L_{4b} \end{cases}$ $R_{4a} = -1.27713$ $R'_{4a} = -2.00964$ $R_{4b} = +5.82914$ $R'_{4b} = -1.59620$ | $d_{4a} = 0.117911$ $s_{4a,b} = 0.009328$ $d_{4b} = 0.554481$ $s_{45} = 0.005970$ | 1.72830/28.68 1.57250/57.60 | NO |
| V $\begin{cases} L_{5a} \\ L_{5b} \end{cases}$ $R_{5a} = +1.42266$ $R'_{5a} = +26.75841$ $R_{5b} = +2.94259$ $R'_{5b} = +1.34296$ | $d_{5a} = 0.493286$ $s_{5a,b} = 0.070896 = s_{IN}$ $d_{5b} = 0.107090$ CS $= s_{56} = 0.531346$ | 1.74400/44.77 1.75520/27.58 | EO |
| VI $L_6$ $R_6 = -2.51162$ $R'_6 = +1.16310$ | $d_6 = 0.144031$ $s_{67} = 0$ | 1.80518/25.43 | O |
| VII $L_7$ $R_7 = +1.16310$ $R'_7 = -9.12969$ | $d_7 = 0.304106$ $s_{78} = 0.016791$ | 1.53996/59.73 | |

-continued

| | | | |
|---|---|---|---|
| VIII $L_8$ | $R_8 = +20.38444$ | $d_8 = 0.162314$ | 1.74400/44.77 |
| | $R'_8 = -4.00969$ | $s_{89} = 0.003731$ | |
| IX $L_9$ | $R_9 = +6.35608$ | $d_9 = 0.228733$ | 1.78831/47.37 |
| | $R'_9 = -1.83008$ | | |

Aspherical surfaces: $R'_{1a}$ with $c_1 = (2 \cdot R'_{1a})^{-1}$, $c_2 = +3.864\ 7311 \cdot 10^{-2}$, $c_3 = -6.078\ 3773 \cdot 10^{-3}$, $c_4 = c_5 = 0$,
$R'_7$ with $c_1 = (2 \cdot R'_7)^{-1}$, $c_2 = +1.177\ 2204 \cdot 10^{-1}$, $c_3 = +6.739\ 1168 \cdot 10^{-3}$, $c_4 = c_5 = 0$.

20. A lens system as defined in claim 1, wherein the characteristics of the components of the system and their spatial relationship to each other are substantially in the proportions indicated by the data in the following table, all linear dimensions of radii, thicknesses, and spacings being expressed in proportion to the equivalent focal length of the entire system, which is considered as unity:

21. A lens system as defined in claim 1, wherein the characteristics of the components of the system and their spatial relationship to each other are substantially in the proportions indicated by the data in the following table, all linear dimensions of radii, thicknesses, and spacings being expressed in proportion to the equivalent focal length of the entire system, which is considered as unity:

| | | | | |
|---|---|---|---|---|
| I | $L_{1a}$ | $R_{1a} = +3.42199$ | $d_{1a} = 0.104456$ | 1.62299/58.06 |
| | | $R'_{1a} = +1.33320$ | $s_{1a,b} = 0.415587$ | |
| | $L_{1b}$ | $R_{1b} = +8.84707$ | $d_{1b} = 0.124974$ | 1.62299/58.06 |
| | | $R'_{1b} = +1.92420$ | $s_{12} = 0.269348$ | NN |
| II $L_2$ | | $R_2 = -14.22209$ | $d_2 = 0.211897$ | 1.71736/29.52 |
| | | $R'_2 = -2.47531$ | $s_{23} = 0.011192$ | NS |
| III $L_3$ | | $R_3 = +3.11656$ | $d_3 = 0.090653$ | 1.74400/44.77 |
| | | $R'_3 = +1.21412$ | $s_t = s_{34} = 0.562944$ | |
| IV | $L_{4a}$ | $R_{4a} = -1.06668$ | $d_{4a} = 0.111544$ | 1.76180/26.95 |
| | | $R'_{4a} = -1.38211$ | $s_{4a,b} = 0.003731$ | NO |
| | $L_{4b}$ | $R_{4b} = +5.66302$ | $d_{4b} = 0.393949$ | 1.67790/55.20 |
| | | $R'_{4b} = -1.76505$ | $s_{45} = 0.007088$ | |
| V | $L_{5a}$ | $R_{5a} = +1.46325$ | $d_{5a} = 0.503628$ | 1.74400/44.77 |
| | | $R'_{5a} = +5.66302$ | $s_{5a,b} = 0$ | EO |
| | $L_{5b}$ | $R_{5b} = +5.66302$ | $d_{5b} = 0.185410$ | 1.62004/36.37 |
| | | $R'_{5b} = +1.30473$ | $CS = s_{56} = 0.520789$ | |
| VI | $L_{6a}$ | $R_{6a} = -8.11401$ | $d_{6a} = 0.253306$ | 1.63854/55.38 |
| | | $R'_{6a} = -2.28707$ | $s_{6a,b} = 0$ | |
| | $L_{6b}$ | $R_{6b} = -2.28707$ | $d_{6b} = 0.133182$ | 1.80518/25.43 O |
| | | $R'_{6b} = +1.38211$ | $s_{67} = 0$ | |
| VII $L_7$ | | $R_7 = +1.38211$ | $d_7 = 0.207047$ | 1.58913/61.24 |
| | | $R'_7 = +11.79684$ | $s_{78} = 0.003731$ | |
| VIII $L_8$ | | $R_8 = +2.49330$ | $d_8 = 0.176456$ | 1.78831/47.37 |
| | | $R'_8 = +17.30998$ | $s_{89} = 0.017907$ | |
| IX $L_9$ | | $R_9 = +6.82834$ | $d_9 = 0.239503$ | 1.78831/47.37 |
| | | $R'_9 = -1.65421$ | | |

Aspherical surfaces: $R_{4a}$ with $c_1 = (2 \cdot R_{4a})^{-1}$, $c_2 = +3.388\ 7542 \cdot 10^{-2}$, $c_3 = +7.045\ 4329 \cdot 10^{-4}$, $c_4 = +2.543\ 9721 \cdot 10^{-4}$, $c_5 = 0$,
$R'_8$ with $c_1 = (2 \cdot R'_8)^{-1}$, $c_2 = +1.175\ 3002 \cdot 10^{-1}$, $c_3 = -1.076\ 9779 \cdot 10^{-2}$, $c_4 = c_5 = 0$.

| | | | | |
|---|---|---|---|---|
| I $L_1$ | $R_1 = +3.12540$ | $d_1 = 0.225586$ | $n_1 = 1.69766$ | |
| | $R'_1 = +1.67740$ | $s_{12} = 0.283246$ | | |
| II $L_2$ | $R_2 = +4.72183$ | $d_2 = 0.804452$ | $n_2 = 1.74855$ | NN |
| | $R'_2 = -6.03608$ | $s_{23} = 0.202643$ | | |
| III $L_3$ | $R_3 = +2.30430$ | $d_3 = 0.151272$ | $n_3 = 1.78831$ | NS |
| | $R'_3 = +0.92630$ | $s_t = s_{34} = 0.651910$ | | |
| IV $\{L_{4a}$ | $R_{4a} = -1.42395$ | $d_{4a} = 1.110675$ | $n_{4a} = 1.58725$ | |
| | $R'_{4a} = -2.48132$ | $s_{4a,b} = 0.557327$ | | NO |
| $L_{4b}$ | $R_{4b} = +34.75847$ | $d_{4b} = 0.333179$ | $n_{4b} = 1.58324$ | |
| | $R'_{4b} = -4.49128$ | $s_{45} = 0.005920$ | | |
| V $\{L_{5a}$ | $R_{5a} = +2.21649$ | $d_{5a} = 0.818633$ | $n_{5a} = 1.66838$ | |
| | $R'_{5a} = -15.46901$ | $s_{5a,b} = 0.257125$ | | EO |
| $L_{5b}$ | $R_{5b} = -40.83014$ | $d_{5b} = 0.145921$ | $n_{5b} = 1.71241$ | |
| | $R'_{5b} = +1.58895$ | $s_{56} = 0.322577$ | | |
| VI $L_6$ | $R_6 = -23.68569$ | $d_6 = 0.107960$ | $n_6 = 1.80518$ | |
| | $R'_6 = +1.86230$ | $s_{67} = 0$ | | O |
| VII $L_7$ | $R_7 = +1.86230$ | $d_7 = 0.664753$ | $n_7 = 1.65750$ | |
| | $R'_7 = -5.57027$ | $s_{78} = 0.003278$ | | |
| VIII $L_8$ | $R_8 = +4.03129$ | $d_8 = 0.315353$ | $n_8 = 1.71228$ | |
| | $R'_8 = -6.81727$ | $s_{89} = 0.001973$ | | |
| IX $L_9$ | $R_9 = +2.15163$ | $d_9 = 0.360637$ | $n_9 = 1.70904$ | |
| | $R'_9 = \pm\text{plan}$ | | | |

Aspherical surface: $R_{4b}$ with $c_1 = (2 \cdot R_{4b})^{-1}$, $c_2 = +3.018\ 9030 \cdot 10^{-4}$, $c_3 = c_4 = c_5 = 0$.

22. A lens system as defined in claim 1, wherein the characteristics of the components of the system and their spatial relationship to each other are substantially in the proportions indicated by the data in the following table, all linear dimensions of radii, thicknesses, and spacings being expressed in proportion to the equivalent focal length of the entire system, which is considered as unity:

| | | | | |
|---|---|---|---|---|
| I $L_1$ | $R_1 = +3.37508$ | $d_1 = 0.156624$ | $n_1 = 1.67758$ | |
| | $R'_1 = +1.81527$ | $s_{12} = 0.229605$ | | |
| II $L_2$ | $R_2 = +5.13335$ | $d_2 = 0.251159$ | $n_2 = 1.70684$ | NN |
| | $R'_2 = -7.48648$ | $s_{23} = 0.540079$ | | |
| III $L_3$ | $R_3 = +3.09067$ | $d_3 = 0.104627$ | $n_3 = 1.78831$ | NS |
| | $R'_3 = +0.98321$ | $s_t = s_{34} = 1.108094$ | | |
| IV $\{L_{4a}$ | $R_{4a} = -1.05451$ | $d_{4a} = 1.006475$ | $n_{4a} = 1.60156$ | |
| | $R'_{4a} = -1.89550$ | $s_{4a,b} = 0.046315$ | | NO |
| $L_{4b}$ | $R_{4b} = +7.53207$ | $d_{4b} = 0.493897$ | $n_{4b} = 1.64987$ | |
| | $R'_{4b} = -3.57956$ | $s_{45} = 0.003475$ | | |
| V $\{L_{5a}$ | $R_{5a} = +2.22790$ | $d_{5a} = 0.464257$ | $n_{5a} = 1.57938$ | |
| | $R'_{5a} = +8.61454$ | $s_{5a,b} = 0.346597$ | | EO |
| $L_{5b}$ | $R_{5b} = +4.03619$ | $d_{5b} = 0.144828$ | $n_{5b} = 1.80797$ | |

-continued

|  |  |  |  |  |
|---|---|---|---|---|
| VI L$_6$ | R$_6$ = +1.76905<br>R$_6$ = +25.48305<br>R'$_6$ = +1.85408 | s$_{56}$ = 0.327984<br>d$_6$ = 0.118495<br>s$_{67}$ = 0 | n$_6$ = 1.80518 | O |
| VII L$_7$ | R$_7$ = +1.85408<br>R'$_7$ = −4.65393 | d$_7$ = 0.543889<br>s$_{78}$ = 0.002205 | n$_7$ = 1.49541 |  |
| VIII L$_8$ | R$_8$ = +3.29999<br>R'$_8$ = +139.3801 | d$_8$ = 0.266631<br>s$_{89}$ = 0.002272 | n$_8$ = 1.69932 |  |
| IX L$_9$ | R$_9$ = +2.08234<br>R'$_9$ = ± plan | d$_9$ = 0.382252 | n$_9$ = 1.60202 |  |

Aspherical surface R$_{4b}$ with c$_1$ = (2 · R$_{4b}$)$^{-1}$, c$_2$ = −1.868 2513 · 10$^{-2}$, c$_3$ = c$_4$ = 0.

23. A lens system as defined in claim 1, wherein the characteristics of the components of the system and their spatial relationship to each other are substantially in the proportions indicated by the data in the following table, all linear dimensions of radii, thicknesses, and spacings being expressed in proportion to the equivalent focal length of the entire system, which is considered as unity:

|  |  |  |  |  |
|---|---|---|---|---|
| I L$_1$ | R$_1$ = +3.17554<br>R'$_1$ = +1.72019 | d$_1$ = 0.147782<br>s$_{12}$ = 0.373225 | n$_1$ = 1.74400 |  |
| II L$_2$ | R$_2$ = +5.39546<br>R'$_2$ = −1.82276 | d$_2$ = 0.683184<br>s$_{23}$ = 0 | n$_2$ = 1.74400 | NN |
| III { L$_{3a}$<br>L$_{3b}$ | R$_{3a}$ = −1.82276<br>R'$_{3a}$ = −6.47118<br>R$_{3b}$ = +2.19333<br>R'$_{3b}$ = +0.96524 | d$_{3a}$ = 0.132500<br>s$_{3a,b}$ = 0.186613<br>d$_{3b}$ = 0.114355<br>s$_t$ = s$_{34}$ = 0.61504 | n$_{3a}$ = 1.72293<br>n$_{3b}$ = 1.78831 | NS |
| IV { L$_{4a}$<br>L$_{4b}$ | R$_{4a}$ = −1.51067<br>R'$_{4a}$ = −2.27995<br>R$_{4b}$ = +76.89089<br>R'$_{4b}$ = −4.93095 | d$_{4a}$ = 1.206328<br>s$_{4a,b}$ = 0.589354<br>d$_{4b}$ = 0.378144<br>s$_{45}$ = 0.054395 | n$_{4a}$ = 1.56770<br>n$_{4b}$ = 1.58215 | NO |
| V { L$_{5a}$<br>L$_{5b}$ | R$_{5a}$ = +1.94227<br>R'$_{5a}$ = −13.11638<br>R$_{5b}$ = −6.06972<br>R'$_{5b}$ = +1.73584 | d$_{5a}$ = 0.672095<br>s$_{5a,b}$ = 0.276209<br>d$_{5b}$ = 0.092661<br>s$_{56}$ = 0.300766 | n$_{5a}$ = 1.76302<br>n$_{5b}$ = 1.84666 | EO |
| VI L$_6$ | R$_6$ = −17.50515<br>R'$_6$ = +1.63509 | d$_6$ = 0.090040<br>s$_{67}$ = 0 | n$_6$ = 1.81003 | O |
| VII L$_7$ | R$_7$ = +1.63509<br>R'$_7$ = −3.44805 | d$_7$ = 0.575886<br>s$_{78}$ = 0.002056 | n$_7$ = 1.68714 |  |
| VIII L$_8$ | R$_8$ = +3.83796<br>R'$_8$ = −7.65103 | d$_8$ = 0.271290<br>s$_{89}$ = 0.002540 | n$_8$ = 1.69782 |  |
| IX L$_9$ | R$_9$ = +2.20451<br>R'$_9$ = ±plan | d$_9$ = 0.291411 | n$_9$ = 1.62890 |  |

24. A lens system as defined in claim 1, wherein the characteristics of the components of the system and their spatial relationship to each other are substantially in the proportions indicated by the data in the following table, all linear dimensions of radii, thicknesses, and spacings being expressed in proportion to the equivalent focal length of the entire system, which is considered as unity:

| | | | | |
|---|---|---|---|---|
| I L$_1$ | R$_1$ = +3.38273 | d$_1$ = 0.139963 | 1.63854/55.38 | |
| | R'$_1$ = +1.61177 | s$_{12}$ = 0.370064 | | |
| II L$_2$ | R$_2$ = −52.57847 | d$_2$ = 0.244159 | 1.67270/32.20 | NN |
| | R'$_2$ = −4.06399 | s$_{23}$ = 0.301373 | | |
| III L$_3$ | R$_3$ = −1.98189 | d$_3$ = 0.406607 | 1.74400/44.77 | NS |
| | R'$_3$ = +0.83213 | s$_t$ = s$_{34}$ = 0.954689 | | |
| IV { L$_{4a}$ | R$_{4a}$ = −1.00073 | d$_{4a}$ = 0.643115 | 1.62299/58.06 | |
| | R'$_{4a}$ = −1.38657 | s$_{4a,b}$ = 0.088154 | | NO |
| { L$_{4b}$ | R$_{4b}$ = +4.65051 | d$_{4b}$ = 0.300803 | 1.62299/58.06 | |
| | R'$_{4b}$ = −3.79456 | s$_{45}$ = 0.001678 | | |
| V { L$_{5a}$ | R$_{5a}$ = +1.71929 | d$_{5a}$ = 0.334326 | 1.70181/41.02 | |
| | R'$_{5a}$ = +7.69345 | s$_{5a,b}$ = 0.341608 | | EO |
| { L$_{5b}$ | R$_{5b}$ = +5.24069 | d$_{5b}$ = 0.093388 | 1.80518/25.43 | |
| | R'$_{5b}$ = +1.26146 | s$_{56}$ = 0.211105 | | |
| VI L$_6$ | R$_6$ = +7.85137 | d$_6$ = 0.108288 | 1.80518/25.43 | |
| | R'$_6$ = +1.57841 | s$_{67}$ = 0 | | O |
| VII L$_7$ | R$_7$ = +1.57841 | d$_7$ = 0.319259 | 1.48749/70.45 | |
| | R'$_7$ = −2.70741 | s$_{78}$ = 0.001678 | | |
| VIII L$_8$ | R$_8$ = +1.87531 | d$_8$ = 0.181039 | 1.65844/50.88 | |
| | R'$_8$ = +300.6715 | s$_{89}$ = 0.001678 | | |
| IX L$_9$ | R$_9$ = +4.84509 | d$_9$ = 0.326071 | 1.62299/58.06 | |
| | R'$_9$ = −23.3890 | | | |

25. A lens system as defined in claim 1, wherein the characteristics of the components of the system and their spatial relationship to each other are substantially in the proportions indicated by the data in the following table, all linear dimensions of radii, thicknesses, and spacings being expressed in proportion to the equivalent focal length of the entire system, which is considered as unity:

| | | | | |
|---|---|---|---|---|
| I L$_1$ | R$_1$ = +2.81910 | d$_1$ = 0.138164 | 1.62299/58.06 | |
| | R'$_1$ = +1.60408 | s$_{12}$ = 0.398024 | | |
| II L$_2$ | R$_2$ = +4.87862 | d$_2$ = 0.332861 | 1.64250/57.94 | NN |
| | R'$_2$ = −6.62313 | s$_{23}$ = 0.336934 | | |
| III L$_3$ | R$_3$ = +2.25473 | d$_3$ = 0.141277 | 1.74400/44.77 | NS |
| | R'$_3$ = +0.79371 | s$_t$ = s$_{34}$ = 0.543265 | | |
| IV { L$_{4a}$ | R$_{4a}$ = −1.38496 | d$_{4a}$ = 0.529119 | 1.62004/36.37 | |
| | R'$_{4a}$ = −2.72430 | s$_{4a,b}$ = 0.038339 | | NO |
| { L$_{4b}$ | R$_{4b}$ = +10.56737 | d$_{4b}$ = 0.178584 | 1.64250/57.94 | |
| | R'$_{4b}$ = −3.64117 | s$_{45}$ = 0.264594 | | |
| V { L$_{5a}$ | R$_{5a}$ = +1.59675 | d$_{5a}$ = 0.285969 | 1.78470/26.08 | |
| | R'$_{5a}$ = −56.84085 | s$_{5a,b}$ = 0.408633 | | EO |

-continued

| | | | |
|---|---|---|---|
| L$_{5b}$ | R$_{5b}$ = −10.07983<br>R'$_{5b}$ = +1.33822 | d$_{5b}$ = 0.074812<br>s$_{56}$ = 0.204165 | 1.80518/25.43 |
| VI L$_6$ | R$_6$ = −9.53618<br>R'$_6$ = +1.18245 | d$_6$ = 0.068505<br>s$_{67}$ = O | 1.78470/26.08 O |
| VII L$_7$ | R$_7$ = +1.18245<br>R'$_7$ = −2.53940 | d$_7$ = 0.396121<br>s$_{78}$ = 0.002016 | 1.71300/53.85 |
| VIII L$_8$ | R$_8$ = +1.68615<br>R'$_8$ = −4.65915 | d$_8$ = 0.209613<br>s$_{89}$ = 0.002016 | 1.64250/57.94 |
| IX L$_9$ | R$_9$ = +2.33476<br>R'$_9$ = −7.91351 | d$_9$ = 0.184984 | 1.56384/60.82 |

* * * * *